US009953367B2

(12) United States Patent
Del Vecchio et al.

(10) Patent No.: US 9,953,367 B2
(45) Date of Patent: Apr. 24, 2018

(54) SYSTEMS AND METHODS FOR PROVIDING BALANCE AND EVENT NOTIFICATIONS

(71) Applicant: The Toronto-Dominion Bank, Toronto (CA)

(72) Inventors: Orin Del Vecchio, Richmond Hill (CA); Nigel Lall, Toronto (CA); Paul Mon-Wah Chan, Markham (CA); Jonathan K. Barnett, Oakville (CA); Garima Aggarwal, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 294 days.

(21) Appl. No.: 14/589,840

(22) Filed: Jan. 5, 2015

(65) Prior Publication Data

US 2015/0193868 A1    Jul. 9, 2015

Related U.S. Application Data

(63) Continuation-in-part of application No. 14/585,069, filed on Dec. 29, 2014.
(Continued)

(51) Int. Cl.
*G06Q 40/02* (2012.01)
*H04L 29/08* (2006.01)
*H04L 29/06* (2006.01)

(52) U.S. Cl.
CPC ............ *G06Q 40/02* (2013.01); *H04L 67/10* (2013.01); *H04L 67/18* (2013.01); *H04L 67/22* (2013.01);
(Continued)

(58) Field of Classification Search
USPC .......................................................... 705/35
See application file for complete search history.

(56) References Cited

U.S. PATENT DOCUMENTS 5,831,167 A   11/1998  Andersen
5,903,881 A    5/1999  Schrader et al.
(Continued)

FOREIGN PATENT DOCUMENTS

CA      2716137      3/2012
CN    203287793     11/2013
(Continued)

OTHER PUBLICATIONS

BBVA Compass upgrades mobile banking apps, adding Mobile Deposit® for small business (see attached). (Nov. 2013).*
(Continued)

*Primary Examiner* — Bruce I Ebersman
(74) *Attorney, Agent, or Firm* — Duane Morris LLP

(57) ABSTRACT

The disclosed embodiments include methods and systems for providing account and event status notifications. The disclosed embodiments include, for example, a device including a memory storing software instructions and one or more processors configured to execute the software instructions to perform operations. In one aspect, the operations may include obtaining information identifying an event and a deadline specified by a user. The obtained information may link the event and deadline to corresponding user-specified temporal intervals. The operations may also include determining whether a current date falls within a time period prior to the deadline, the time period being established by the first temporal interval. When the current date falls within the time period, the operations may generate first notification information that, when presented via a client device in accordance with a user-specified indicator type, notified the user that the current sate falls within the first time period.

28 Claims, 18 Drawing Sheets

Related U.S. Application Data

(60) Provisional application No. 61/923,355, filed on Jan. 3, 2014.

(52) U.S. Cl.
CPC ............ *H04L 67/306* (2013.01); *H04L 67/42* (2013.01); *H04L 67/26* (2013.01)

(56) References Cited

U.S. PATENT DOCUMENTS

| | | | |
|---|---|---|---|
| 6,246,383 | B1 | 6/2001 | Ophey |
| 6,405,177 | B1 | 6/2002 | DiMattina |
| 6,448,987 | B1 | 9/2002 | Easty et al. |
| 6,988,248 | B1 | 1/2006 | Tang et al. |
| 7,493,573 | B2 | 2/2009 | Wagner |
| 7,844,519 | B2 | 11/2010 | Wehunt et al. |
| 7,899,750 | B1 | 3/2011 | Klieman et al. |
| 7,941,371 | B1* | 5/2011 | Guinan ............... G06Q 20/10 705/39 |
| 8,061,592 | B1 | 11/2011 | Clem et al. |
| 8,069,113 | B2 | 11/2011 | Elterich |
| 8,112,062 | B2 | 2/2012 | Pattabiraman |
| 8,156,041 | B2 | 4/2012 | Jun et al. |
| 8,160,959 | B2 | 4/2012 | Rackley, III et al. |
| 8,175,961 | B2 | 5/2012 | Reid et al. |
| 8,215,560 | B2 | 7/2012 | Granucci et al. |
| 8,270,944 | B1 | 9/2012 | Gailloux et al. |
| 8,423,452 | B1 | 4/2013 | Ley et al. |
| 8,500,031 | B2 | 8/2013 | Naelon |
| 8,538,827 | B1 | 9/2013 | Dryer et al. |
| 8,600,863 | B2 | 12/2013 | Jain et al. |
| 8,659,605 | B1 | 2/2014 | Perttunen |
| 8,707,178 | B2 | 4/2014 | Paas et al. |
| 8,799,066 | B1 | 8/2014 | Nesladek et al. |
| 8,820,632 | B1 | 9/2014 | West |
| 2002/0143594 | A1 | 10/2002 | Kroeger |
| 2004/0143659 | A1* | 7/2004 | Milliken ............... H04L 29/06 709/224 |
| 2005/0234820 | A1 | 10/2005 | MacKouse |
| 2007/0150986 | A1 | 6/2007 | Jung et al. |
| 2007/0129955 | A1 | 7/2007 | Dalmia et al. |
| 2008/0006685 | A1 | 1/2008 | Rackley, III et al. |
| 2008/0017704 | A1 | 1/2008 | Vandeburg et al. |
| 2008/0046349 | A1* | 2/2008 | Elberg ............... G06Q 40/02 705/35 |
| 2008/0103972 | A1 | 5/2008 | Lanc |
| 2008/0167000 | A1 | 7/2008 | Wentker et al. |
| 2010/0114724 | A1 | 5/2010 | Ghosh et al. |
| 2010/0125495 | A1 | 5/2010 | Smith et al. |
| 2010/0138338 | A1 | 6/2010 | Hammad et al. |
| 2010/0153247 | A1* | 6/2010 | DiPaolo ............... G06Q 40/00 705/34 |
| 2010/0162260 | A1* | 6/2010 | Ibrahim ............... G06F 9/505 718/105 |
| 2010/0223569 | A1 | 9/2010 | Vuong et al. |
| 2010/0312700 | A1 | 12/2010 | Coulter et al. |
| 2011/0010232 | A1* | 1/2011 | Bhojwani ........... G06Q 30/02 705/14.17 |
| 2011/0022516 | A1 | 1/2011 | Gao et al. |
| 2011/0029430 | A1* | 2/2011 | Norris ............... G06Q 20/10 705/39 |
| 2011/0071893 | A1 | 3/2011 | Malhotra et al. |
| 2011/0134804 | A1* | 6/2011 | Maes ............... H04M 7/0012 370/259 |
| 2012/0030043 | A1 | 2/2012 | Ross et al. |
| 2012/0099715 | A1* | 4/2012 | Ravishankar ....... H04L 12/1407 379/114.01 |
| 2012/0150736 | A1 | 6/2012 | Dickerson et al. |
| 2012/0167162 | A1* | 6/2012 | Raleigh ............... G06F 21/57 726/1 |
| 2012/0215767 | A1 | 8/2012 | Myer et al. |
| 2012/0265618 | A1 | 10/2012 | Bullock |
| 2012/0267432 | A1 | 10/2012 | Kuttuva |
| 2012/0299962 | A1 | 11/2012 | White et al. |
| 2013/0030925 | A1 | 1/2013 | Calman et al. |
| 2013/0033522 | A1 | 2/2013 | Calman et al. |
| 2013/0080898 | A1 | 3/2013 | Lavian et al. |
| 2013/0138534 | A1 | 5/2013 | Herwig |
| 2013/0204785 | A1 | 8/2013 | Monk et al. |
| 2013/0231080 | A1 | 9/2013 | Cheuk et al. |
| 2013/0304587 | A1* | 11/2013 | Ralston ............... G06Q 30/0271 705/14.67 |
| 2013/0325679 | A1 | 12/2013 | Yeri et al. |
| 2013/0331067 | A1* | 12/2013 | Coussemaeker ....... G06Q 10/10 455/412.2 |
| 2013/0343353 | A1 | 12/2013 | Maytal |
| 2014/0006114 | A1 | 1/2014 | Nuzzi et al. |
| 2014/0012745 | A1 | 1/2014 | Hanson et al. |
| 2014/0012746 | A1 | 1/2014 | Hanson et al. |
| 2014/0058912 | A1 | 2/2014 | Bajaj |
| 2014/0076965 | A1 | 3/2014 | Becorest et al. |
| 2014/0207666 | A1 | 7/2014 | Wottowa et al. |
| 2014/0297435 | A1 | 10/2014 | Wong |
| 2014/0320533 | A1 | 10/2014 | Soon-Shiong |
| 2015/0106267 | A1* | 4/2015 | Lee ............... G06Q 20/42 705/44 |

FOREIGN PATENT DOCUMENTS

| | | |
|---|---|---|
| KR | 20050017699 | 2/2005 |
| WO | WO 2004053786 | 6/2004 |
| WO | WO 2012122248 | 9/2012 |
| WO | WO 2013088768 | 5/2013 |

OTHER PUBLICATIONS

Gusev et al., "Models of Mobile Payments," Institute of Informatics, Faculty of Natural Sciences and Mathematics, Ss. Cyril and Methodius University, Jan. 2002 (6 pages).

Marous, "Moven: From Mobile Banking to Mobile Money," http://www.banknxt.com, Feb. 26, 2013 (9 pages).

"Finance PM—Expense manager," Android Apps on Google Play, retrieved from https://play.google.com/store/apps/details?id=com.finperssaver on Mar. 13, 2014 (5 pages).

"Check: Pay bills, credit cards," Android Apps on Google Play, retrieved from https://play.google.com/store/apps/details?id=com.netgate on Mar. 13, 2014 (4 pages).

"MasterPass heralds new age in digital payments," Philippine Daily Inquirer, Jan. 18, 2014 (3 pages).

Malykhina et al., "The phone as bank central," InformationWeek, Issue 1133, Apr. 9, 2007, pp. 31-32.

Korousic et al., "Predictable hard real-time scheduling," Real Time Systems, 1992 (6 pages).

Samimi et al., "Analysis of ordered categorical data to develop control charts for monitoring customer loyalty," Applied Stochastic Models in Business and Industry, vol. 26, No. 6, 2010, pp. 668-688.

Larivière et al., "Value fusion: The blending of consumer and firm value in the distinct context of mobile technologies and social media," Journal of Service Management, vol. 24, No. 3, 2013, pp. 268-293.

Sluis, Customer Relationship Management, May 2014 (2 pages).

Duffy, "Best Mobile Finance Apps," pcmag.com, Jul. 24, 2014 (9 pages).

Wood, "Using Special Characters from Windows Glyph List 4 (WGL4) in HTML," retrieved from http://www.alanwood.net/demos/wg14.html, Jan. 18, 2008 (29 pages).

"Sending Buyer Email," retrieved from http://pages.ebay.com/help/sell/email-buyer.html, Mar. 3, 2006 (4 pages).

Zuckerman, "How to Create Progress Bars in Excel With Conditional Formatting," retrieved from http://www.howtogeek.com/howto/45677/how-to-create-progress-bars-in-excel-with-conditional-formatting, Jan. 8, 2012 (6 pages).

Chilton et al., "Why We Customize the Web," chapter within Cypher et al., "No Code Required: Giving Users Tools to Transform the Web," Elsevier, 2010 (11 pages).

(56) References Cited

OTHER PUBLICATIONS

Piechnick, "Six Font Styles that Make Text Stand Out," 2008 (retrieved http://www.pegaweb.com/tutorials/contrast-font-style/contrast-font-style.htm on Aug. 23, 2016; 3 pages).

* cited by examiner

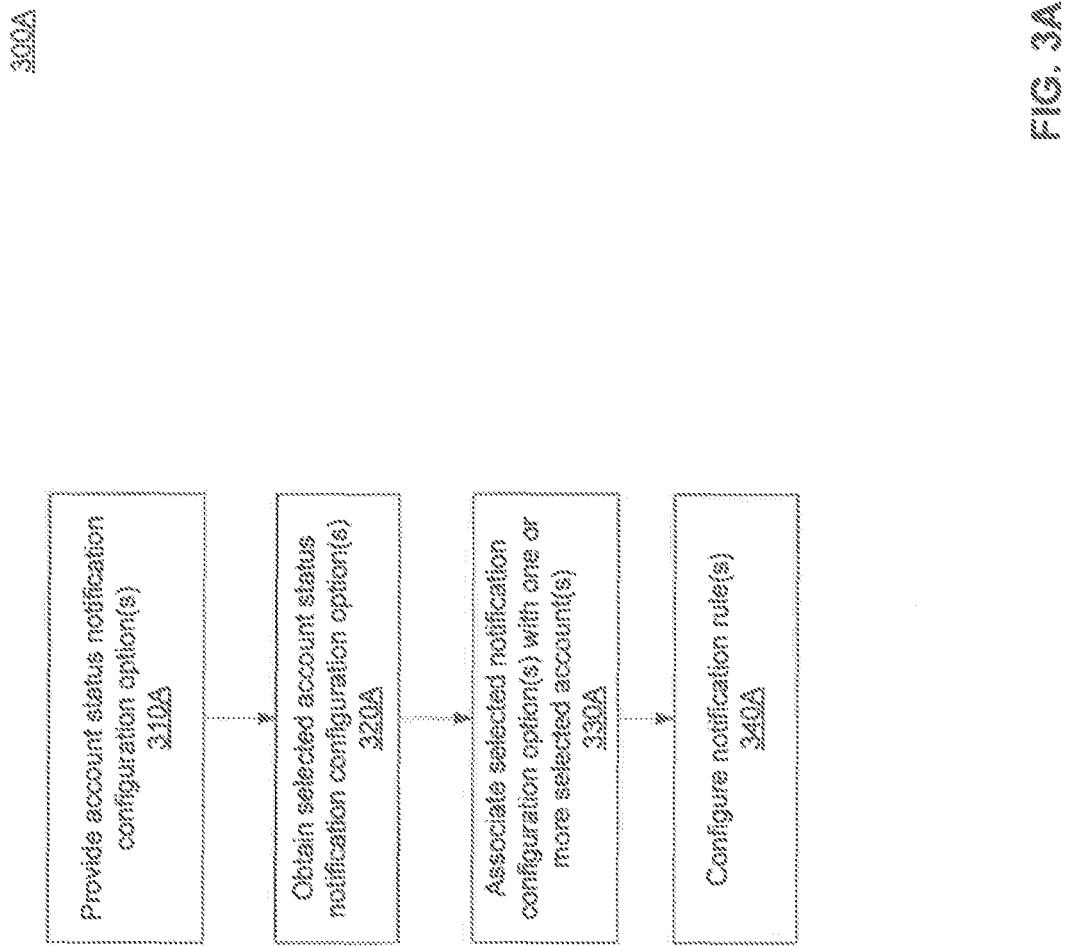

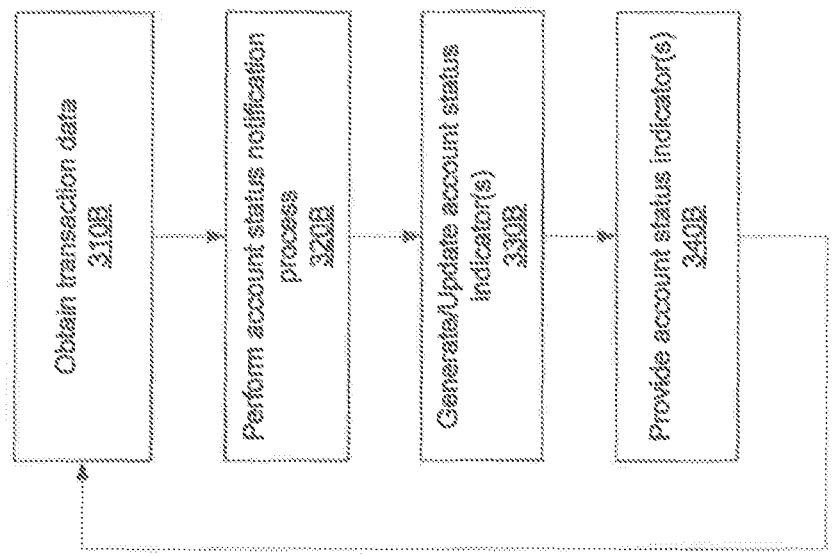

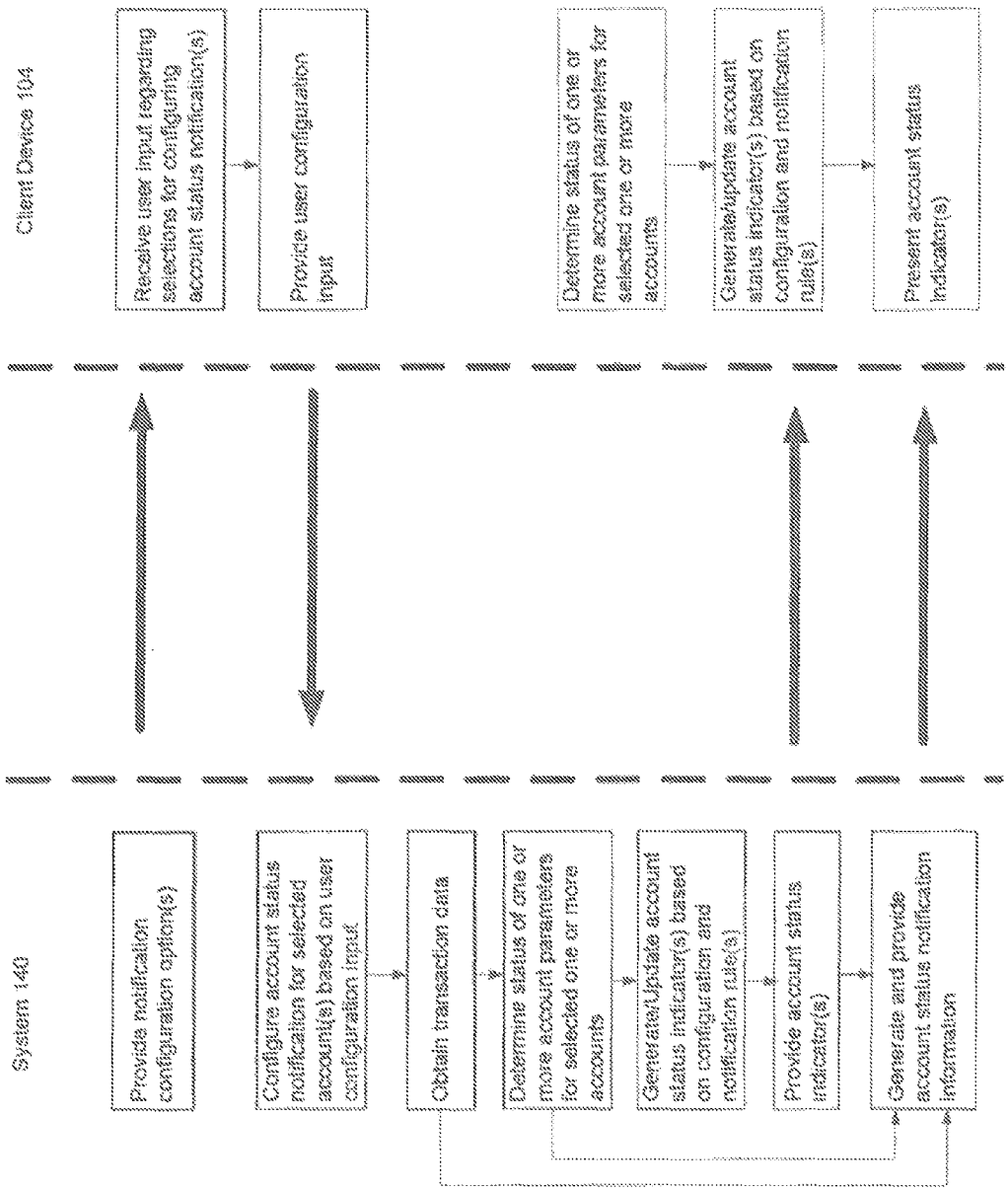

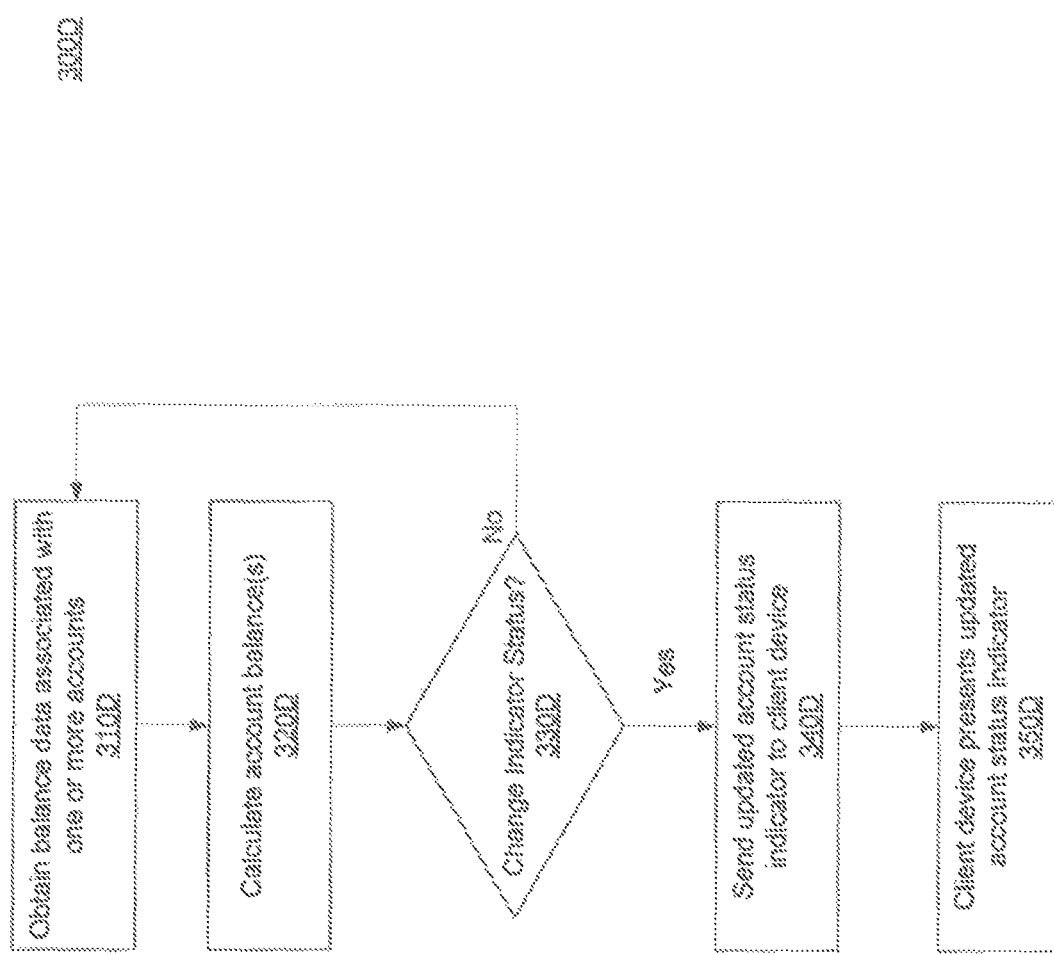

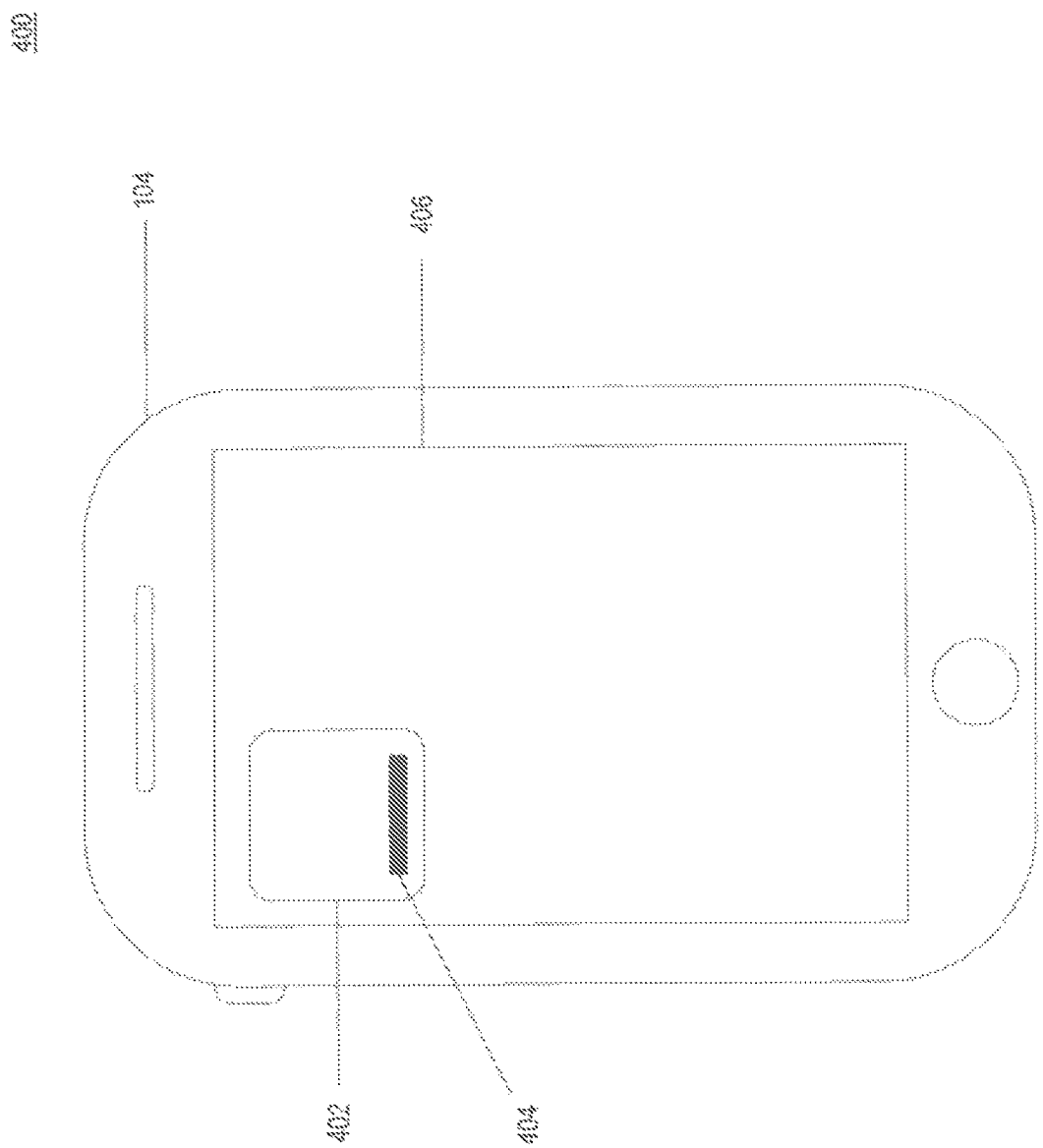

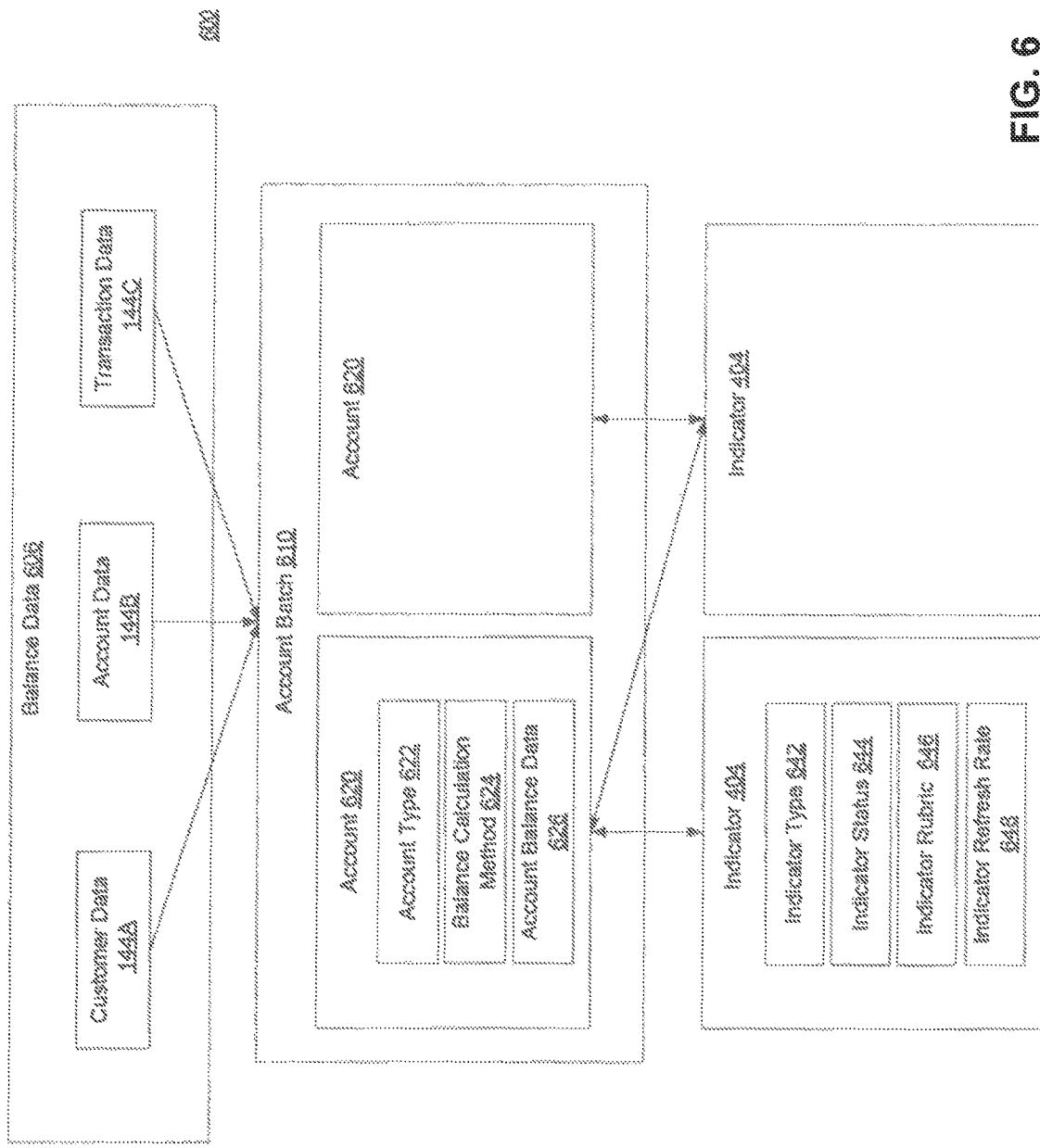

700

| | User Account 1 (620) | User Account 2 (620) | User Account 3 (620) |
|---|---|---|---|
| Account Type (622) | Savings | Checking | Student Meal Plan |
| Balance Calculation Method (624) | Straight | Include monthly expenses, income, and purchases | Include yearly expenditure rates |
| Current Balance (626) | $20,000 | $10,000 | 100 meals |
| Average Monthly Income (626) | $500 | $5,000 | 30 meals |
| Average Monthly Expenses (626) | $0 | $3,000 | 30 meals |
| Potential Transactions (626) | None | TV- $1,500 Bill Payment: $700 | None |
| Effective Account Balance (EAB) (626) | $20,000 | $9,800 | 40 meals |

| | Indicator 1 (404) | Indicator 2 (404) |
|---|---|---|
| Indicator Type (642) | Bar | Glyph |
| Indicator Rubric (646) | If AB < $5,000, color = red; else color = green | Red X if EAB of TA2 < $10,000 or EAB of TA3 < 10 |
| Indicator Status (644) | Color = Green | Glyph = Red X |

FIG. 7

SYSTEMS AND METHODS FOR PROVIDING BALANCE AND EVENT NOTIFICATIONS

CROSS-REFERENCE TO RELATED APPLICATION

This application is a continuation-in-part of U.S. patent application Ser. No. 14/585,069, filed Dec. 29, 2014, which claims the benefit of priority to U.S. Provisional Patent Application No. 61/923,355, filed Jan. 3, 2014, the entire disclosure of which are expressly incorporated herein by reference to their entireties

BACKGROUND

Technical Field

The present disclosure generally relates to systems and methods for portraying information, and more particularly, and without limitation, to systems and methods for providing notifications for accounts.

Background

Status notifications provide users with information that may be helpful in assessing current situations relating to monitored items. In the financial service industry, for example, users benefit from systems that provide updates to the status of certain account parameters. Such mechanisms, however, are cumbersome for users and may require multiple operations to view the notification, such as logging in to an online banking site, opening an application to review notifications, and the like.

Aspects of the disclosed embodiments provide user-friendly visual, audial, or haptic (tactile) indicators that relay the status of one or more items in an accurate and efficient manner.

SUMMARY

The disclosed embodiments include methods and systems or providing account status notifications.

The disclosed embodiments include, for example, an apparatus having a storage device and at least one processor coupled to the storage device. The storage device may store instructions for controlling the at least one processor when executed by the at least one processor. The at least one processor may be operative with the instructions and configured to obtain information identifying an event and corresponding deadline specified by a user. In some aspects, the information may link the event and deadline to a plurality of temporal notification intervals, and the temporal notification intervals may be linked to corresponding indicator types. The at least one processor may be further configured to determine whether a current date falls within a first time period prior to the deadline. The first time period may be established by a first one of the temporal notification intervals. When the current date is determined to fall within the first time period, the at least one processor may be further configured to identify a first indicator type associated with the first temporal notification interval. The at least one processor may be further configured to generate first notification information for the identified event based on at least one notification rule and a status of the identified event. In one aspect, the identified event status being indicative of the disposition of the current date within the first time period. The at least one processor may be further configured to provide the first notification information to a device associated with the user. In additional aspects, the first notification information may instruct the user device to generate and present, to the user, a first event status indicator having at least one of a visual, audible, or tactile characteristic consistent with the at least one notification rule and the first indicator type.

The disclosed embodiments also include a computer-implemented method that obtains, by at least one processor, information identifying an event and corresponding deadline specified by a user. In some aspects, the information may link the event and deadline to a plurality of temporal notification intervals, and the temporal notification intervals may be linked to corresponding indicator types. The method includes determining, by the least one processor, whether a current date falls within a first time period prior to the deadline. The first time period may be established by a first one of the temporal notification intervals. When the current date is determined to fall within the first time period, the method may identify, by the least one processor, a first indicator type associated with the first temporal notification interval, and generate, by the least one processor, first notification information for the identified event based on at least one notification rule and a status of the identified event. In one aspect, the identified event status may be indicative of the disposition of the current date within the first time period. The method may also provide, by the least one processor, the first notification information to a device associated with the user. In additional aspects, the first notification information may instruct the user device to generate and present, to the user, a first event status indicator having at least one of a visual, audible, or tactile characteristic consistent with the at least one notification rule and the first indicator type.

In other embodiments, a device may include a storage device and at least one processor coupled to the storage device. The storage device may store software instructions for controlling the at least one processor when executed by the at least one processor. In an embodiment, the at least one processor may be operative with the software instructions and may be configured to receive status notification information for at least one event. In one aspect, the event may be associated with a corresponding deadline, and the received status notification information may reflect a disposition of a current date within a first time period prior to the deadline. In additional aspects, the first time period may be established by the first temporal interval, and the first temporal interval may be associated with a first indicator type. Based on the received status notification information, the at least one processor may be further configured to generate an event status indicator in accordance with the first indicator type. The generated event status indicator may reflect the disposition of the current date within the first time period. The at least one processor may be further configured to present, to the user, the event status indicator without receiving input from the user. In certain aspects, at least one a visual, audible, or tactile characteristic of the presented event status indicator may be consistent with first indicator type.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

FIGS. 3A, 3B, 3C, and 3D depict flowcharts of an exemplary process for providing a balance notification indicator consistent with disclosed embodiments.

FIG. 4 depicts an exemplary client device portraying a pictorial balance indicator consistent with disclosed embodiments.

FIG. 6 depicts an exemplary transaction account and indicator environment consistent with disclosed embodiments.

FIG. 7 depicts an exemplary transaction account and indicator environment for a single user associated with multiple accounts consistent with disclosed embodiments.

DESCRIPTION OF THE EMBODIMENTS

Reference will now be made in detail to embodiments, examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise.

Figure 1:
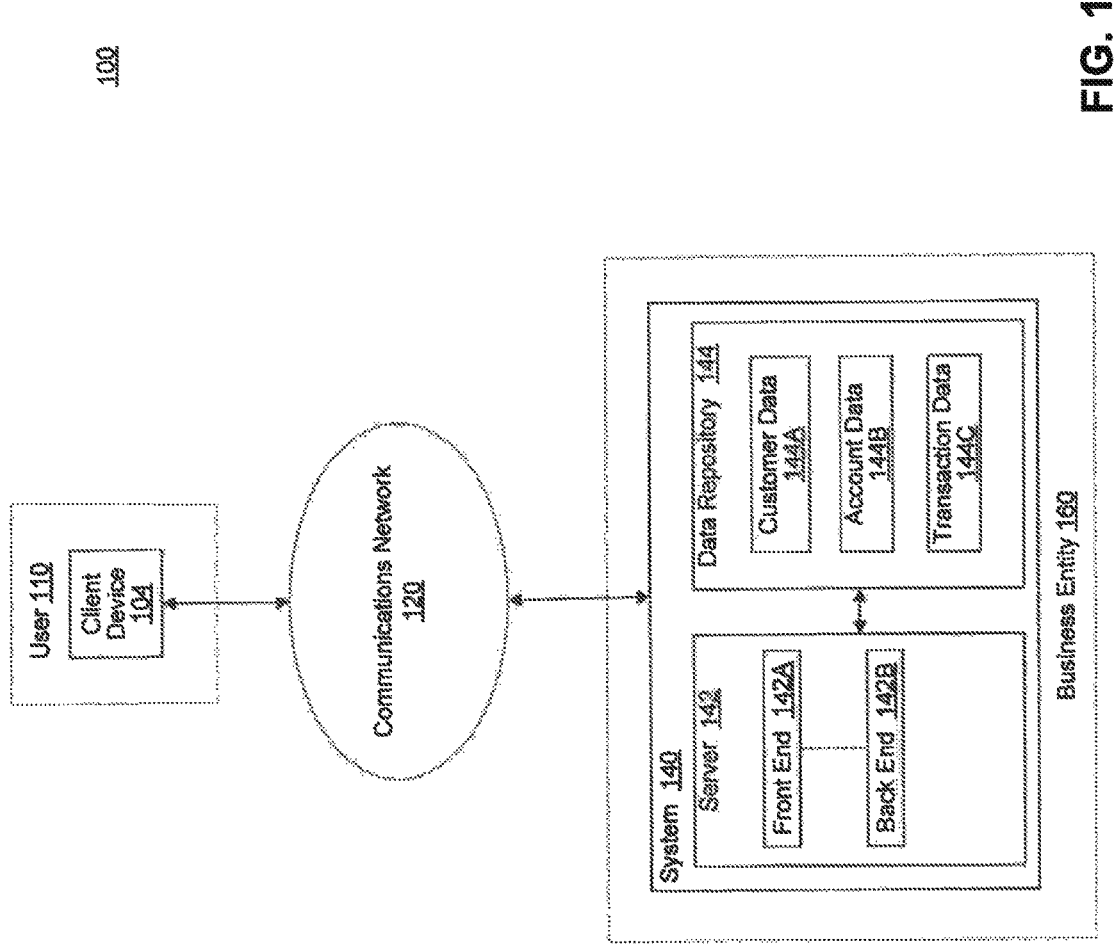
FIG. 1 depicts an exemplary computing environment consistent with disclosed embodiments.

FIG. 1 illustrates an exemplary computing environment consistent with certain disclosed embodiments. In one aspect, computing environment 100 may include a client device 104, system 140, and communications network 120 connecting one or more of the components of environment 100.

In one embodiment, system 140 may include one or more computer systems configured to gather, process, and store information. System 140 may be further configured to execute software instructions stored in memory performing one or more processes consistent with the disclosed embodiments. In certain aspects, system 140 may be associated with business entity 160, although such association is not required. In one embodiment, business entity 160 may be any type of entity (e.g., business, service provider, etc.) that may provide and maintain one or more accounts for one or more users (e.g., user 110). For example, business entity 160 may include, for example, a financial institution, retail store, university, merchant, online retail service provider, restaurant, hotel, or the like. In some embodiments, business entity 160 may be a commercial bank, investment bank, a provider of a payment instrument or financial service accounts, etc. As an example, a financial service account may be a checking, savings, credit, debit, gift card, reward, trading, investment, and/or loyalty account. In some aspects, a payment instrument may include, but is not limited to, a personal or corporate credit card, debit card, prepaid credit or debit card, gift card, or check instrument. In certain embodiments, an account may be used in a transaction, such as a purchase transaction, a banking transaction, or other forms of financial service transactions.

While the present disclosure sometimes describes certain aspects of business entity 160 as a financial institution, the disclosed embodiments are not so limited. In other embodiments, system 140 may be associated with a business entity 160 providing accounts for users 110 associated with other types of transactions, such as online services (e.g., an online retailer), merchant related services (e.g., purchasing goods or services at a physical retailer or restaurant, etc.), educational institution related services (e.g., student meal plans, etc.), and the like. Moreover, aspects of the disclosed embodiments are not limited to financial service accounts. In certain embodiments, an account may be associated with one or more account parameters, such as account balance, account limit, usage limit, remaining usage credit, or other parameters. The disclosed embodiments may be configured to determine, access, or generate information associated with one or more account parameters relating to one or more accounts for one or more users (e.g., user 110).

In one embodiment, system 140 may include one or more servers 142 and one or more memories, such as data repository 144. In one embodiment, server 142 may include a front end 142A, and a back end 142B in communication with front end 142A, although the configuration of server 142 is not limited to such configurations. In one example, front end 142A and back end 142B of server 142 may be incorporated into a single computer, or any additional or alternate computing device apparent to one or skill in the art. In other embodiments, front end 142A and backend 142B may be distributed computing elements. In certain aspects, front end 142A may be one or more software programs, such as a software application (e.g., a web service) executed by one or more processors included in server 142. Similarly, backend 142B may be one or more software programs executed by one or more processors included in server 142. Server 142 is not limited to such configurations. In additional embodiments, front end 142A software can be executed by a server or computing system separate from a server or computing system that executes back end 142B. In other embodiments, server 140 may be configured without front end 142A and/or back end 142B.

Server 142 may be configured to execute software instructions to perform one or more processes consistent with the disclosed embodiments. Server 142 may be implemented with one or more processors or computer-based systems. In one embodiment, client device 104 may exchange information and parameters facilitating execution of one or more transactions associated with system 140 as described herein.

Data repository 144 may be one or more data storages configured to store information consistent with the disclosed embodiments. In one aspect, data repository 144 may include customer data 144A, account data 144B, and transaction data 144C. In one aspect, customer data 144A may include one or more data records uniquely identifying one or more users 110 of business entity 160 associated with system 140. By way of example, a customer of a financial institution (e.g., business entity 160) may access a web page associated with system 140 (e.g., through a web server executed by front end 142A), and subsequently register for online banking services and provide data. The data may be linked to the customer and stored within customer data 144A.

In certain aspects, customer data 144A may include personal information associated with a user 110 (e.g., a name, home address, or date of birth). Customer data 144A may also include one or more authentication credentials associated with registered customers of the issuing bank. For example, the authentication credentials may include, but are not limited to, a user name, a user-specified password, a system-generated password, or an alphanumeric identification number (e.g., a PIN number) specified by the user or assigned by system 140. Other types of customer information may be stored and used by the disclosed embodiments.

Additionally or alternatively, customer data 144A may include information facilitating enhanced authentication techniques. For example, customer data 144A may store information identifying a security question associated with a customer (e.g., "What is your mother's maiden name?") and the customer's registered answer to the security question. Customer data 144A may also include information identifying a particular security image or avatar selected by the user and displayed by the user during the authentication process.

Customer data 144A may include client device identification information identifying one or more client devices 104 registered to user 110. In one embodiment, the user may provide the client device identification information (e.g., a mobile telephone number provided by the user when registering for online banking services, a mobile access control (MAC) address associated with client device 104, etc.). Alternatively, server 142 may be configured to execute processes that automatically collect client device identification information (e.g., collecting an Internet Protocol (IP) address associated with the customer's smartphone).

In an embodiment, customer data 144A may include geographic position data associated with user 110 and/or at least one of client devices 104 registered to user 110. For instance, the geographic position data may identify a current geographic position of user 110 and/or client devices 104, and additionally or alternatively, one or more prior geographic positions of user 110 and/or client devices 104. Geographic position data consistent with the disclosed embodiments may include, but is not limited to, a latitude, longitude, and/or altitude of a current or prior geographic position, additional geospatial coordinates or position information (e.g., a Where On Earth Identified (WOEID)), a geographic region associated with a current or prior geographic position, and/or a postal code associated with a current or prior geographic position.

In certain aspects, system 140 may obtain a portion of the geographic position data from client device 104 across communications network 120. By way of example, client device 104 may include a global position system (e.g., a GPS) that tracks a current geographic position of client device 104, and client device 104 may transmit geographic position data indicative of the current geographic position of client device 104 to system 140 across communication network 120. For instance, client device 104 may append the geographic position data to data transmitted to system 140 in response to a completed transaction, and/or a required update to system 140. In other instances, client device 104 may transmit the geographic position data to a third-party system (e.g., a mobile telecommunications provider), and system 140 may obtain portions of the geographic position data from the third-party system across network 140 through an appropriate application programming interface (API). Upon receipt of the geographic position data from client device 104 and/or the third party system, system 140 may be configured to format and store the received positional information within database 144 (e.g., as portions of customer data 144A).

In certain aspects, account data 144B may include account information identifying one or more accounts (e.g., account 620 of FIG. 6) of users 110 of a business entity 160 associated with system 140. In one embodiment, account information may include financial service account information for a business entity 160 such as a financial institution or a merchant. For example, such account information may include information associated with a checking account, a savings account, a credit account, a debit account, a brokerage account, and any other type of account provided by business entity 160. In other embodiments, account data 144B may include information identifying investment portfolios held by one or more customers of business entity 160 (e.g., positions in one or more securities held by the customers of the financial institution).

In some aspects, account data 144B may also include account parameter information associated with the one or more accounts of user 110. For example, account parameter information consistent with the disclosed embodiments may include, but is not limited to, an account balance, an account limit, account identification information (e.g., account number, expiration date information, and/or card security code data), and other parameters associated with an account held by user 110.

In other instances, the account parameter information may reflect a current usage and/or a remaining available usage of the one or more accounts. For example, user 110 may hold a debit card issued by the financial institution, which may provide a predetermined number of "free" transactions involving the debit card at participating ATMs (e.g., a predetermined number of withdrawal transactions without accruing fees). In certain aspects, the account parameter information may identify a number of transactions involving the debit card at the participating ATMs, a number of remaining free transactions, and any additional or alternate parameters describe user 110's current or remaining available usage.

Further, in additional embodiments, user 110 may participate in loyalty and/or rewards programs (e.g., referred to collectively as "loyalty programs") provided by the financial institution, and additionally or alternatively, by one or more physical or electronic retailers associated with business entity 160. In some aspects, account data 144B may include information identifying the one or more loyalty programs in which the user participates and account information associated with the one or more loyalty programs (e.g., account numbers, account holders, addresses, etc.). Account data 144B may also include information identifying one or more parameters of the loyalty programs. Loyalty program account parameters consistent with the disclosed embodiments include, but are not limited to, a current balance of points associated with the loyalty programs (e.g., "loyalty points"), a number of loyalty points required to achieve one or more rewards or dividends, information identifying an impact of specific purchases on user 110's accrued loyalty points (e.g., a loyalty program may accrue double points based on purchases of specific good and/or specific retailers), and numbers of loyalty points remaining before user 110 achieves one or more rewards. In certain aspects, the loyalty program information and/or loyalty program parameter information may enable system 140 and/or client device 104 to determine an impact of a potential purchase on user 110's loyalty points and determine whether the potential purpose would enable user 110 to achieve a reward.

In other aspects, account data 144B may include account information associated with other types of accounts, such as student meal plans, gift cards, store credit, wireless communications plans, or any other kind of account capable of maintaining a balance associated with system 140. For example, account data 144B may include information associated with a meal plan on system 140 for a student at a university (e.g., business entity 160). In another example, account data 144B may include information associated with a gift card for customer 110 on a merchant's (e.g., business entity 160) system 140. Further, in some instances, account data 144B may include information associated with a wireless plan (e.g., cellular telephone and data) provided by a wireless carrier (e.g., business entity 160).

In some aspects, the account information may reflect one or more account parameters associated with current or remaining usage of the account for a service. For example, account parameters consistent with the disclosed embodiments may identify transportation credits used to gain access to public transportation (e.g., bus, train, etc.), a number of meals remaining on the student's meal plan, a number of cellular minutes, text messages, and/or data remaining on user 110's wireless plan, etc.

Transaction data 144C may include information reflecting one or more transactions involving one or more accounts associated with business entity 160 and/or system 140. For example, transaction data 144C may relate to one or more purchase transactions involving an account associated with a user (e.g., user 110) and provided by business entity 160. Transaction data 144C may also include information relating to activities associated with one or more accounts provided by business entity 160 and processed by system 140. For example, transaction data 144C may include data reflecting past bill payments that occur electronically through online bill payment processes provided by system 140. The data may include information such as payment amount, payee, date(s) of payments, descriptions of the type of payment and/or payee, etc. Transaction data 144C may also include information related to prior transactions, historical transactions, or scheduled transactions associated with one or more accounts provided by business entity 160.

In other aspects, transaction data 144C may include information identifying one or more potential transactions involving one or more accounts of business entity 160 associated with system 140. In one embodiment, potential transactions may include, but are not limited to, potential purchase transactions (e.g., purchases of goods and/or services from electronic or physical retailers), potential financial service transactions (e.g., fund transfers), potential bill payment transactions (e.g., electronic bill payment transactions), potential financial instrument or security transactions (e.g., purchases of securities), potential deposits or withdrawals of funds, or potential applications for credit from the financial institution or other entity. In certain aspects, system 140 may receive from client device 104 information reflecting a potential purchase transaction involving one or more accounts associated with one or more users (e.g., user 110). System 140 may store the potential purchase transaction information as transaction data 144C for respective users. In other aspects, system 140 may execute software processes that track the potential purchase transactions for respective account(s), determine and maintain a running total of purchase price(s) associated with goods/services associated with the potential purchase transactions on an account basis, a user basis (e.g., multiple accounts held by a user), or other data configurations.

Client device 104 may include one or more client devices. In certain embodiments, client device 104 may be associated with one or more users 110. In one example, user 110 may use client device 104 to perform one or more processes consistent with the disclosed embodiments. Client device 104 may include, but is not limited to, a personal computer, a laptop computer, a tablet computer, a notebook computer, a hand-held computer, a personal digital assistant, a portable navigation device, a mobile device (e.g., mobile phone), a wearable device (e.g., a smart watch, a wearable activity monitor, wearable smart jewelry, and glasses and other optical devices that include optical head-mounted displays (OHMDs), an embedded device (e.g., in communication with a smart textile or electronic fabric), a set top box, an optical disk player (e.g., a DVD player), a digital video recorder (DVR), and any other computing device. In other instances, client device 104 may include optical devices capable of providing a "heads-up" display to user 110 (e.g., vehicle-based heads-up displays), and other optical devices capable of presenting an augmented reality (AR) view that "pop-ups" within a field of view of user 110. In additional instances, the heads-up display and/or the AR view provided by the optical devices may modify an object visible within user 110's environment (e.g., an "in-view" object within user 110's field-of-view, and additionally or alternatively, within an image or video presented user 110 by the optical devices) to indicate a status of an account of user 110 by, for example, generating and presenting information that "overlays" a portion of the in-view object (e.g., overlaying interface element over a top portion of the in-view object, surrounding the in-view object, and/or within the in-view object). In certain aspects, client device 104 may blend computer-generated graphics with user 110's real-world or virtual environments to visually indicate a status of one or more of user 110's accounts. Client device 104 may be implemented with one or more processors or computer-based systems, such as for example, computer system 200 of FIG. 2.

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

Although FIG. 1 illustrates computing environment 100 with one client device 104, the disclosed embodiments may include a plurality of client devices 104. Similarly, while FIG. 1 depicts computing environment 100 with a single system 140 and user 110, persons of ordinary skill in the art will appreciate environment 100 may include any number of systems 140 and users 110, which may be associated with one or more client devices 104. In one embodiment, a single business entity 160 may employ several systems 140 that may communicate with each other (e.g., over a LAN, WAN, or other communications network 120). System(s) 140 may also be configured to communicate with one or more other systems, which may or may not be associated with other business entities.

Further, in some aspects, client device 104 may be configured to establish peer-to-peer communications sessions with other client devices disposed within computing environment 100 (e.g., "connected devices") using one or more of the communications protocols outlined above. For example, client device 104 and the connected devices may be uniquely identifiable and addressable within communications network 120, and may be capable of transmitting and/or receiving data across the established communications sessions. Further, in some aspects, client device 104 may be configured to establish the communications sessions with one or more of the connected devices, and to exchange data with the connected devices autonomously and without input or intervention from a user of client device 104 (e.g., user 110). For instance, the disclosed embodiments may enable client device 104 to receive data from system 140, to identify a connected device capable of receiving transmitted data from client device 104, and further, to autonomously transmit the received data (e.g., to "push" the received data) to the identified connected device without input from user 110. By way of example, connected devices consistent with the disclosed embodiments may include, but are not limited to mobile communications devices (e.g., mobile telephones, smart phones, tablet computers, etc.) and other devices capable of communicating with client device 104 (e.g., internet-ready televisions, internet-ready appliances and lighting fixtures, computing devices disposed within motor vehicles, etc.).

Figure 2:
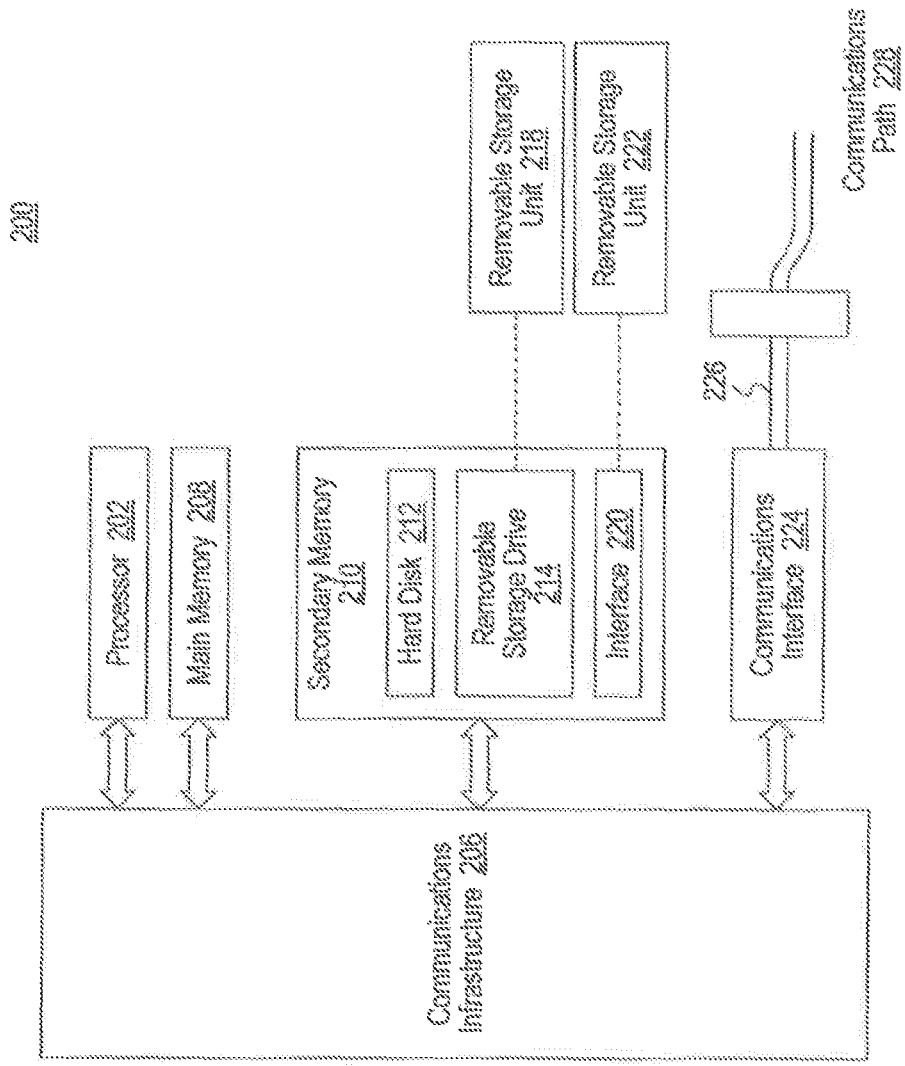
FIG. 2 depicts an exemplary computing system consistent with the disclosed embodiments.

FIG. 2 illustrates an exemplary computer system 200 with which embodiments consistent with the present disclosure may be implemented. In certain embodiments, computer system 200 may reflect computer systems associated with server 142 or client device 104. In certain embodiments, computer system 200 may include one or more processors 202. Processor 202 may be connected to a communication infrastructure 206, such as a bus or communications network, e.g., a communications network 120 depicted in FIG. 1.

Computer system 200 may also include a main memory 208, for example, random access memory (RAM), and may include a secondary memory 210. Memory 208 may represent a tangible and non-transitory computer-readable medium having stored therein computer programs, sets of instructions, code, or data to be executed by processor 202. Secondary memory 210 may include, for example, a hard disk drive 212, and/or a removable storage drive 214, representing a magnetic tape drive, flash memory, an optical disk drive, CD/DVD drive, etc. The removable storage drive 214 may read from and/or write to a removable storage unit 218 in a well-known manner. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, etc. Communications interface 224 may transfer software and data in the form of signals 226, which may be electronic, electromagnetic, optical or other signals capable of being received by communications interface 224. These signals 226 may be provided to communications interface 224 via a communications path (i.e., channel 228). Channel 228 carries signals 226 and may be implemented using wire, cable, fiber optics, RF link, and/or other communications channels. In a disclosed embodiment, signals 226 comprise data packets sent to processor 202. Information representing processed packets can also be sent in the form of signals 226 from processor 202 through communications path 228.

In certain embodiments in connection with FIG. 2, the terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to tangible devices including, but not limited to, a hard disk installed in hard disk drive 212, any combination of main memory 208 and secondary memory 210, and removable storage units 218 and 222, which may respectively provide computer programs and/or sets of instructions to processor 202 of computer system 200. Such computer programs and sets of instructions can be stored within one or more computer-readable media. Additionally or alternatively, computer programs and one or more sets of instructions may also be received via communications interface 224 and stored on the one or more computer-readable media.

Such computer programs and instructions, when executed by processor 202, enable processor 202 to perform one or more processes consistent with the disclosed embodiments. Examples of program instructions include, for example, machine code, such as code produced by a compiler, and files containing a high-level code that can be executed by processor 202 using an interpreter.

Furthermore, the computer-implemented methods of the disclosed embodiments may be performed via one or more processors of a single or multiple computer systems, such as processor 202 of system 200.

In certain aspects, the disclosed embodiments include systems and methods for providing account status notifications. In one embodiment, account status notifications may be provided in the form of account status indicators. In one aspect, system 140 may perform processes that generate and provide account status indicators to client device 104 for presentation. In another aspect, system 140 may generate account status notification information that is provided to client device 140 for generating and presenting account status indicators. Client device 104 may be configured to execute software instructions that perform operations, such as generating account status indicators based on account status notification information or account information received from system 140. An account status indicator may be associated with one or more accounts, and an account may be associated with one or more account status indicators. The one or more accounts may be associated with a single user 110. Alternatively, the one or more accounts may be associated with one or more users 110. In one embodiment, an account status indicator may represent information associated with one or more accounts provided by system 140 and/or business entity 160 and associated with one or more users (e.g., user 110).

In certain embodiments, an account status indicator may reflect the status of one or more account parameters of one or more accounts, such as an account balance, account usage, credit balance, one or more thresholds associated with such parameters, etc. In certain aspects, an account status indicator may be a visual indicator, an audio indicator, and/or a tactile indicator (e.g., a vibrate feature). For example, an account status indicator may include a graphical representation that visually reflects the status of one or more parameters of one or more accounts. Examples of graphical account status indicators may include icons that are displayed on an interface of a display device, such as a display of a mobile device (e.g., client device 104). The icon may take the shape of an image corresponding to business entity 160 (e.g., corporate logo, or other representation). A graphical account status indicator may also include a status bar, dashboard type graphical images, glyphs, personal photos, and any other type of graphical representation that may be displayed on an interface. The graphical representations may be color coded, such that, for example, the account status indicator dynamically changes based on the status of one or more account parameters associated with one or more accounts. An audio account status indicator may include a sound or sequence of sounds, music, etc. that may be presented through a speaker of client device 104, for example. In one aspect, an audio account status indicator may dynamically change (e.g., change sound(s), music, etc.) based on the status of one or more account parameters associated with one or more accounts. The above examples are not limiting to the type, configuration, format, and representations of account status indicators consistent with the disclosed embodiments.

In certain aspects, system 140 may be configured to generate an indicator and send the indicator to client device 104. The generated indicator may represent information associated with one or more transaction accounts including past, present, predicted, predefined, or potential effective balances for the one or more transaction accounts. The generated indicator may also incorporate potential transactions affecting the one or more transaction accounts associated with user 110. The indicator may take the form of pictorial, audible, or tactile responses consistent with disclosed embodiments.

In one aspect, the disclosed embodiments may allow one or more account status indicators to be presented in a non-obtrusive manner. For example, the disclosed embodiments may allow one or more account status indicators to be presented without a user request for the status of one or more parameters of one or more accounts. For instance, client device 104 may be configured to automatically present an account status indicator reflecting the status of an account parameter for an account associated with user 110, such as updating the color, format, configuration, size, etc. of a graphical representation on an interface displayed on a display device of client device 104. Further, aspects of the disclosed embodiments may allow characteristic(s) of an account status indicator to reflect one or more account parameters in relation to one or more thresholds. As an example, a graphical account status indicator may change color or size, etc. when an account balance falls below, is equal to, or exceeds a determined balance threshold amount or a balance threshold range(s) (e.g., green, yellow, red).

The disclosed embodiments may also facilitate a presentation of account status indicators based on geographic position information associated with user 110 and/or client device 104. For example, client device 104 may be configured to present one or more of the account status indicators when system 140, and additionally or alternatively, client device 104, determines that a current geographic position of user 110 falls within a predefined geographic region or is disposed proximate to a predefined geographic location (e.g., a point-of-interest, a retailer, a bus stop or train station, etc.). In further aspects, system 140 (and additionally or alternatively, client device 104) may be configured to select an account status indicator for presentation based on a relationship between the account status indicator and a current geographic position of user 110. For example, system 140 and/or client device 104 may select, for presentation to user 110, an account status indicator associated a merchant's loyalty program when user 110 is disposed proximate to a physical location of the merchant. Other aspects of account status indicators are described herein and the above examples are not limiting to the disclosed embodiments.

FIG. 3A shows a flowchart of an exemplary account status notification configuration process 300A consistent with disclosed embodiments. In one embodiment, process 300A may be performed by system 140. System 140 may be configured to generate and provide access to a configuration process that allows a user (e.g., user 110) to configure and control how account status notifications are provided for one or more accounts. In one aspect, system 140 may generate one or more interfaces that enable user 110 to select and/or provide controls defining the type of account status indicator(s) that may be presented via client device 104 (e.g., select graphical indicators and/or audio indicators, etc.) System 140 may provide options in the form of menus, hyperlink selections, user-provided representations, etc. Further, system 140 may allow user 110 to define one or more threshold values that determine when and how one or more account status indicators will be presented.

Referring to FIG. 3A, in one embodiment system 140 may generate and provide account status notification configuration option(s) (step 310A). Account status notification configuration option(s) may include selections of account status indicator types and selections of account status notification parameter(s). For instance, user 110 may select, via the option(s), one or more account status indicators. System 140 may also allow user 110 to select one or more accounts to be associated with the selected one or more account status indicators. The selected one or more accounts may be account(s) associated with user 110 or may be one or more accounts associated with a different user (e.g., a family member, employee, etc.)

In response to the configuration option(s), user 110 may select and/or define one or more account status configuration option(s). System 140 may obtain the selected one or more account status configuration option(s) from client device 140 or other system associated with user 110 (step 320A). System 140 may associate the selected notification configuration option(s) with the user 110's selected one or more accounts (step 330A). Based on the determined account status indicator(s) and configuration option(s), system 140 may configure one or more notification rule(s) to apply to the one or more accounts and associated account status indicators identified by user 110 during the configuration process 300A (step 340A).

As explained, the disclosed embodiments may allow a user to configure the manner and way account status notifications may be determined, provided, and presented. For example, the disclosed embodiments may allow a user to customize the format and way an account status indicator changes when an update to the indicator is to occur. For instance, a user may select colors of graphical indicators for different status levels (e.g., green for above a threshold, red for below, etc.). In certain aspects, the disclosed embodiments may allow a user to choose one or more colors for the graphical indicators. As another example, the disclosed embodiments may allow a user to configure the notifications such that a graphical indicator, such as an icon, can change format or type. For instance, a user may, through the configuration process 300A, configure the notification for an account to allow an icon background to change to a selected picture from the user's photo album stored on client device 104 when the account status indicator is to be updated. In certain aspects, using symbols, glyphs, pictures, or other types of images to reflect certain status levels for one or more parameters of an account may provide increased security of the information should the account status indicator be viewed by another person viewing the display of client device 104 when the account status indicator is displayed. For instance, user 110 may configure a status notification for a first account such that a default icon image changes to a first image (e.g., picture of a family member) when a first account parameter is above a determined threshold (e.g., account balance is above or equal to $200). The default icon may also be configured to change to a second image when the first account parameter is below the determined threshold (e.g., account balance is below $200).

FIG. 3B shows a flowchart of an exemplary account status notification process 300B consistent with disclosed embodiments. In one example, system 140 may obtain transaction data associated with one or more transactions involving one or more of the selected one or more accounts identified in the configuration process 300A (step 310B). For example, user 110 may use a first account to purchase goods from one or more merchants. System 140 may receive transaction data associated with the purchase(s) from, for example, merchant systems associated with the merchant(s) involved in the transaction. The disclosed embodiments may also obtain transaction data in other ways. System 140 may perform an account status notification process based on the obtained transaction data (step 320B). In one embodiment, system 140 may determine changes to one or more parameters of the user's selected one or more account(s) based on the transaction data (e.g., determine updated balance(s), updated credit limit(s), etc.). Based on the results from that analysis, system 140 may execute software instructions that perform processes that apply the one or more notification rule(s) determined in process 300A. For example, depending on the type of notification that user 110 may have configured, system 140 may determine a current balance of a first account (e.g., a checking account held by user 110 or an account associated with a loyalty program in which user 110 participates) after one or more purchase transactions reflected in the obtained transaction data. System 140 may apply the rule(s) to compare determined current one or more account parameter(s) (e.g., balance, remaining usage, loyalty program points, etc.) against one or more threshold values or ranges to determine whether an account status indicator is to be generated or updated. Based on that analysis, system 140 may generate or update one or more account status indicator(s) associated with the account(s) under analysis (step 330B). System 140 may provide the generated or updated account status indicator(s) for presentation (step 340B). For example, system 140 may provide an updated account status indicator to client device 104 that is displayed on an interface of client device 104 without a user request for an account status.

In certain embodiments, system 140 may be configured to generate account status notification information that is used to generate account status indicator(s) at the client device 104. In another aspect, client device 104 may be configured to execute software processes that perform process steps 320B-340B based on account information provided by system 140. For example, in one embodiment, system 140 may perform account status notification process (step 320B) and provide notification information to client 104. Client device 104 may generate or update one or more account status indicator(s) based on the notification information and one or more configuration rule(s) defined during configuration process 300A. In another embodiment, client device 104 may obtain account information from system 140 (e.g., account balance information, usage data, etc.). Based on the account information, client 104 may perform an account status notification process (e.g., step 320B) and generate or update account status indicator(s) (e.g., step 330B) for presentation by client device 104 (e.g., step 340B).

FIG. 3C shows a flowchart of an exemplary process flow consistent with disclosed embodiments. The process flow of FIG. 3C shows exemplary operations and exemplary relationships between operations that may be performed by system 140 and a client device (e.g., client device 104). The disclosed embodiments are not limited to the exemplary operations and the relationships shown in FIG. 3C. Further, one or more of the operations and/or one or more relationships between the operations shown in FIG. 3C may be optional, not implemented, or performed in a different process relationship than that illustrated in FIG. 3O. For example, where client device 104 may be configured to generate or update account status indicators, or determine the status of one or more account parameters, system 140 may not be required to perform those operations for selected accounts. Further, in configurations where system 140 generates and provides account status indicator(s) to client device 104, the same operations may not be performed by client device 104.

FIG. 3D illustrates a flowchart of another exemplary process 300D for providing one or more generated or updated (from a previously generated) account status indicators for presentation by client device 104 consistent with disclosed embodiments. Exemplary method 300D may provide the functionality enabling client device 104 or server 142 of system 140 to generate or update an account status indicator for presentation by user device 104. In some aspects, system 140 may be configured to execute software instructions to obtain balance data associated with one or more accounts associated with user 110 (step 310D). System 140 may obtain the balance data from server 142, data repository 144, client device 104, or another system. As previously discussed, balance data may include customer data 144A, account data 144B, transaction data 144C, or any combination thereof. In another embodiment, client device 104 may be configured to obtain the balance data associated with one or more accounts associated with user 110.

System 140 may also be configured to calculate an account balance for one or more accounts associated with user 110 (step 320D). For example, system 140 may determine the account balances for a set of accounts that have been selected by user 110 during a configuration process (e.g., process 300A). System 140 may be configured to execute software instructions for calculating the account balance for certain accounts using the obtained balance data. In one embodiment, system 140 may select one or more portions of the balance data to compute an account balance for the associated one or more accounts. The disclosed embodiments are not limited to the portions of balance data used to calculate the account balance, nor are they limited in kind or number to the accounts that system 140 may process to determine account balance(s).

In certain embodiments, system 140 or client device 104 may calculate account balances for associated accounts using one or more factors. For exemplary purposes only, the present disclosure may refer to these types of account balances as effective account balances. Examples of effective account balances include account balances that may be calculated based on one or more past, present, predicted, predefined, or potential conditions. For example, in some embodiments, an effective account balance may consist of the actual balance of an account. In other embodiments, the effective account balance may use the actual account balance in conjunction with estimated expenses, payments, or potential purchases. In other aspects, the effective account balance may not use the actual account balance at all, and may instead use some combination of the above conditions consistent with the disclosed embodiments.

System 140 may be configured to determine whether to send an account status indicator to client device 104. As previously discussed, in certain embodiments, the account status indicator may reflect a status of one or more accounts associated with one or more users (e.g., user 110). In some embodiments, system 140 may determine whether to send the indicator to client device 104 based on whether a status of one or more account parameters of one or more accounts associated with one or more account status indicators has changed (step 330D). In some aspects, an existing account status indicator may change based on received the received balance data from step 310, one or more effective account balance(s) that may be calculated in step 320, or both. By way of example, system 140 may determine the account status indicator for a particular account has changed when the funds (or other type of account element) available in an account fall below, exceeds, and/or equal to below one or more threshold values (e.g., $200) or is within a range of threshold value(s) (e.g., $200 to $400).

If system 140 determines that the status for the account status indicator status has changed for one or more indicators, system 140 may be configured to send an updated indicator to client device 104 (step 340D). System 140 may be configured to execute software instructions for sending the updated account status indicator to device 104 based on whether the indicator status of one of the indicators has changed (e.g., step 330D). In other embodiments, as discussed above, system 140 may generate and provide account status notification information (e.g., account balance information, etc.) that client device 104 may use to generate or update the account status indicator for the associated account(s).

In other embodiments, system 140 may be configured to receive balance data (step 310D), compute one or more effective account balances (step 320D), determine whether the generate an updated account status indicator based on the effective account balance(s) (step 330D) and send the updated account status indicator to client device 104 (step 350D). In certain aspects, the disclosed embodiments allow client device 104 (or other system or device that receives the account status indicator) to automatically present the generated or updated account status indicator without any input from user 110, such as, for example, logging into an account and checking an account balance or other account parameter for the associated account.

In certain aspects, client device 104 may be configured to obtain the updated indicator from system 140 without any input from a user. For example, system 140 may push the account status indicator to client device 104 without a user request to obtain account information, status information, etc. Further, as mentioned, client device 104 may be configured to generate and/or update account status indicator(s) for one or more accounts associated with user 110. In one aspect, based on the updated account status indicator obtained from system 140, client device 104 may present the updated account status indicator (step 350D). Client device 104 may present the account status indicator visually or audibly depending on the configuration of the account status indicator defined during the configuration process 300A. Alternatively, system 140 may configure account status indicators using default indicators (graphical or audio).

FIG. 4 depicts an exemplary client device 104 consistent with certain disclosed embodiments. In one embodiment, client device 104 may be a smartphone with a display device having touchscreen capabilities via viewing pane 406. Client device 104 may be any type of computing device, however, and the representation of FIG. 4 is for exemplary purposes only. In the exemplary FIG. 4, client device 104 may include one or more viewing panes 406 that display on an interface one or more graphical representations, such as icon 402. In some aspects, icon 402 may comprise only a portion of the viewing pane 406 of client device 104 (e.g., as depicted in FIG. 4). In other embodiments, icon 402 may comprise the entire viewing pane 406 of client device 104. In yet other embodiments, icon 402 may comprise no portion of the viewing pane 406. Similarly, viewing panes 406 may constitute none, some, or all of one or more surfaces of client device 104.

In some embodiments, icon 402 may include one or more account status indicators 404 associated with one or more accounts. In other embodiments, icon 402 may represent an account status indicator. The number and type of indicators displayed within icon 402 may vary based on the configuration of the status notification aspects for one or more associated accounts, and/or based on the status of one or more account parameters that are monitored for status notifications. As described in exemplary embodiments below, for example, a user may configure the status notification for one or more accounts such that an account status indicator(s) is presented that alerts a change in one or more account parameters associated with the one or more accounts. As explained, the alert provided by the account status indicator may take the form of a tactile mechanism (e.g., a vibrate feature) or audio mechanism (e.g., music or sounds), in which case a pictorial representation of the indicator may be unnecessary. In other embodiments, icon 402 may graphically depict one or more account status indicators 404 depending on the status of the one or more account parameters for the one or more associated accounts.

For instance, account status indicator 404 may change based on balance data or effective account balances of one or more associated accounts.

Figure 5C:
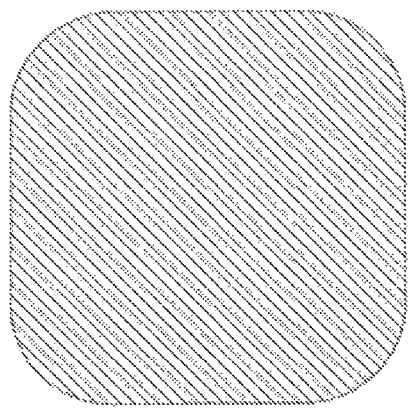
FIGS. 5A, 5B, 5C, 5D, 5E, 5F, 5G, and 5H depict exemplary pictorial balance indicators consistent with disclosed embodiments.
Figure 5F:
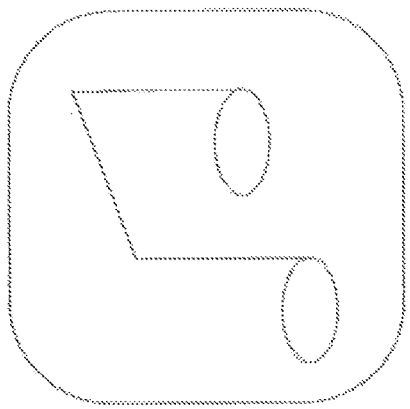
Figure 5B:
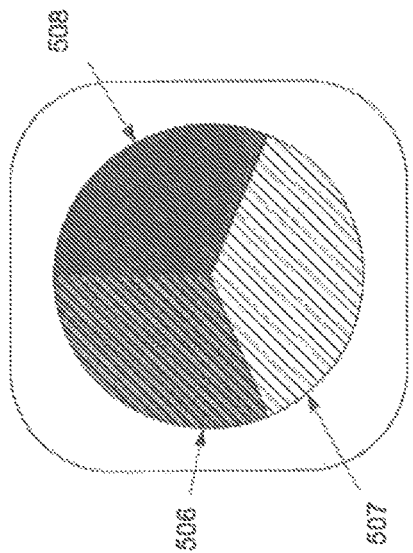
Figure 5E:
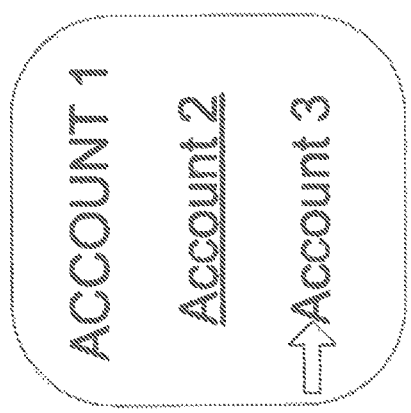
Figure 5A:
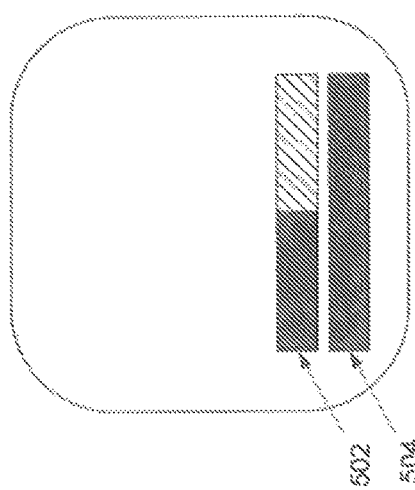

FIGS. 5A-5F illustrate exemplary graphical indicators and/or account status indicators. In accordance with certain embodiments, the manner, timing, and appearance of an account status indicator may depend in part on, for instance, the status of one or more account parameters associated with one or more associated accounts, indicator type, notification rule(s), etc. For example, FIG. 5A shows an exemplary icon including multiple account status indicators 502, 504 taking the form of colored status bars (e.g., status bar indicators). In certain aspects, account status indicators 502, 504 may be associated with the status of a respective account parameter of a single account. For instance, indicator 502 may reflect the status of an account balance and indicator 504 may reflect the status of a credit limit of the account. In other instances, indicator 502 may reflect a status of a balance of points available to user 110 through a corresponding loyalty program, and indicator 504 may reflect a number of points required for user 110 to obtain a reward associated with the corresponding loyalty program.

In other aspects, account status indicator 502 may reflect an account parameter of a first account and account status indicator 504 may reflect an account parameter of a second account. The first and second accounts may be associated with a single user (e.g., user 110), or the first account may be associated with a first user and the second account may be associated with different users. Further, the account parameter that is associated with the status reflected in the first and second account indicators may be the same account parameter (e.g., account balance or points balance), of the account parameter associated with status indicator 502 may be a different account parameter than the account parameter associated with status indicator 504. The disclosed embodiments may include more than two account status indicators each relating to account parameter(s) of a single or separate accounts. The disclosed embodiments may allow a user to configure the number, format, and associations of account status indicators in the configuration process 300A.

In certain embodiments, the properties of each account status indicator 502, 504 may change according to the status of the one or more account parameters associated with the indicators. In other aspects, the properties of each account status indicator 502, 504 may change according to the status of an effective account balance associated with the one or more accounts relating to the indicators. In one embodiment, the properties of a bar indicator may vary with respect to its indicator status derived from an indicator rubric incorporating one or more effective account balances. System 140 or client device 104 may be configured to execute software instructions that perform processes that enable user 110 to establish one or more rules comprising the indicator rubric governing the indicator status, such as during configuration process 300A. In some embodiments, the exemplary status bar indicators 502, 504 may change size (e.g., width, length, height, etc.), color (e.g., green, red, etc.), fill effects (e.g., solid, striped, dotted), and/or transparency (e.g., alpha) based on an indicator status derived from an underlying indictor rubric. For example, user 110 may wish to set up a bar indicator associated with a single account such that the bar appears red when the effective account balance of the account falls below a defined threshold. In this example, the user may further define the indicator rubric to color the bar indicator green when the effective account balance exceeds the threshold, turn yellow when the balance is within a certain range of the threshold, incorporate both effects, and the like.

The disclosed embodiments allow for different account status indicator formats, types, size, and color schemes that will be readily apparent to those skilled in the art. For instance, the disclosed embodiments may configure an account status bar indicator such that a color gradient is continuous instead of discrete (e.g., the entire visual spectrum between two defined points). Additionally or alternatively, the exemplary bar indicators 502, 504 may elongate or contract (e.g., a small or "empty" bar for low effective account balances and a long or "full" bar for high balances) depending on the underlying rubric (e.g., bar 502). The exemplary bar indicators 502, 504 may also be configured to span horizontally or vertically. Moreover, system 140 may provide processes that enable user 110 to configure the status notification such that multiple bar indicators appear in parallel or in series, such that, for instance, a single bar includes two bar indicators, each associated with their own accounts.

FIG. 5B illustrates another exemplary account status indicator consistent with disclosed embodiments. In FIG. 5B, the exemplary account status indicator may be in the form of a pie chart ("pie indicator") whose properties may vary according to one or more associated notification rules, indicator rubrics, and/or statuses of one or more account parameters of one or more associated accounts. As discussed in reference to FIG. 5A, user 110 may establish one or more notification rules comprising the indicator rubrics governing the presentment of the exemplary account status indicator. In some embodiments, a pie indicator, or a portion of the pie indicator, may change color (e.g., green, red), fill effects (e.g., solid, striped, dotted), relative size, and/or transparency (e.g., alpha) based on the status of one or more account parameters, such as, for example, an account balance, a balance of points available through a loyalty program, an effective balance of the accounts, an effective balance of a loyalty program account (e.g., an effect of a potential purchase of a product on the loyalty program account), relative size of the included indicators. The indicator may be colored, filled, sized, and shaded in any of the manners previously described.

Taking FIG. 5B as an example, during the configuration process 300A, a system 140 may perform processes that enable user 110 to define three account status indicators in a pie indicator arrangement, where each portion of the pie indicator arrangement is associated with a single account, or each portion may be associated with a separate account, or two portions may be associated with a single account and the third associated with a different account. In the example shown in FIG. 5B, the user may have defined each status indicator to comprise equal areas of the pie indicator, although the user need not define the pie indicator in this way. In this example, the user may elect to color or shade each of the account status indicators included in the pie status indicator based on preferences, notification rules, rubrics, etc. that take into account one or more account parameters (e.g., effective account balances). As shown in FIG. 5B, for example, each account status indicator 506, 507, 508 in the pie indicator may have its own coloring and/or shading scheme that may change based on a status of one or more accounts associated with a respective account status indicator. In addition, in one aspect, the pie indicator may be included in an icon.

FIG. 5C illustrates another exemplary account status indicator icon consistent with certain embodiments. In this embodiment, the account status indicator may be included in an icon such that it encompasses the entire or a portion of the background of the icon (e.g., background indicator). In some embodiments, the color, fill effects, and/or transparency of the background indicator may vary according to the status of one or more parameters associated with an account relating to the indicator. In certain aspects, system 140 may be configured to allow user 112 to select the color of the background indicator (e.g., red, green, etc.) to be used when a notification status is to be provided based on a status of one or more parameters of the associated account(s), such as an effective balance, balance data, loyalty program data, current or remaining usage data, etc.

Figure 5D:
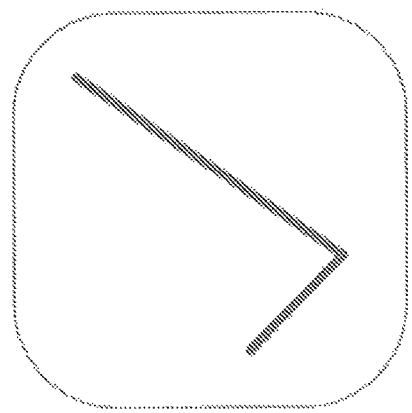

FIG. 5D illustrates another exemplary embodiment of an account status indicator consistent with certain embodiments. The disclosed embodiments may provide an account status indicator in the form of a picture (picture indicator), symbol (symbol indicator), or glyph (glyph indicator). FIG. 5D shows an example of a glyph indicator. In certain aspects, properties of the glyph indicator (e.g., colors, animation, size, shape, type, etc.) may change according to one or more account parameters of one or more associated accounts, such as effective account balances. In some embodiments, the glyph indicator may change between indicator types. This feature is not unique to glyph indicators as the disclosed embodiments may allow any type of account status indicator to be replaced with a second type of account status indicator as a way of reflecting a status of one or more account parameters of one or more accounts (e.g., switch from status bar indicator to background indicator when the status of an account parameter triggers a notification). For example, a glyph indicator image (e.g., check mark, large "X," happy face, cloud, thunderbolt, thumbs up, fuel gauge ticker, stop sign, etc.) or its properties (e.g., size, shape, color, transparency, orientation, position, animation, etc.) may change based on, for example, one or more notification rules and/or account status notification information. For example, user 110 may define a glyph indicator in such a way as to display a green check mark when an associated effective account balance of a monitored account exceeds or equals a threshold value (e.g., a threshold balance of a checking or savings account, or a threshold balance of points associated with a loyalty program) and display a red "X" when the effective account balance fall below the threshold value.

FIG. 5E shows an exemplary account status indicator consistent with disclosed embodiments. The indicator of FIG. 5E may be colored text (e.g., text indicator) that may change based on the status of one or more parameters associated with one or more accounts. A text indicator can include a single line of text that is associated with one account, or a text indicator may include multiple account status indicators in the form of lines of text that each are associated with one or more different parameters of a single account, or associated with one or more different accounts. For example, in one aspect, each line of text of the text indicator of FIG. 5E may reflect an account status indicator associated with one or more accounts, each with their own account parameters, such as effective account balances. One or more properties of the text may change according to, for example, the effective account balances of the associated accounts, which may be defined by one or more notification rules. In some embodiments, the text may change its font, size, capitalization (e.g., all caps, small caps), style (e.g., bold, underline, italic, etc.), color, transparency, or accompanying glyph as governed by the notification rules, which may be configured by a user during configuration process 300A.

While the foregoing discussion describes account status indicators as visual indicators, the disclosed embodiments may also implement other types of indicators that may consist of nonvisual cues such as musical tones, songs, vibration, or other non-pictorial elements. The disclosed embodiments may allow client device 104, for example, to present such indicators based on the same criteria set forth for visual indicators (e.g., notification rules, status of account parameter(s), etc.). In certain aspects, nonvisual indicators may be presented with visual indicators. For example, FIG. 5F illustrates a visual indicator displaying a musical note in an icon. The note may indicate, for instance, the indicator is set to present certain nonvisual tones or music based on statuses of account parameters. When a nonvisual indicator is presented, client device 104 may be configured to present a visual indicator at the same time to provide multiple mechanisms to notify a user of a change in status of one or more account parameters for one or more accounts. In some embodiments, client device 104 may not display any indication of a nonvisual indicator at all. For example, a nonvisual indicator may alert user 110 of a changed indicator status by playing a tone, playing a certain song, playing different tones of different lengths, vibrating in different durations and amplitudes, and the like.

Moreover, while the foregoing discussion described the various indicator forms separately, the present disclosure also contemplates combining any number of indicator types together (e.g., the glyph and text indicators of FIG. 5E). For example, a user could establish a bar indicator, pie indicator, background indicator, glyph indicator, and text indicator simultaneously. In such embodiments, one or more of the account status indicators may correspond to one or more accounts.

Returning to FIG. 4, user 110 may interact with icon 402 in response to, for example, the account status indicator 404. In some embodiments, if account status indicator 404 reflects a particular account status (e.g., a red bar for a bar indicator), the user may interact with icon 402 to obtain additional information and initiate additional follow-on processing. For example, user 110 may notice a bar indicator 404 is red, and such indication may signify that an effective account balance for one or more associated accounts have fallen below a defined threshold as disclosed herein. In certain embodiments, the user may then interact with the icon to perform a variety of functions, such as opening a new account, extending an account balance, viewing account transaction history, or accessing and participating in a configuration process to define or change properties, rules, and associations of accounts with indicators, etc. (such as the configuration process 300A). It should be appreciated that user 110 may interact with icon 402 for any reason, and need not be motivated by a particular account status indictor 404.

For example, client device 104 may perform follow-on processes in response to the user's selection of the notification icon requesting input from the user. In some embodiments, these requests may arise via interface(s) allowing the user to assign an account status indicator to one or more accounts, change an underlying indicator rubric, change rules that affect the balance calculation method for associated accounts, and any other such variable change consistent with the disclosed embodiments. This may allow user 110 to view, inspect, change, or cancel one or more parameters, or value derived from one or more parameters (e.g., an indicator rubric), in real-time using client device 104. For example, a user may physically press icon 402 to view transaction history associated with one or more accounts, change an indicator rubric to extend an account balance, change an indicator type or status, or affect any value derived from one or more account parameters. In some embodiments, such follow-on processing may be performed by client device 104, or a server 142 associated with system 140, or both.

The disclosed embodiments allow one or more users to be associated with one or more accounts. Further, the disclosed embodiments allow one or more accounts to be associated with one or more account status indicators. The one or more account status indicators may correspond to one or more account parameters (e.g., an effective account balance) of its one or more corresponding accounts. The one or more account status indicators may also be associated with one or more indicator rubrics, which in one example may define an indicator status based on the effective account balances of the associated accounts. In certain embodiments, the effective account balances of the associated accounts may relate to past, present, predicted, predefined, and potential transactions.

Figure 5G:
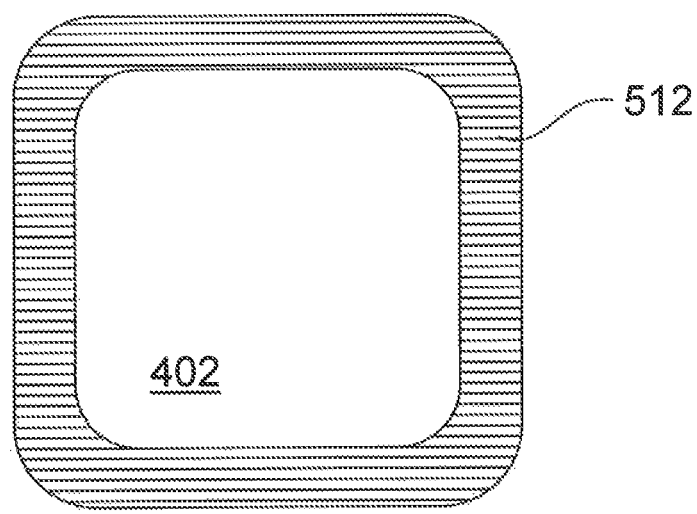
Figure 5H:
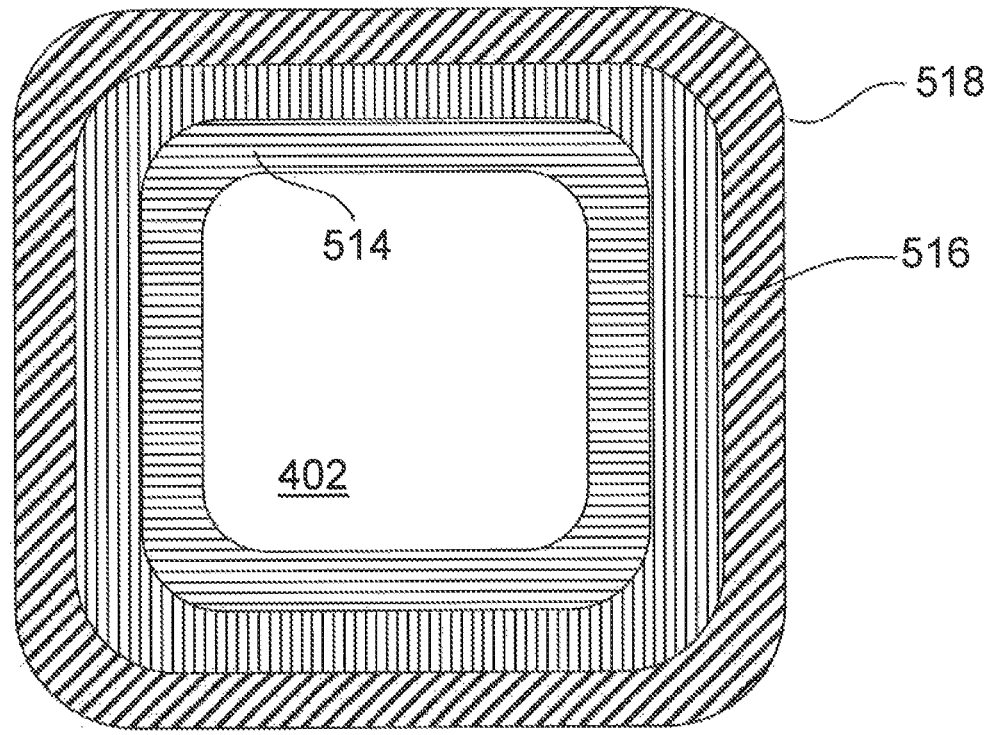

Furthermore, the disclosed embodiments are not limited to displayable icons (e.g., icon 402 of FIG. 4) that incorporate one or more status indicators within corresponding icon boundaries (e.g., account status indicators 502 and 504 of FIG. 5A and/or account status indicators 506, 508, and 510 of FIG. 5B). In additional embodiments, client device 104 may execute software processes to present, to a user (e.g., through viewing pane 406 of FIG. 4), an icon surrounded by one or more account status indicators that reflect statuses of account parameters associated with one or more accounts. For example, FIG. 5G illustrates an exemplary account status indicator 512 in the form of a "ring" indicator that surrounds an outer boundary of an icon 402, and FIG. 5H illustrates exemplary account status indicator 514, 516, and 518 that collectively establish concentric ring indicators surrounding the outer boundary of icon 402. In certain aspects, and as described above in reference to account status bar 502 of FIG. 5A, account status indicators 512, 514, 516, and/or 518 may reflect the status of an account parameter of a single account, or may reflect statuses of account parameters of multiple accounts (e.g., a total balance, total credit limit, etc., of multiple accounts held by user 110).

By way of example, account status indicators 512, 514, 516, and/or 518 may reflect the status of an account balance of a checking account held by user 110, a credit limit of a credit account held by user 110 (e.g., a Visa™ card issued by a financial institution associated with business entity 160), a balance of accrued points associated with a loyalty program in which user 110 participates (e.g., a loyalty program sponsored by a merchant), and/or a number of loyalty points remaining until user 110 qualifies for a benefit or reward provided by the loyalty program. Further, as described above, client device 104 may be configured to modify one or more visual characteristics of account status indicator 512, 514, 516, and 518 to indicate a change in the status of the account parameter(s) associated with the indicators (e.g., an actual or effective balance of a checking, credit, and/or loyalty program account). In some instances, the visual properties of account status indicator 512, 514, 516, and 518 may vary with respect to its indicator status derived from an indicator rubric incorporating one or more of the actual or effective account balances (e.g., as established by user 110 using the exemplary processes described above). In some embodiments, the exemplary status indicators 512, 514, 516, and/or 518 may change size (e.g., width, length, height, etc.), color (e.g., green, red, etc.), fill effects (e.g., solid, striped, dotted), and/or transparency (e.g., alpha) based on a change in an indicator status derived from an underlying indictor rubric.

In some aspects, user 110 may, through a graphical user interface (GUI) presented by client device 104, associate account status indicator 514 with an effective balance of a checking account, account status indicator 516 with an effective balance of a credit card account, and further, associate account status indicator 518 with an effective balance of a loyalty program account. In some instances, user 110 may establish threshold balances for each of the checking, credit card, and loyalty programs accounts, and may establish notification rules that instruct client device 104 (and/or system 140) to color account status indicators 514, 516, and/or 518 green when a corresponding one of the effective account balances exceeds the corresponding threshold balance, and red when the corresponding effective balance falls below the threshold balance.

Although described in terms of one or three status indicators, the disclosed embodiments may enable user 110 to establish, through a corresponding GUI, notification rules that configure client device 104 to present any additional or alternate number of account status indicators linked to corresponding account parameters of accounts held by user 110. In certain aspects, through the GUI, user 110 may add or remove "layers" of concentric account indicators to produce customized notification rules that enable user 110 to make informed decisions regarding potential purchases based on impacts of the potential purchase on various aspects of user 110's current financial situation.

FIG. 6 depicts an exemplary relationship arrangement 600 regarding an exemplary account status indicator implementation, consistent with disclosed embodiments. In one example, system 140 may be configured to obtain balance data 606 comprising all or a portion of customer data 144A, account data 144B, and/or transaction data 144C for one or more accounts 620 that may be associated with user 110. Balance data 606 may include information relating to an account batch 610, comprising one or more user accounts 620 (signified through phantom lines for a second transaction account 620 in FIG. 6). The one or more accounts may be associated with one or more account status indicators 404 that may be configured and operate in a manner consistent with the disclosed embodiments. While FIG. 6 depicts at two accounts 620 and indicators 404, the disclosed embodiments are not limited to these configurations. Indeed, the disclosed embodiments may be configured to allow user 110 to be associated with any number of accounts 620 that may relate to other users, and those accounts may be associated with any number of indicators 404.

In the exemplary arrangement 600, account 620 may associate with information contained in balance data 606. In some embodiments, account 620 may include account balance data 626. Account balance data 626 may include any subset of customer data 144A, account data 144B, and transaction data 144C (e.g., balance data 606) related to a particular account 620. The account balance data 626 may vary according to the type of associated account. For example, for a particular account 620, account balance data 626 may include information signifying the type of account (e.g., checking, savings, credit card, securities account, college meal plan, store credit, loyalty program, or any such account previously discussed), data associated with the account (e.g., current balance, pending transactions, transaction history, other historical data, account number, routing number, card number, expiration date, etc.), data associated with the owner or accessor of the account (e.g., login information, security measures, etc.), and/or transaction data related to potential purchases as explained below.

Account 620 may also associate with one or more rules that may relate how to calculate an effective account balance for the account (e.g., balance calculation method 624 in FIG. 6). System 140 may perform process that generate and apply the rules and comprising balance calculation method 624. In one aspect, system 140 may provide interfaces over network 120 to client device 104 to allow user 110 to define one or more of these rules. Alternatively, client device 104 may perform such processes.

In some embodiments, balance calculation method 624 may include software instructions that when executed by a processor perform balance calculation processes consistent with the disclosed embodiments. In one example, balance calculation method 624 may comprise a straight balance determination. In such embodiments, the effective account balance may reflect a current available balance for account 620. In other embodiments, balance calculation method 624 may provide effective balances, such as predictive and intelligent balances that are determined through predictive and intelligent balance calculation processes.

For example, in some embodiments, balance calculation method 624 may include software-based processes that when performed obtains and analyzes information relating to scheduled future expenses of user 110, (e.g., an upcoming trip, a wedding, a future purchase of a good or service such as a car, etc.), periodic expenses of user 110 (e.g., a mortgage, average weekly grocery bills, average monthly utility costs, annual insurance premiums, rent, etc.), future or periodic wages or other payments relating to user 110 (e.g., a salary, a bonus, average periodic pay for hourly workers, annuity payments, etc.), and/or potential purchases of user 110. This information may be obtained directly from the user 110 via client device 104, through software processes executed on server 142 associated with system 140, or both. In some embodiments, for example, a user may input this information directly through processing systems associated with client device 104. Client device 104 or system 140 may then store the user's information consistent with the disclosed embodiments. Additionally or alternatively, system 140 may be configured to obtain information associated with an account for user 110 without input from the user. In some aspects, system 140 may be configured to obtain this information for an account it itself provides, an account provided by another system, or the like. System 140 may also be configured to send instructions to client device 104 designed to query user 110 for such information without prior affirmative input from the user.

In some aspects, for example, user 110 may associate with a checking account associated with system 140 for business entity 160 (e.g., a financial institution). System 140 of business entity 160 may be configured to analyze the purchasing habits of user 110 over a period of time (e.g., a flat duration, weekly, monthly, user-defined, etc.). The system 140 may analyze a variety of aspects of the user's spending habits including the expenditures' source (e.g., by merchant), type (e.g., by product or kind of expense, e.g., groceries, rent, mortgage, etc.), amount, location, or similar characteristic. Based on the results of its analysis, system 140 may be further configured to calculate a user's expected expenses resulting from certain sources, certain expenditure types, certain geographical locations, or all sources combined. In this example, for instance, system 140 may calculate a user's monthly expenditures on groceries for which user 110 uses the checking account associated with financial institution 160. User 110 may then use the value of these calculated expenses as she defines her balance calculation method 624. In other embodiments, processes running on client device 104 may be configured to calculate these expenses. Additionally or alternatively, user 110 may provide the information directly to client device 104 without the need of background processing.

As an illustrative example of some aspects of the disclosed embodiments, user 110 may specify she wishes to calculate an effective account balance for account 620 incorporating both her mortgage payment and salary information in addition to the current account balance. In such an example, the effective account balance for user 110 may reflect the existing actual balance of an associated account and a future account balance after certain determined periodic (e.g., weekly, monthly, semi-monthly, etc.) expenses and wages. For instance, system 140 may perform processes that obtain transaction information associated with associated account(s) for user 110 to determine one or more expenses that may be configured for automatic payment (e.g., configured bill pay mechanisms in online banking portals). As another example, system 140 may analyze historical transaction data for the associated account(s) to identify periodic expenses (e.g., similar payments made to a mortgage lender entity, utility payments, etc.) and determine an average monthly expense that applies to an associated account for user 112. Based on the determined expenses, system 140 may calculate an effective balance for the account by subtracting the determined expenses from the actual balance. The disclosed embodiments may allow the account status indicator(s) for the account to reflect a status of the calculated effective balance, thus providing user 112 with a status of the account that takes into consideration known expenses to be withdrawn from the account. In one embodiment, a status indicator may simultaneously show the status of an actual balance and effective balance of an account, through for example, a status bar indicator.

The disclosed embodiments may be configured to enable user 110 or system 140 to specify one or more notification rules that may direct the disclosed processes to determine statuses of one or more account parameters (e.g., actual and/or effective balances, etc.), not limited in kind, amount, and/or periodicity. The disclosed embodiments may allow the configuration of such rules to occur automatically (e.g., as a default background process performed by system 140 (e.g., during configuration process 300A)), manually (e.g., user 110 inputs the configuration input information), or some combination thereof. Thus, as explained, for example, system 140 may be configured to determine the average periodic expenses for user 110 given the user's historical expense information (e.g., a mortgage, grocery bills, utility bills, etc.). In one embodiment, system 140 may do so regardless of whether historical expenses are periodic (e.g., a user may not purchase groceries in a particular week). In one embodiment, user 110 may have control through configuration process 300A what kind of predictive purchases and payments may be considered for performing a balance calculation method 626 (e.g., user 110 could override results from a balance calculation process performed by system 140).

In certain embodiments, the status notification aspects of the disclosed embodiments may provide account status notifications based on potential transactions (e.g., potential purchase transactions by user 110 that may affect an account balance). In one embodiment, for example, balance calculation method 624 may determine an effective balance (e.g., 620) based on information relating to one or more potential transactions. In one aspect, this information may subsist in some portion of account balance data 626 that may be derived from balance data 606, which in turn may be derived from transaction data 1440. In one embodiment, client device 104 may be configured to communicate transaction data 1440 to system 140 in contemplation of potential transactions. Such communication may occur over any communications network (e.g., communications network 120 of FIG. 1). Contemplated potential transactions may include any kind of transaction previously discussed in relation to transaction data 144C including, but not limited to, potential purchases, fund transfers, bill payments, security transactions, and so on.

In some embodiments, client device 104 may be configured to receive, track, and transmit transaction data 144C to system 140 via any network previously discussed. In some embodiments, for example, client device 104 may be configured to scan a bar code for one or more particular goods at a physical retailer and relay the relevant information (e.g., location, cost of the goods, accounts affected, etc.) to system 140. In these embodiments, client device 104 may be configured to obtain such transaction data using any method known to those skilled in the art (e.g., NFCs, optical scanners, Bluetooth communications, etc.). In another embodiment, a user may instead input such information directly into client device 104 without the use of a scanner or code reader.

Moreover, client device 104 may be configured to assimilate and aggregate several potential transactions together, even transactions affecting different accounts 620. For example, user 110 may aggregate multiple potential purchase transactions affecting a first account with a funds transfer for a second account to determine the effect, if any, on the effective balances on those accounts as well as their effects on one or more associated account status indicators 404. The disclosed embodiments may be configured to allow user 110 to incorporate any number of potential transactions associated with any number of accounts. Such transactions, if any, may adjust the calculated effective account balance for one or more accounts 620, which may in turn change the indicator status 644 of associated indicators 620.

FIG. 6 also illustrates how one or more accounts 620 may be associated with one or more account status indicators 404 (e.g., a first account relates to two different indicators). Similarly, an account status indicator 404 may associate with one or more accounts 620 (e.g., the second indicator relates to two accounts). An account status indicator 404 may further associate with one or more properties. In one example, indicator 404 may include an indicator type property 642. Indicator type 642 may include information signifying the form of the indicator when presented by client device 104, such as a bar indicator, a glyph indicator, or any combination of pictorial and nonvisual indicator types, such as those described in relation to FIGS. 5A-5F. Indicator type 642 may also include properties signifying how client device 104 presents the indicator 404 on client device 104 (e.g., the color of a bar indicator, the length of a vibration, a kind of music played, the pictures of a glyph indicator, the fill of a pie indicator, or any other configuration that may be assigned consistent with disclosed embodiments).

Indicator 404 may also include indicator status property 644. In one aspect, indicator status 644 may include information signifying a present status of an indicator 404. Indicator status information 644 may depend in part on the indicator type 642, underlying indicator rubric 646, effective account balances of related account(s) 624, other balance data 626, or other account data. For example, given an indicator rubric 646 consistent with disclosed embodiments, an indicator status may signify a bar indicator is colored green, a glyph indicator is a red "X," or any other such indicator status described in connection with FIGS. 5A-5F.

An account status indicator 404 may include an indicator rubric property 646. In one embodiment, an indicator rubric 646 may include information that defines a set of logical rules promulgating how to generate an indicator status 646 for a particular indicator type 642 given one or more account parameters, such as the effective account balance and/or balance data for account(s) 620 associated with indicator 404. The logical rules associated with indicator rubric 646 may be configured and applied automatically by system 140 when performing status notification processes consistent with the disclosed embodiments. The logical rules may be configured manually from user 110 during a configuration process (e.g., configuration process 300A). By way of example, one exemplary indicator rubric may, when processed by system 140 and/or client device 104, determine to set the color of a bar indicator to "green" when an effective account balance of an associated account exceeds or is equal to a threshold value. In another example, an indicator rubric may, when processes by system 140 and/or client device 104, change a glyph associated with a glyph indicator to a another format (e.g., a storm cloud image) if the sum of the effective account balances for all associated accounts drops below a threshold value, which may result from considerations of monthly expenses, income, and/or potential purchases associated with the account.

Consistent with the disclosed embodiments, rubric indicator 646 may provide a hierarchy of rules providing for multiple possible outcomes (e.g., multiple coloring schemes, several pictures, etc.). Furthermore, while embodiments of indicator rubric 646 may employ some aspect of the effective account balance for associated accounts, certain embodiments of the present disclosure may eschew the effective account balance entirely, generating an account status indicator from balance data (e.g., potential transactions, monthly expenses in relation to income, etc.).

Indicator 404 may also include an indicator refresh rate property 648, which may include information that is used to determine how often system 140 and/or client device 104 updates an account status indicator 404. Indicator refresh rate property 648 may be configured and applied automatically by system 140 when performing status notification processes consistent with the disclosed embodiments. In another example, indicator refresh rate property 648 may be configured manually from user 110 during a configuration process (e.g., configuration process 300A). In some embodiments, indicator refresh rate may depend on a certain amount of time (e.g., every ten minutes), a certain number of transactions or item purchases (e.g., after the user purchases five items), a certain amount of money spend (e.g., every $1,000, all purchases over $3,000, etc.), and the like. For example, user 110 may specify she wishes the notification processes consistent with the disclosed embodiments to check for an updated indicator status 644 every five minutes.

FIG. 7 illustrates a block diagram of exemplary data structures and relationships consistent with the disclosed embodiments. FIG. 7 shows an example of various aspects of how indicator rubrics 646 may generate indicator statuses 644 for indicators 404 associated with several accounts 620. FIG. 7 depicts an exemplary user associated with three accounts (e.g., a saving account, a checking account, and a student meal plan), each having their own balance calculation method 624. For example, in FIG. 7, the user may have elected to use the current balance of her savings account for that account's parameter (e.g., actual account balance). The balance calculation method 624 for the user's checking account and meal plans, however, may relate to other account parameters, such as expenditures that provide an effective account balance parameter. The effective balance for the checking account further contemplates expected monthly income.

Consistent with these exemplary settings, system 140 may determine that the account balance 626 for the savings account is $20,000 (e.g., the current balance). Similarly, system 140 may determine the effective account balance for the checking account is 9,800 (e.g., $10,000 current balance+$5,000 income−$3,000 average expenses−$2,200 potential purchases). As an example, the disclosed embodiments may obtain information that is used to adjust the parameter status assigned to the accounts for status notification. For example, the student meal plan shown in FIG. 7 assumes there are, for example, two months left in the current semester, although other aspects consistent with the disclosed embodiments may include any other relevant information from account balance data 626. The exemplary configuration of FIG. 7 also assumes the yearly allotment of meal plans for the user is 360 meals (resulting in thirty meals per month). Given a current balance of 100 meals, system 140 may determine that the effective account balance for the meal plan is 40 meals (100 current balance−2 months*30 meals/month).

In the example associated with FIG. 7, a single indicator 404 (Indicator 1) is associated with the savings account and is a bar indicator (defined via indicator type 642). System 140 and/or client device 104 may be configured to use account status Indicator 1's indicator rubric 646 to determine to set the color of the account status bar indicator to red if the account balance (AB) of the savings account drops below $5,000. Otherwise, the system colors the bar green. In the illustrated example, user account 1's balance exceeds $5,000, and thus the disclosed embodiments may set the indicator status 644 of the bar indicator to green.

Further in the exemplary configuration of FIG. 7, Indicator 2 associates with both user account 2 and account 3. In this example, Indicator 2 takes the form of a glyph indicator (indicator type 642). Under Indicator 2's indicator rubric 646, the glyph appears as a red "X" if either (1) the effective account balance of the checking account drops below $10,000 or (2) the effective account balance of the meal plan drops below ten meals. In this example, while the effective account balance of the meal plan (account 3) exceeds ten meals, the effective account balance for the checking account (account 2) is below $10,000 due in part to the potential purchases the user desires to make and identified in the "potential transactions" entry. Thus, in this example, system 140 and/or client device 104 may determine based on indicator rubric 646 that the appropriate glyph for indicator 2 comprises a red "X."

The information reflected in arrangement 700 may be obtained and/or determined by system 140 and/or client device 104, or any other computer system that performs processes consistent with the disclosed embodiments. The information, properties, etc. described in connection with arrangement 700 (and variations thereof) may be stored in one or more memories, accessed by one or more processors, and used by the one or more processors to perform processes consistent with the disclosed embodiments. Further, while FIG. 7 includes various exemplary calculations and properties that may be used by the disclosed embodiments to determine the status of an account and the type of relevant account status indicator 644, the disclosed embodiments are not limited to such configurations and relationships. Instead, the disclosed embodiments may implement other relationships and settings for providing account status indicators, may weigh other factors or information, may obtain and use other inputs, different timeframes, and the like.

In some aspects, system 140 may enable user 110 to specify (e.g., though a graphical user interface (GUI) presented by client device 104) threshold balances that facilitate system 140's determination of indicator statuses (e.g., status 644) based on corresponding indicator rubrics (e.g., rubric 644). In other embodiments, system 140 may establish a default threshold balance for accounts associated with one or more of the account status indicators. For instance, a financial institution may require user 110 to maintain a minimum balance in a checking account to avoid transaction fees. In certain aspects, system 140 may establish the required minimum balance as the default threshold balance for the checking account without requiring input from user 110. In further embodiments, system 140 may enable user 110 to establish a "window" that brackets a user-defined or default threshold balance values for purposes of determining the indicator statuses. For example, through the GUI presented by client device 104, user 110 may specify a threshold balance of $5,000 for user account 1 of FIG. 7, and may also specify a $250 window that brackets the threshold balance of $5,000. System 140 may, in some instances, establish a status of "green" for the bar indicator associated with user account 1 when the balance of user account 2 falls between $4,750 and $5,250.

In further aspects, the threshold balance specified by user 110 for a particular account (e.g., through the GUI presented by client device 104) may represent a budget established by the user over a corresponding temporal period (e.g., a week, month, a holiday season, etc.). For instance, user 110 may establish a budget of $1,000 for charges on a particular credit card account through the GUI presented by client device 104. Using the disclosed embodiments, system 140 and/or client device 104 may determine an indicator status based on a comparison of the recent charges on the credit card account against the establish budget, and may generate and present to user 110 an account indicator consistent with the determined indicator status (e.g., a red bar when spending exceeds the $1,000 budget or a green bar when spending falls below the $1,000 budget).

Further, although described in terms of a savings account, a checking account, and a student meal plan held by or associated with user 110, the data structures, relationships, and rubrics of FIG. 7 are not limited to such exemplary types of accounts or number of accounts. In some instances (not illustrated in FIG. 7), accounts 620 may also include a fourth user account associated with loyalty program in which user 110 participates. As described above, user 110 may elect, though a graphical user interface (GUI) presented by client device 104, a current balance of available rewards points as an account parameter associated with the loyalty program account. Based on user 110's input through the GUI, system 140 may establish a balance calculation method (e.g., method 624) for the loyalty program account that accounts for a potential and recurring transaction (e.g., potential transaction 626) in which user 110 may exchange 1,000 loyalty points to obtain access to a streaming content service (e.g., Netflix™, etc.). System 140 may further establish, based on user 110's input through the GUI, that user 110's loyalty program account accrues an average of 1,500 points each month (e.g., income 626) based on purchase transactions at participating retailers.

Furthermore, and as described above, system 140 may determine that user 110's loyalty program account is associated with a current balance (e.g., balance 626) of 3,325 points, and may compute an effective account balance for user 110's loyalty program account of 3,385 points. In certain aspects, user 110 may, through the GUI, associate the loyalty program account to an existing indicator (e.g., "Indicator 2" of FIG. 7), and establish an rubric (e.g., indicator rubric 646) specifying that the glyph appears as a red "X" if either (1) the effective account balance of the checking account drops below $10,000, (2) the effective account balance of the meal plan drops below ten meals, or (3) the effective account balance of the loyalty program account falls below 1,000 points. User 110's linkage of the threshold loyalty point balance of 1,000 points to Indicator 2 may, in some instances, ensure that user 110's checking account includes funds sufficient to complete the monthly transaction for the streaming content service in the event that the loyalty program account balance is insufficient to complete the transaction. The disclosed embodiments are, however, not limited to such exemplary links and associations, and in other embodiments, user 110 may associate the balance of the loyalty program account (or any other parameters describing the loyalty program account) with user indicator 1 or to any other existing indicator linked to other accounts 620. Further, in other aspects, user 110 may associate the balance of the loyalty program account to a new indicator and establish a corresponding indicator rubric.

In certain exemplary embodiments, client device 104 may be configured to present icons that include multiple account status indicators associated with parameters of corresponding accounts. For example, client device 104 may be configured to present, to user 110, a first account status indicator 502 reflective of an account parameter of a first account and a second account status indicator 504 may reflect an account parameter of a second account within an icon (e.g., icon 402 of FIG. 4). In some aspects, client device 104 may configured to present account status indicators 502 and 504 automatically without receiving input from user 110 requesting presentation of account status indicators 502 and 504.

In further embodiments, system 140 and/or client device 104 may be configured to automatically generate, present, and/or modify one or more of account status indicators 502 and 504 based on a current or prior geographic position of user 110. For instance, and as described above, account status indicators 502 and 504 may be associated logical rules (e.g., notification rules) that establish a correspondence between presentation statuses of account status indicators 502 and 504 (e.g., a type of indicator, visual, tactile, and/or audible characteristics of the indicator type, etc.) and one or more account parameters. In other aspects, the notification rules may also specify particular geographic regions or locations associated with account status indicators 502 and 504, and further, may establish the presentation statuses of account status indicators 502 and 504 based on a current or prior geographic position of user 110. The notification rules may also establish a link between the current or prior geographic position of user 110 and a generation, presentation, and/or modification of account status indicators 502 and 504 by client device 104 and/or system 140.

For example, account status indicator 502 may reflect an actual or effective account balance of a checking account held by user 110. In some instances, a notification rule associated account status indicator 502 may associate account status indicator 502 with geographic regions that include a shopping mall and other clusters of retail outlets regularly patronized by user 110. The indicator rubric may also stipulate that client device 104 presents account status indicator 502 to user 110 when a current geographic position of client device 104 falls within the associated geographic regions or within a threshold distance of the associated geographic regions.

Further, by way of example, account status indicator 504 may reflect an effective balance of a transportation credit account that enables user 110 to access modes of public transportation (e.g., bus, subway, train, etc.). In certain aspects, a notification rule for account status indicator 504 may associate account status indicator 504 with geographic regions that include a train station, subway station, bus station, or other predetermined geographic locations at which user 110 may access public transportation. As described above, the notification rule may specify that client device 104 presents account status indicator 504 to user 110 when a current geographic position of user 110 falls within or within a threshold distance of the associated geographic regions or locations (e.g., client device 104 is disposed within subway station, or within 100 meters of the subway station).

In other embodiments, a device of a proximity system (e.g., an iBeacon™ device) may be disposed within or near a train station, subway station, bus station, and/or an individual mode of public transportation (e.g., at a point-of-sale (POS) terminal on a bus). Client device 104 may be configured to detect the proximity detection device, and in some aspects, the notification rule for account status indicator 504 may specify that client device 104 presents account status indicator 504 to user 110 in response to the detected proximity system device.

In some instances, system 140 may determine a current geographic position of user 110 based on positional data received from client device 104 (e.g., GPS data transmitted to system 140 from client device 104 in response to a completed transaction, and/or a required update to system 140) or from a third-party system associated with client device 104 (e.g., a mobile telecommunications provider). In certain aspects, system 140 may obtain the notification rules associated with account status indicators 502 and 504. Based on a comparison of the current geographic position and the notification rules, system 140 may determine whether to instruct client device 104 to present or modify a presentation of account status indicator 502 and/or account status indicator 504. In other instances, client device 104 may determine the current geographic position based on positional data obtained from the GPS, and may compare the current geographic position with the notification rules of account status indicators 502 and 504. Based on the comparison, client device 104 may determine whether to generate, present, and/or modify a presentation of account status indicator 502 and account status indicator 504.

Further, in additional aspects, client device 104 may be configured to detect a proximity system device associated with one or more of account status indicators 502 and 504 (e.g., an iBeacon™ device disposed on a bus fundable by user 110's transportation credit account). By way of example, and responsive to the detected proximity system device, client device 104 may be configured to generate, present, and/or modify a presentation of account status indicators 502 and/or account status indicator 504 in accordance with the notification rules.

By way of example, system 140 may determine that client device 104 is disposed within a shopping mall that, based on the corresponding notification rule, would trigger a presentation or a modification of account status indicator 502. In response to the determination, system 140 may generate and transmit account status notification information to client device 104 that instructs client device 104 to present account status indicator 502 to user 110, or alternatively, to modify a portion of previously presented account status indicator 502. In other aspects, client device 104 may determine that its current geographic position falls within the shopping mall, and based on the notification rule, client device 104 may generate, present, and/or modify account status indicator 502 to user 110 in accordance with account status notification information received from system 140.

In further embodiments, system 140 (and additionally or alternatively, client device 104) may continue to monitor the geographic position of client device 104 and may determine that the user 110 is currently a portion of the shopping mall that includes a subway station. The notification rules may, for example, indicate that user 110's position within the subway station triggers a presentation or modification of account status indicator 504. Based on the notification rules, and using processes consistent with the disclosed embodiments, system 140 may generate and transmit account status notification information to client device 104 that instructs client device 104 to present account status indicator 504 to user 110, or alternatively, to modify a portion of previously presented account status indicator 504. Alternatively, client device 104 may generate, present, and/or modify account status indicator 504 to user 110 in accordance with account status notification information received from system 140 and using processes consistent with the disclosed embodiments. Account status indicator 504, as presented or modified by client device 104, may indicate an effective balance of user 110's transportation credit account that reflects a potential debit of a subway fare. Further, in some embodiments, client device 104 may present or modify account status indicator 504 in response to the change in geographic position without modifying a presentation of account status indicator 502.

Through the disclosed embodiments, client device 104 may execute software processes that present account status indicators to user 110 based on a correspondence between a current geographic position of client device 104 and geographic regions or locations linked to the account status indicators. In certain aspects, client device 104 may present a graphical user interface (GUI) that enables user 110 to establish a link between a specific geographic region and one or more of the account status indicators. Client device 104 may store information associated with the established link to define portions of the notification rules for the account status indicators, and additionally or alternatively, may transmit the information across network 120 to system 140, which may generate the corresponding portions of the notification rules.

In other aspects, system 140 may execute software instructions that establish associations between account status indicators and corresponding geographic regions without input from user 110. For example, system 140 may identify an account status indicator associated with a credit card account held by user 110. In some instances, system 140 may access transaction data identifying purchase transactions involving the credit card account (e.g., within stored transaction data 144C), may identify retailers associated with the purchase transactions, and further, may determine geographic locations of the identified retailers. System 140 may, for example, link the determined geographic locations to the account status indicator associated with a credit card account, and additionally or alternatively, link geographic regions that include clusters of the determined geographic locations the account status indicator associated with a credit card account. As described above, the linkage of the geographic regions and locations to the account status indicator may define at least a portion of the notification rule associated with the credit card account indicator.

Further, by way of example, system 140 may identify an account status indicator corresponding to an account associated with a loyalty program in which user 110 participates. The loyalty program may, for example, be sponsored by a merchant, and system 140 may obtain information identifying the particular loyalty program account (e.g., account number, points balance, etc.) from a corresponding data repository (e.g., stored account data 144B). In some instances, system 140 may identify geographic positions of retail locations of the merchant, and may associate the identified geographic positions to the account status indicator associated with a loyalty program account. The association between of the geographic regions and locations to the account status indicator may define at least a portion of the notification rule associated with the loyalty program account indicator.

Through the disclosed embodiments, system 140 and/or client device 104 may selectively generate, present, and/or modify account status indicators based on detected changes in user 110's current geographic position. In additional aspects, system 140 and/or client device 140 may be configured to selectively modify an account type associated with the indicator based on a geographic location of user 110.

By way of example, user 110 may hold a checking account issued by a financial institution (e.g., business entity 160), may participate in a loyalty program sponsored by a merchant having multiple retail locations, and may hold a transportation credit account loaded with funds or tokens facilitating a use of public transportation. In an embodiment, a notification associated with an account status indicator may be associated with a default account type (e.g., user 110's checking account), and system 140 and/or client device 104 may be configured to modify the default account type based on user 110's current geographic position and in accordance with the notification rules.

For instance, the notification rules may establish the loyalty program account as the account type for the account status indicator when user 110's current geographic position falls within a threshold distance of a retailer location of the merchant. Further, by way of example, the notification rules may establish the transportation credit account type as the account type for the account status indicator when user 110's current geographic position falls within the threshold distance of a subway or bus station (or in response to a detection of a proximity system device associated with subway or bus station). In certain aspects, user 110 may establish portions of the notification rules (e.g., threshold distances or geographic region) through a corresponding GUI presented by client device 104, or system 140 may establish portions of the notification rules programmatically and without input from user 110 (e.g., based on a geographic analysis of prior purchase transactions).

By way of example, system 140 may receive positional data from client device 104, and may determine that a current geographic position of user 110 falls within the threshold distance of a retail location of a merchant that sponsors user 110's loyalty program account. In response to the determination, system 140 may transmit data associated with the loyalty program account to client device 104, which modify the account status indicator to present data associated with the loyalty program account in accordance with the notification rules and using processes consistent with the disclosed embodiments. In some instances, the modified account status indicator may include a modification of a color, shape, or other visual characteristic, which indicates to user 110 that the account status indicator reflects an account parameter of the loyalty program account.

Further, in some instances, system 140 may receive additional positional data that indicates user 110's current geographic position falls within the threshold distance of a subway station. In response to the change in user 110's current geographic position, system 140 may transmit data associated with the transportation credit account to client device 104, which may modify the account data indicator to present data associated with transportation credit account in accordance with the notification rules and using processes consistent with the disclosed embodiments. For example, the modified account status indicator may indicate an effective balance of the transportation credit account that reflects a potential debit of a subway fare. By way of example, the presented account status indicator may modify a color, shape, or other visual characteristic that renders the account status indicator specific to the transportation credit account.

Furthermore, if system 140 were to determine that user 110's current geographic position falls outside of the threshold distance of either the subway station or the retail locations, system 140 may transmit data associated with the default checking account to client device 104. In some aspects, the transmitted data may instruct client device 104 to modify the account status indicator to present data indicative of a status (e.g., a balance) of the default checking account.

In other embodiments, the notification rules may define other parameters of an account status indicator (e.g., a type of balance (effective or actual), a type of indicator (glyph, bar, pie chart, etc.) and/or a visual, tactile, or audible characteristic of the indicator, etc.) based on a geographic location of user 110. In one aspect, the notification rules for the account status indicator may establish a bar indicator (e.g., indicators 502 or 504 of FIG. 5A) as a default indicator type, and may define a modification of the default indicator type to a glyph (e.g., FIG. 5D) or a solid-color indicator (e.g., FIG. 5C) when user 110's geographic position falls within a specific geographic region or regions. By way of example, user 110 may regularly purchase goods and services in crowded areas (e.g., stadiums, etc.), and the notification rules may require client device 104 (or system 140) to display a solid-color indicator when user 110 is disposed within the stadium. In certain instances, client device 104's modification of the default bar indicator to a solid color indicator may continue to provide user 110 with non-obtrusive information identifying a status of an account without disclosing details regarding magnitudes and values of account parameters, such as account balance or credit limits.

In additional embodiments, system 140 and/or client device 104 may modify a type of balance associated with a presented account status indicator based on a current geographic position of user 110. For instance, the notification rules may establish an actual or effective balance as a default account parameter for an account status indicator associated with a credit card account held by user 110. The notification rules may further specify a remaining amount of available credit as the account parameter of the account status indicator when user 110 is disposed within a geographic region having a concentration of merchants (e.g., a shopping mall). In certain instances, system 140 may determine that user 110's current geographic position falls within the shopping mall, and may transmit credit card account data instructing client device 104 to modify the presented account data to reflect not the actual or effective account balance of the credit card account, but instead the remaining amount of available credit for the credit card account. In certain aspects, the presented account status indicator may modify a color, shape, or other visual, tactile, or audible characteristic of the indicator to enable user 110 to readily perceive the modified balance type.

In the embodiments disclosed above, reference is made to icons that include one or more account status indicators (e.g., account status indicators 502 and 504). The disclosed embodiments are, however, not limited to the presentation and modification of two account status indicators, and in other embodiments, system 140 and/or client device 104 may selectively generate, present, and/or modify any additional or alternate numbers and types of account status indicators appropriate for presentation by client device 104.

In certain embodiments, client device 104 may represent a computing device having a display unit capable of presenting one or more account status indicators within an augmented reality (AR) interface presented to a user. For example, client device 104 may represent "smart glasses" that include an optical head-mounted display (OHMD) configured to present interface elements as an AR view that "pop-ups" within a field of view of user 110 and modifies a visual appearance of an object within user 110's field-of-view (or within a presented image or video) to reflect a status of one or more accounts of user 110. The smart glasses may, in some instances, communicate with system 140 across network 120, and may be configured to receive account status notification information from system 140 at predetermined intervals, based on a geographic location of user 110, and/or in response to predetermined triggering events established by user 110 or system 140 (e.g., a potential purchase of a product or service, a change in a status of one or more of user 110's accounts detected by system 140). In response to the received account status notification information, and in accordance with notification rules established by user 110 and/or system 140, the smart glasses may generate instructions that cause the OHMD to present one or more corresponding account status indicators within user 110's field-of-view, and additionally or alternatively, to modify visual characteristics of one or more previously presented account status indicators to reflect updates or changes in corresponding accounts held by user 110.

The disclosed embodiments are, however, not limited to client devices having OHMDs capable of displaying interface elements within user 110's field-of-view, and in other embodiments, client device 104 may include a non head-mounted device configured to generate a "head-up" display that projects one or more interface elements within user 110's field of view. For instance, client device 104 may represent a vehicle-based computing device having a display unit that projects interface elements onto an interior portion of a windshield of user 110's vehicle. The vehicle-based computing device may be in communication with system 140 via network 120, and additionally or alternatively, may be in communication with a mobile communications device of user 110 using a Bluetooth™ connection, a NFC connection, or other appropriate communications protocol. In certain aspects, the vehicle-based computing device may receive account status notification information (e.g., directly from system 140 over communication network 120 or indirectly through user 110's mobile communications device) and may generate instructions that cause the display unit to project one or more corresponding account status indicators within user 110's field-of-view, and additionally or alternatively, to modify visual characteristics of one or more previously presented account status indicators to reflect updates or changes in corresponding accounts held by user 110.

For example, using the exemplary techniques described above, user 110 may associate a glyph indicator (e.g., the indicator of FIG. 5D) with an effective account balance of user 110's checking account and with an effective account balance of user 110's loyalty program account. The disclosed embodiments may also enable user 110 to establish (e.g., using a graphical user interface (GUI) presented by client device 104) an indicator rubric specifying that the glyph indicator appears as a red "X" if either (1) the effective account balance of the checking account drops below $10,000 or (2) the effective account balance of the loyalty program account falls below 1,000 points. Furthermore, user 110 may configure notification processes consistent with the disclosed embodiments to check for an updated indicator status at specified temporal intervals (e.g., every five minutes), in response to a purchase of a product or service using the checking account (e.g., using a debit card linked to user 110's checking account), or in response to a change in a point balance of user 110's loyalty program account (e.g., a purchase transaction that accrues loyalty points, or a transaction in which user 110 exchanges loyalty program points for a product or service).

In one instance, after the specified temporal interval, system 140 may access stored account data associated with user 110's checking account and user 110's loyalty program account (e.g., within account data 144B), and may determine that the effective account balance of user 110's checking account is $11,375, and that the effective account balance of user 110's loyalty program account is 1,100 points. Applying the established indicator rubric to the effective account balances, system 140 may determine that client device 104 should present a green "check mark" as the glyph indicator (e.g., that the indicator status is that of a green check mark). System 140 may also generate account status notification information that identifies the indicator type (e.g., glyph) and specifies the indicator status (e.g., green check mark). In some instances, the account status notification may also include information identifying the checking account and/or loyalty program account (e.g., account numbers, names of issuing financial institution or retailers, etc.), and further, information identifying the effective account balances of the checking account and/or the loyalty program accounts. System 140 may be configured to transmit the account status notification information to client device 104 across network 120 using any of the communications protocols outlined above.

In some embodiments, client device 104 (e.g., a pair of smart glasses) may include an OHMD configured to present one or more account status indicators as an AR view that "pop-ups" within a field of view of user 110 and modifies a visual appearance of an object within user 110's field-of-view (and/or within an image or video presented by the OHMD) to reflect a status of one or more accounts of user 110. Client device 104 may, in certain aspects, be configured to receive the account status notification information from system 140, generate an account status indicator in accordance with the account status notification information, and instruct the OHMD to render the generated account status indicator for presentation to user 110 at a corresponding position within the field-of-view of user 110, as illustrated in FIG. 8A.

Figure 8A:
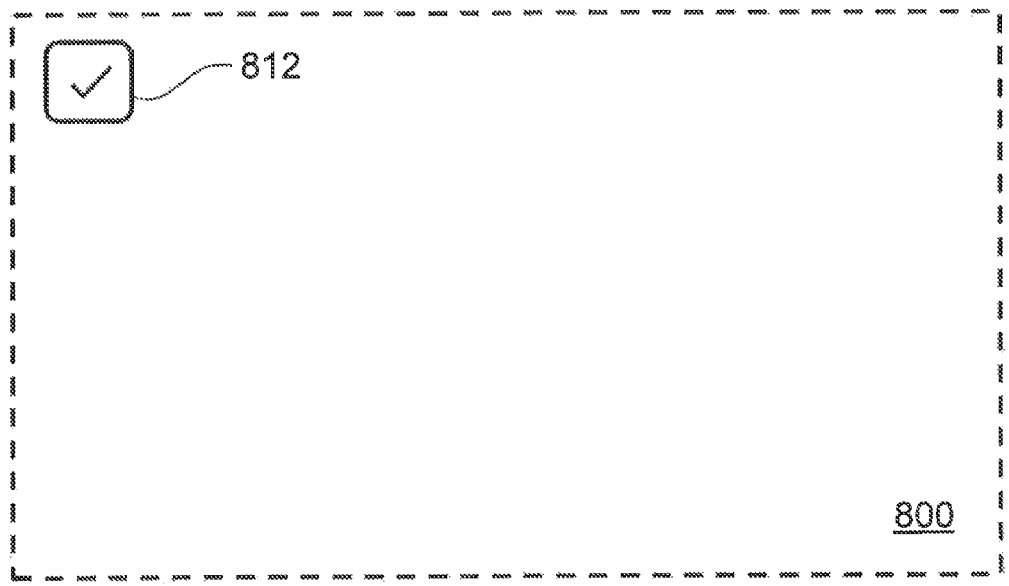
FIGS. 8A, 8B, 9A, 9B, and 9C depict exemplary account status indicators presented within a user's field-of-view, consistent with the disclosed embodiments.

FIG. 8A schematically illustrates an exemplary field-of-view 800 provided by an exemplary pair of smart glasses having an OHMD. In certain aspects, the smart glasses (e.g., client device 104) may receive the account status notification information from client device 104 (e.g., specifying a glyph indicator having as green check mark), and may generate the specified glyph indicator for rendering and presentation within field-of-view 800. By way of example, as illustrated in FIG. 8A, client device 104 may instruct the OHMD to present glyph indicator 812 within an upper-left corner of field-of-view 800. In some aspects, a size and/or a position of glyph indicator 814 within field-of-view 800 may be established by user 110 (e.g., within corresponding notification rules using a GUI presented by client device 104), and additionally or alternatively, by client device 104 or system 140 based on operational parameters and limitations of the OHMD.

Further, as described above, system 140 may be configured to monitor transaction data associated with user 110's checking account, and in some aspects, system 140 may detect that, e.g., a hotel in Toronto, Canada, placed a hold of $2,000 on user 110's checking account. In response to the detected transaction, system 140 may determine that the effective account balance of user 110's checking account is currently $9,375 (i.e., below the $10,000 threshold). In certain aspects, and based on the corresponding notification rules and/or indicator rubrics, system 140 may determine to modify the indicator status for the glyph indicator to correspond to a red "X," and transmit updated account status notification information to client device 104. As described above, the updated account status notification information may include the modified indicator status, and additionally or alternatively, information identifying the modified effective account balance of user 110's checking account.

Figure 8B:
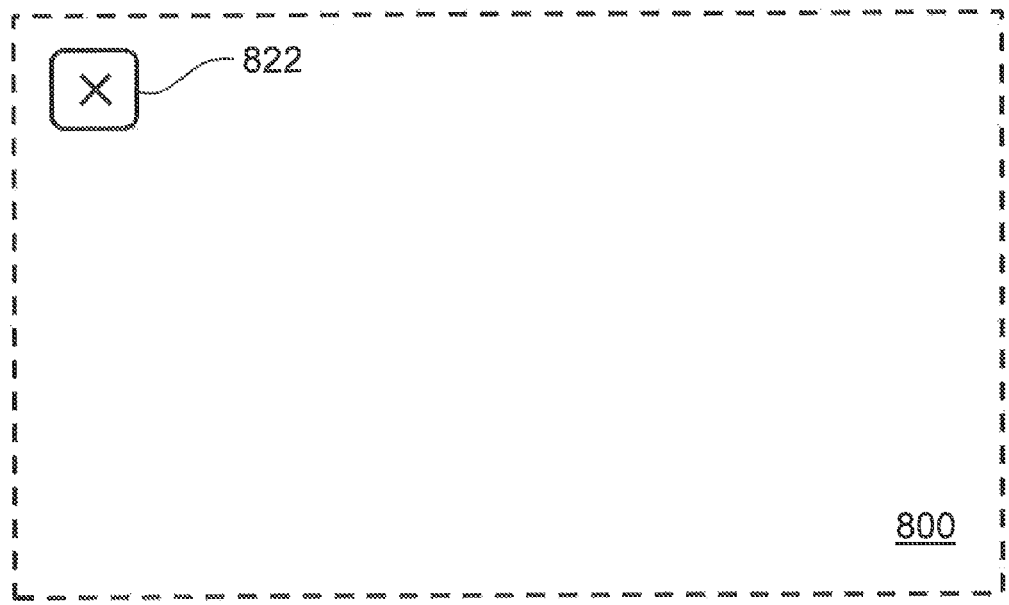

Client device 104 may receive the updated account status notification information, and using the exemplary techniques described above, may instruct the OHMD to render and present a modified account status indicator consistent with the changed status of user 110's checking account. For example, as outlined in FIG. 8B, client device 104 may instruct the OHMD to present to user 110 a modified account status indicator 822 in the form of a red "X," which indicates to user 110 that the effective account balance of the checking account has fallen below the user-specified threshold balance. In certain aspects, the modification to the account indicator, which the OHMD presents within user 110's field-of-vision, may act as a reminder that user 110 should consider alternate forms of payment that do not immediately impact user 110's checking account, or alternatively, that user 110 should top off the checking account with reserve funds in order to maintain the desired threshold balance.

Furthermore, as described above, the disclosed embodiments may be configured to present visual, audible, and/or tactile indicators that reflect an impact of a potential purchase of a product or service on one or more accounts held by user 110. By way of example, user 110 may wear a pair of "smart glasses" that include an OHMD (e.g., client device 104), and user 110 may browse products offered for sale by a retailer of consumer electronics. In certain aspects, client device 104 may modify an appearance of at least a portion of a product disposed within user 110's field-of-view (e.g., the field-of-view defined by user 110's smart glasses) to reflect a status of one or more financial services accounts and loyalty program accounts held by user 110.

Figure 9A:
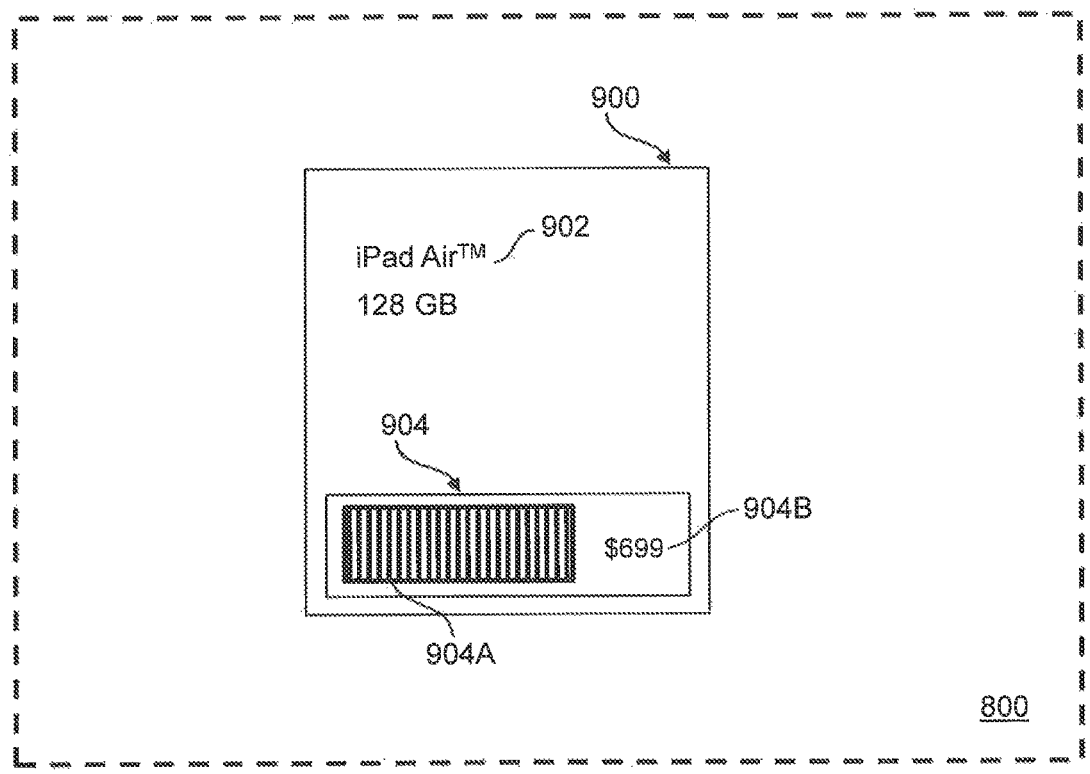

By way of example, user 110 may browse products offered for sale by a merchant of consumer electronics. In certain instances, and as illustrated in FIG. 9A, user 110 may view a portion of a tablet computer (e.g., tablet computer portion 900) through a corresponding field-of-view 800 of user 110's smart glasses. In FIG. 9A, user 110 may view information 902 identifying a model of the tablet computer (e.g., an iPad Air™) and a configuration of the tablet computer (e.g., 128 GB of storage). User 110 may also view a label 904 affixed to tablet computer portion 900 that includes a machine-readable code 904A and a list price 904B of the tablet computer (e.g., $699). In some aspects, machine-readable code 904A may correspond to an optical machine-readable representation of data identifying the tablet computer, characteristics of the tablet computer (e.g., list price, etc.), and/or the merchant that offers the tablet computer for sale. For example, machine-readable code 904A may include, but is not limited to, a bar code, a QR code, and other one- and two-dimensional optical machine-readable codes.

In some aspects, client device 104 (e.g., the smart glasses having the OHMD) may execute software processes that cause a digital camera associated with client device 104 to capture an image of tablet computer portion 900. Client device 104 may, for instance, perform optical character-recognition (OCR) processes on the captured image data to obtain product information, which includes, but is not limited to, the tablet model (e.g., iPad Air™), the tablet configuration (e.g., 128 GB), and the tablet price (e.g., $699). In other instances, client device 104 may process the captured image data in order to obtain product and/or retailer information encoded within machine-readable code 904B. By way of example, the obtained product and/or merchant information may include, but is not limited to, a Universal Product Code (UPC) number associated with the tablet computer, a model, configuration, and/or price of the tablet computer, or the merchant offering the tablet computer for sale.

In an embodiment, the digital camera associated with client device 104 may be configured to capture the image data of tablet computer portion 900 automatically and without input from user 110. For example, the digital camera may continuously obtain image data corresponding to tablet computer portion 900, and client device 104 may execute software processes that automatically capture and store a portion of the obtained image data having image characteristics (e.g., image focus, image resolution, etc.) sufficient for OCR and code processing, as described above. In other aspects, however, client device 104 may capture and store a portion of the obtained image data based on user input, e.g., a gestural input, a verbal input, or other appropriate input appropriate to client device 104.

In some aspects, client device 104 may be configured to transmit the obtained product and/or merchant information to system 140, which may process the received information to determine an impact of user 110's potential purchase on one or more of user 110's accounts. The disclosed embodiments are, however, not limited to exemplary processes in which client device 104 performs OCR and code-reading processes on captured image data. In other instances, client device 104 may be configured to transmit the captured image data to system 140, which may perform the OCR and/or code-reading processes to generate information identifying the tablet computer and additionally or alternatively, the merchant offering the tablet computer for sale, using any of the techniques described above.

In certain aspects, system 140 may be configured to identify and obtain additional product and/or merchant information necessary to determine an impact of the potential purchase on user 110's accounts. By way of example, the received product information may include a UPC number associated with the tablet computer and information identifying the merchant that offers the tablet computer for sale, but may not include a price of the tablet computer. In some instances, system 140 may be configured to query an additional computing system associated with the merchant (e.g., across network 120 through a corresponding API), and in response to the query, system 140 may receive the price of the tablet from the merchant system.

Further, in some embodiments, system 140 may execute software processes that assess an impact of the potential purchase of the tablet computer on one or more accounts held by user 110. By way of example, user 110 and/or system 140 may establish notification rules and/or indicator rubrics using any of the exemplary processes outlined above, which system 140 may store in a corresponding data repository (e.g., data repository 144). In certain aspects, system 140 may retrieve the stored notification rules and/or indicator rubrics associated with user 110, and may determine that one of the retrieved notification rules requires that client device 104 modify an appearance of a product in user 110's field-of-view whose purchase is deemed eligible for loyalty points. For example, the notification rule may specify that client device 104 notify user 110 of the tablet computer's eligibility for loyalty points by presenting a blue ring or halo that surrounds the tablet computer within user 110's field-of-view (e.g., field-of-view 800 of user 110's smart glasses in FIG. 9A).

In response to the notification rule and the determined eligibility of the tablet computer for loyalty points, system 104 may generate account status notification information that identifies the eligibility of the table computer for loyalty points, and further, instructs client device 104 to present the blue ring or halo surrounding the table computer within user 110's field-of-view. System 140 may, for example, transmit the generated account status information to client device 104 across network 120 using any of the communications protocols outlined above.

Figure 9B:
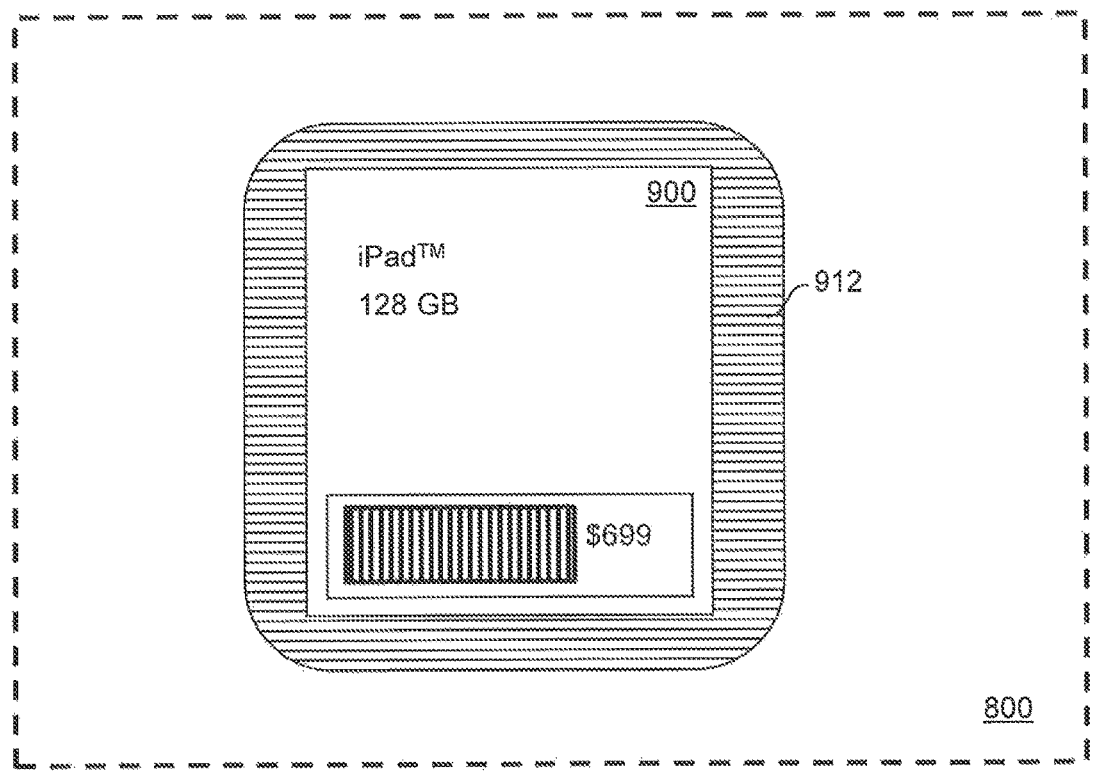

Client device 104 may be configured to receive the account status notification information from system 140, and may execute software processes that generate and present an interface element within user 110's field-of-view that surrounds the table computer with the blue ring or halo. For instance, as illustrated in FIG. 9B, client device 104 may instruct the OHMD to present an interface element 912 within user 110's field-of-view in a manner that surrounds tablet computer portion 900, and further, to color interface element 912 blue within field-of-view 800. In some aspects, the OHMD may present ring 912 as an augmented reality (AR) view that "pop-ups" within the field-of-view of user 110 and modifies a visual appearance of an object within user 110's field-of-view (or within a presented image or video) to reflect a status of one or more accounts of user 110.

In some embodiments, client device 104 may execute software processes that generate an interface element corresponding to ring 912, which the OHMD may render and present within user 110's field-of-view 800. For example, as described above, the digital camera associated with client device 104 may continuously sample image data from user 110's field-of-view, and using one or more image processing techniques, client device 104 may establish a boundary of the visible portion of the tablet computer within the sampled image data, and further, may determine a centroid of the portion of user 110's field-of-view enclosed by the boundary (e.g., the centroid of the visible portion of the table computer). In some aspects, the interface element corresponding to ring 912 of FIG. 9B may be generated initially as a two-dimensional circular element centered on the determined centroid of the visible portion of the tablet computer, with the portion of the circular element enclosed within the determined boundary eliminated. The dimensions of the ring 912 may, in some instances, be established by user 110 within the corresponding notification rule (e.g., using any of the processes described above), or alternatively, may be established by client device 104 and/or system 140 based on one or more properties of the OHMD or a dimension of field-of-view 800.

In other embodiments, system 140 may determine that the notification rules and/or indicator rubrics associated with user 110 require client device 104 to modify an appearance of a product within user 110's field-of-view to reflect an impact of a potential purchase of the product on one or more accounts held by user 110. For instance, notification rules consistent with the disclosed embodiments may specify that client device 104 notify user 110 of the impact of the potential purchase of the tablet computer on user 110's checking account, credit card account, and loyalty program account by presenting corresponding account status indicators within user 110's field-of-view.

In certain aspects, the account status indicators may represent concentric rings disposed about the tablet computer within user 110's field-of-view, and the concentric ring indicators may visually characterize the impact of user 110's potential purchase of the table computer on effective account balances of corresponding ones of user 110's checking account (e.g., a through a purchase using a linked debit card), user 110's credit card account (e.g., a Visa™ card), and user 110's loyalty program account. Further, client device 104 may characterize the status of actual or effective account balances of the checking, credit card, and loyalty program accounts by establishing and/or varying one or more visual characteristics of the concentric ring indicators (e.g., a color, color gradient, or pattern) based on a corresponding indicator rubric or notification rule established using any of the techniques outlined above.

By way of example, system 140 may obtain notification rules and/or indicator rubrics that associate a first concentric ring indicator with the effective balance of user 110's checking account, that associate a second concentric ring indicator (e.g., disposed proximate to an outer circumference of the first concentric ring indicator) with the effective balance of user 110's credit card account, and further, that associate a third concentric ring indicator (e.g., disposed proximate to an outer circumference of the second concentric ring indicator) with an actual balance of user 110's loyalty program account. In further aspects, an indicator rubric obtained by system 140 may specify that the first concentric ring indicator appear as red when the effective balance of user 110's checking account drops below a $10,000 threshold, or green when the effective balance remains about the $10,000 threshold. Additionally, indicator rubrics consistent with the disclosed embodiments may specify that the third concentric ring indicator appears as red when the actual balance of user 110's loyalty program account remains below a 10,000-point threshold associated with a $100 cash reward, and as green when the actual balance exceeds the 10,000-point threshold. Finally, an indicator rubric obtained by system 140 may specify that the second concentric ring indicator appear as green when an effective account balance of user 110's credit card account, when adjusted to account for a cash reward from user 110's loyalty program, remains below a $5,000 threshold, or red when the adjusted effective account balance rises above the $5,000 threshold. In certain instances, user 110 and/or system 140 may establish portions of one or more of the notification rules and/or indicator rubrics using any of the exemplary techniques outlined above.

In certain aspects, using any of the exemplary techniques identified above, system 140 may determine that user 110's checking account is associated with a current effective account balance of $10,250, that user 110's credit card is associated with a current effective balance of $4,350, and that user 110's loyalty program account is associated with an actual balance of 9,885 points. Further, the received and/or generated product information may indicate a cost of $699 for user 110's potential purchase of the tablet computer. Applying the notification rules and/or indicator rubric to user 110's checking account, system 140 may determine that the purchase of the tablet computer would reduce the effective account balance of user 110's checking account to $9,551, and that the first concentric ring indicator should appear red when presented by client device 104.

Based on stored loyalty program information (e.g., information stored in account data 144B that specifies the loyalty program accrues one point for each dollar sent), system 140 would determine that the purchase of the tablet computer would result in an actual loyalty point balance of 10,257 points, which would provide user 110 with a $100 cash reward. System 140 may, in some instances, determine that the third concentric ring indicator should appear green when presented to user 110 by client device 104.

Further, applying the notification rules and/or indicator rubric to user 110's credit card account, system 140 may determine that the $100 cash reward issued by user 110's loyalty program offsets the purchase price of the tablet computer, which would increase the effective balance of user 110's credit card account to $4,949. In certain aspects, system 140 may determine that the second concentric ring indicator should appear green when presented to user 110 by client device 104.

In some embodiments, system 140 may generate account status notification information that specifies the presentation of the first, second, and third concentric ring indicators (e.g., corresponding, respectively, to an effective balance of user 110's checking account, an effective balance of user 110's credit card account, and an actual balance of user 110's loyalty program account), and further, includes information identifying the status (e.g., red or green) of the concentric ring indicators. In some aspects, the generated account status notification information may further identify the effective balance of user 110's checking account, the effective balance of user 110's credit card account, and/or the actual balance of user 110's loyalty program account that would result from the potential purchase of the tablet computer, and additionally or alternatively, the $100 cash reward obtained from the potential purchase of the tablet computer. System 140 may be configured to transmit the generated account status notification information to client device 104 across network 120 using any of the communications protocols outlined above.

Client device 104 may be configured to receive the account status notification information from system 140, and may execute software processes that generate and present the first, second, and third concentric ring indicators as interface elements that surround the portion of the tablet computer visible within user 110's field of view. For example, client device 104 may execute software processes that generate the interface elements corresponding to the first, second, and third concentric ring indicators using any of the exemplary techniques described above, and the OHMD may render the generated interface elements for presentation within user 110's field of view.

Figure 9C:
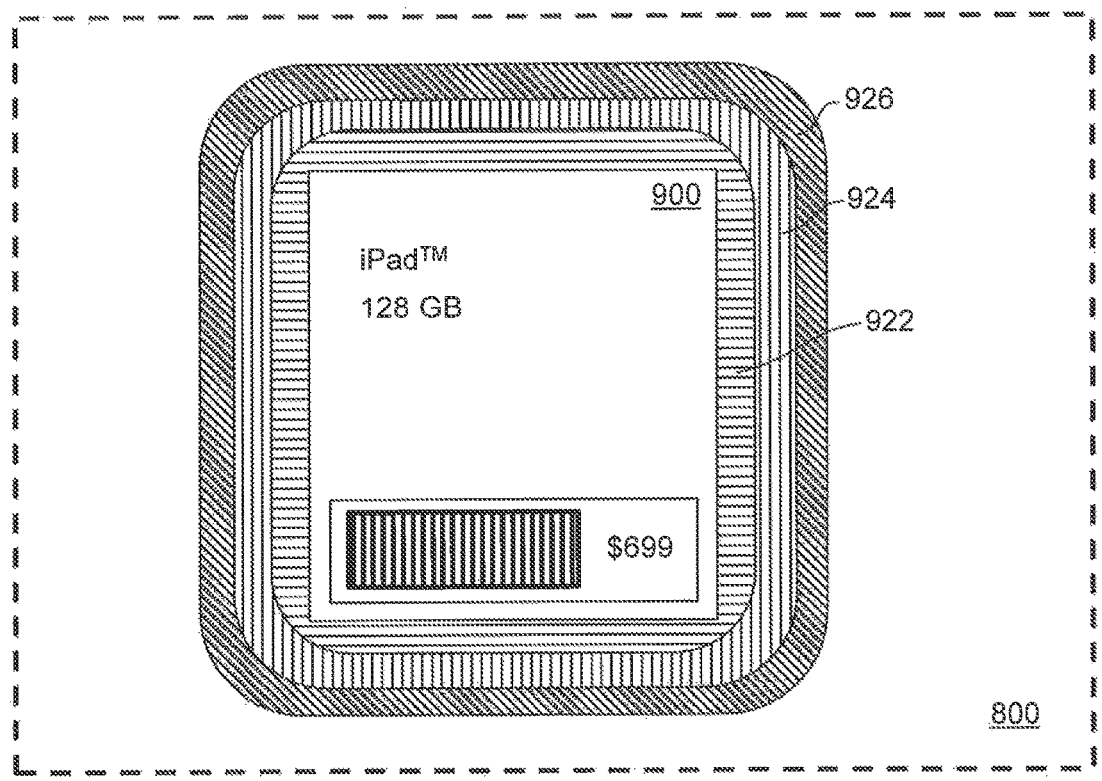

FIG. 9C illustrates an exemplary augmented reality (AR) view presented by client device 104 within user 110's field-of-view 800, in accordance with disclosed embodiments. For instance, as illustrated in FIG. 9C, client device 104 may instruct the OHMD to render and present a red interface element 922 corresponding to the first concentric ring indicator and indicative of an impact of the potential purchase of the tablet computer on the effective balance of user 110's checking account. Further, for example, client device 104 may instruct the OHMD to present green interface elements 924 and 926 that correspond, respectively, the second and third concentric ring indicators (which indicate the impact of the potential purchase of the table computer on the effective balance of respective ones of user 110's credit card account and on user 110's loyalty program account). In some embodiments, the OHMD may present interface elements 922, 924, and 926 an augmented reality (AR) view that "pop-ups" within the field-of-view 800 and surrounds the visible portion 900 of the tablet computer within field-of-view 800. In certain aspects, interface elements 922, 924, and 926 may modify an appearance of visible portion 900 of the tablet computer (e.g., as perceived by user 110) to indicate to user 110 an impact of the potential purchase of the tablet computer on the effective balance of user 110's checking account, credit card account, and loyalty program account.

In certain aspects, by viewing interface elements 922, 924, and 926 within field-of-view 800, user 110 may readily determine an impact of the potential purchase of the tablet computer on the checking account, credit card account, and loyalty account. For instance, as interface element 924 is colored green, user 110 may determine that the purchase of the tablet computer would not increase the effective balance of the credit card account beyond the threshold specified in the corresponding notification rule and/or indictor rubric. Further, since the OHMD presents interface element 926 as green, user 110 may determine that the purchase of the laptop would entitle user 110 to a cash reward of $100 (e.g., based on a potential increase in loyalty points above the 10,000 threshold established by user 110).

Further, the disclosed embodiments also enable user 110 to link (e.g., through a corresponding GUI presented by client device 104) any additional or alternate numbers and types of accounts to concentric ring indicators forming portions of the AR view presented by the OHMD. In certain aspects, user 110's ability to "layer" multiple ring indicators linked to status of corresponding account parameters, and to filter the layered ring indicators adaptively and dynamically using the GUI, may assist the user 110 in making an optimal decision regarding not only a potential purchase, but also the account or accounts impacted by the purchase.

The disclosed embodiments are, however, not limited to an optical device (e.g., the OHMD of client device 104) that generates and presents interface elements within an AR view that modifies a visual appearance of a physical object disposed within user 110's field-of-view (e.g., portion 900 of the tablet computer). In other embodiments, the optical device (e.g., the OHMD or a device capable of generating a "heads-up" display) may be configured to present to user 110 multimedia content (e.g., stored or streaming digital image or digital video content) within user 110's field of view. In certain aspects, the OHMD may be configured to generate and present interface elements that modify an appearance of an object within the presented multimedia content (e.g., as perceived by the user) to reflect a status of one or more accounts of user 110. For instances, client device 104 may instruct the OHMD to present one or more of interface elements 922, 924, and 926 within user 110's field-of-view to modify a visual appearance of an object or individual within the presented multimedia content and convey a status of user 110's checking account, credit card account and/or loyalty program account.

Further, the disclosed embodiments may enable client device 104 of user 110 to receive account status notification information from system 110, and based on the received information, to generate and present to user 110 one or more graphical, tactile, or audible indicators reflective of a status of parameters of one or more accounts held by user 110. In some aspects, the presented indicators may include information identifying a relationship of an account parameter (e.g., an effective account balance) to a user-defined or default threshold, and further, may indicate a particular value associated with the account parameter. As described above, indicators consistent with the disclosed embodiments may include, but are not limited to, colored status bar indicators, glyph indicators, symbol indicators, picture indicators, and concentric ring indicators.

In certain instances, the account status indicators generated and presented by client device 104 may indicate a status of an account parameter, such an effective account balance or a loyalty point balance, relative to a user- or system-established threshold. For example, a glyph indicator may correspond to a green "check mark" when an effective account balance of user 110's checking account exceeds a threshold balance, or alternatively, a red "X" when the effective account balance falls below the threshold balance. In other aspects, and in additional to reflecting a relationship between the account parameter and the established threshold, the generated and presented account status indicator may also indicate to user 110 the actual value of the account parameter. For example, client device 104 may generate and present to user 110 a status bar indicator that is not only shaded red or green depending on the relationship between an effective account balance of user 110's checking account and an established threshold, but also takes the form of a bar graph that presents to user 110 a current value of the effective account balance. In one embodiment, user 110 may associate a particular type of account status indicator with a corresponding account in a notification rule and/or indicator rubric using any of the exemplary techniques described above. In other instances, system 140 may assign default types of account status indicators (e.g., less descriptive glyph indicators) to corresponding ones of user 110's accounts without input from user 110.

The disclosed embodiments may also enable client device 104 to receive account status notification information from system 140, and to transmit the received information to one or more additional devices (e.g., "connected" devices) that are capable of establishing communication sessions with client device 104 and capable of displaying account status indicators of varying detail and complexity. By way of example, communications between client device 104 and the connected devices may occur across network 120 (e.g., a wired or wireless LAN, a RF network, a NFC network, a WiFi network, a Bluetooth™ network) using any of the communications protocols outlined above.

In certain aspects, client device 104 may execute software processes that receive account status notification information from system 140, that identify one or more of the connected devices eligible to receive notifications and present indicators (e.g., based on previously established connected device information), and further, that automatically transmit or "push" portions of the received notification information to the eligible connected devices without input or intervention from user 110. In some instances, client device 104 may select portions of the received notification information for transmission to the connected devices, or may modify portions of the received information, to comport with corresponding capabilities and functionalities of the connected devices, which may be set forth in the previously established connected device information.

In some aspects, user 110 may, through a graphical user interlace (GUI) presented by client device 104, establish portions of the connected device information that identify one or more connected devices capable of establishing communications with client device 104, identify whether the connected devices are eligible to receive notification information and present indicators, and further, identify a type of account indicator the eligible connected devices may present to user 110. In one embodiment, user 110 may establish the connected device information using techniques similar to those outlined above that establish notification rules and/or indicator rubrics. In other embodiments, system 140 and/or client device 104 may establish, without user input or intervention, at least a portion of the connected device information by associating corresponding connected devices with default indicator types for specific accounts. In certain aspects, client device 104 may store the established connected device information in a data structure within a corresponding local data storage, or may periodically upload the established connected device information for storage in a data repository locally accessible to system 140 (e.g., data repository 144).

Figure 10:
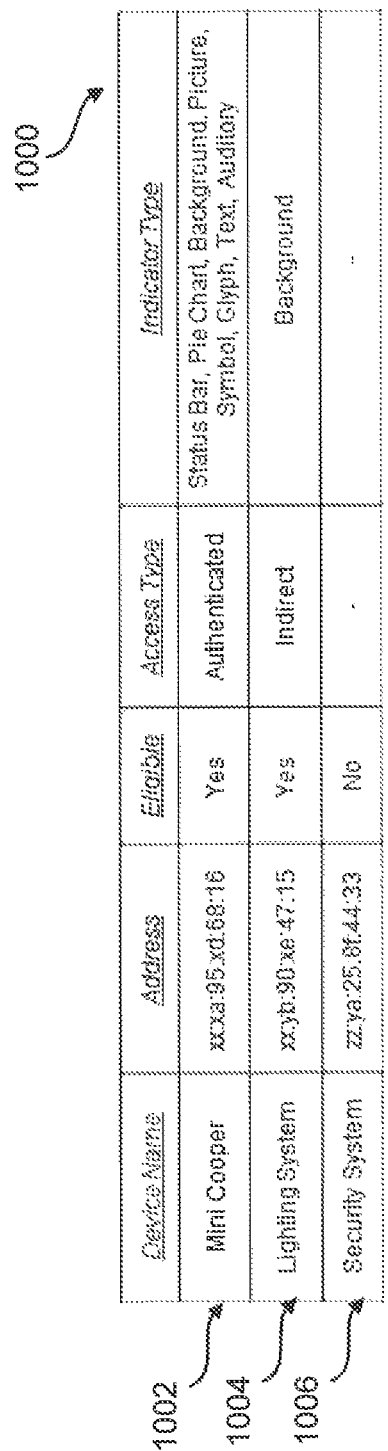
FIG. 10 illustrates an exemplary data structure for storing connected device data, consistent with the disclosed embodiments.

FIG. 10 illustrates and exemplary tabular data structure 1000 within which client device 140 may store established connected device information, in accordance with disclosed embodiments. For example, and as described above, client device 104 may present to user 110 a graphical user interface (GUI) that enable user 110 to identify one or more connected devices capable of establishing communications sessions with client device 104, and further, to establish corresponding notification parameters for the identified connected devices. Client device 104 may, in some instances, propose a set of candidate connected devices that previously established communications sessions with client device 104 (e.g., a computing device disposed within user 110's Mini Cooper™ and with which client device 104 previously coupled and established communications sessions) or alternatively, that are capable of establishing a communications session with client device across network 120 (e.g., based on a response to a broadcast query message).

In certain aspects, the GUI may allow user 110 to establish one or more notification parameters for the connected devices identified by client device 104. As outlined in FIG. 10, notification parameters consistent with the disclosed embodiments include, but are not limited to, a device name, a device address, an eligibility parameter, an access type parameter, and an indicator type parameter. Upon specification of the notification parameters for the corresponding connected devices, client device 104 may generate data records for the corresponding devices, which may be incorporated into and stored within data structure 1000. In some instances, user 110 may specify values for the notification parameters within the GUI for one or more of the connected devices. In other instances, however, client device 104 may establish or suggest values appropriate to notification parameters for one or more of the connected devices (e.g., devices names that comport with system or communications protocol requirement, or addresses identified programmatically by client device 104), and user 110 may be invited by the GUI to confirm the established or suggested values.

For example, in FIG. 10, data record 1002 corresponds to a computing device disposed within user 110's Mini Cooper™ vehicle (e.g., the "connected" Mini Cooper™). In certain aspects, client device 104 may establish a device address for the connected Mini Cooper™ (e.g. xx:xa:95:xd:68:16). Further, by way of example, user 110 may specify within the GUI that the connected Mini Cooper™ device is eligible to receive notifications, and further, that the connected Mini Cooper™ should be afforded an "Authenticated" type of access to user 110's account information. In certain aspects, user 110's establishment of "Authenticated" access for the connected Mini Cooper™ implies that account status notification information provided to the connected Mini Cooper™ may include not only information that identifies a relationship between an account parameter and an established threshold (e.g., whether an effective balance of user 110's checking account exceeds a threshold value), but also information that identifies the value of the effective balance (e.g., user 110's checking account includes an effective balance of $11,500, which exceeds the threshold of $10,000). Further, user 110's ability to establish the "Authenticated" access for the connected Mini Cooper™ may be based on an ability of client device 140 to communicate securely with the connected Mini Cooper™ across communications network 120. Further, as illustrated in FIG. 10, the connected Mini Cooper™ may be capable of generating and presenting status bar indicators, pie chart indicators, background color indicators, picture indicators, symbol indicators, glyph indicators, text-based indicators, and/or auditory indicators.

Referring back to FIG. 10, data record 1004 corresponds to a connected lighting system capable of communicating with client device 104 over network 120. As described above, client device 104 may establish a device address for the connected lighting system (e.g., xx:yb:90:xe:47:15), and user 110 may specify within the GUI that connected lighting system is eligible to receive account status notifications. User 110 may also specify within the GUI that the connected lighting system is afforded "Indirect" access to user 110's account information, and further, that the connected lighting system is capable of presenting only a background color account status indicator to user 110. In certain aspects, user 110's establishment of "Indirect" access for the connected lighting system implies that account status notification information communicated from client device 104 to the connected lighting system may only identify a relationship between an account parameter and an established threshold (e.g., whether an effective balance of user 110's checking account exceeds a threshold value), and may not include information identifying a value of the account parameter.

Further, by way of example, data record 1006 of FIG. 10 may correspond to a connected security system disposed within user 110's home and capable of communicating with client device 104 over network 120. As described above, client device 104 may establish a device address for the security system (e.g., zz:ya:25:8f:44:33). As illustrated in FIG. 10, however, user 110 may specify that the security system is ineligible to receive account status notification information or to present account status indicators to user 110. In certain aspects, user 110's establishment of the security system as ineligible for notifications may be a personal decision that ensures the individuals in user 110's home do not mistake the presentation of an account status indicator by the security system as an actual alarm.

In some embodiments, and upon receipt of account status notification information from system 140, client device 104 may access data record 1000 and may identify one or more connected devices eligible to receive notification information and present account status indicators to user 110. If client device 104 were to identify eligible connected devices, client device 104 may establish communications within the eligible connected devices (if such communications were not previously established), generate device-specific notifications tailored to the access and indicator type associated with the eligible connected devices, and transmit the generated device-specific notifications to the eligible connected devices directed over network 120 without user 110's input or intervention, as described below in reference to FIG. 11.

Figure 11:
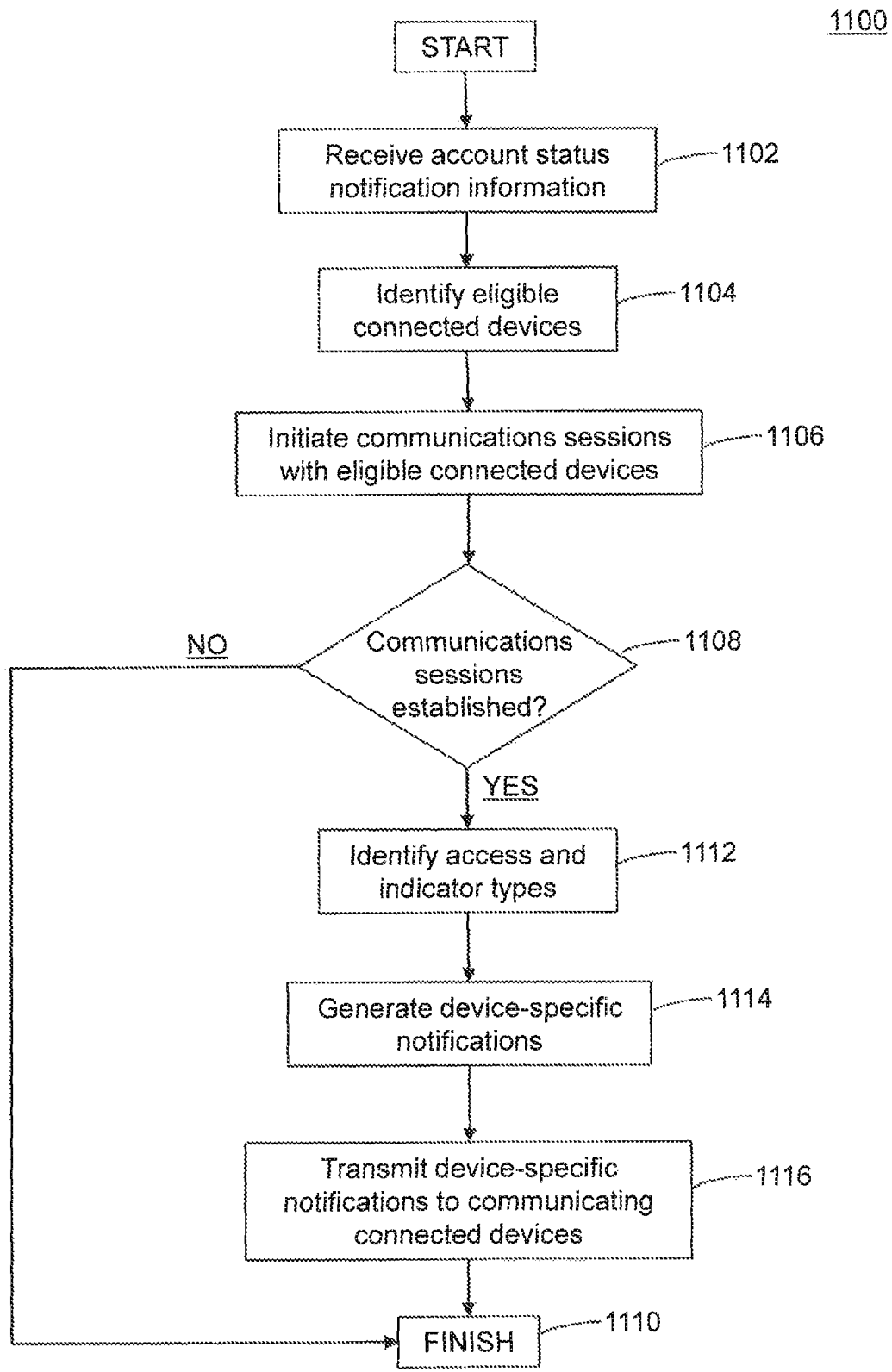
FIG. 11 is a flow chart of an exemplary process for providing account status notifications to eligible connected devices, consistent with disclosed embodiments.

FIG. 11 illustrates an exemplary process 1100 for present and relay account status notifications to eligible connected devices, consistent with disclosed embodiments. In one embodiment, a client device associated with a user (e.g., client device 104 associated with user 110) may be in communication with a system associated with a financial institution (e.g., system 140 of business entity 160) and may be configured to receive notification information identifying a status of one or more account parameters of one or more accounts held by user 110. In some aspects, client device 104 may identify one or more identifiable and addressable devices (e.g., connected devices) capable of communicating with client device 104 and presenting visual, tactile, and/or audible indicators of the account status to user 110. Client device 104 may, in some embodiments, transmit notification information to the connected devices that instructs the connected devices to present account status indicators consistent with capabilities and levels of access assigned to the connected devices by user 110.

In certain aspects, client device 104 may be configured to receive account status notification information from system 140 (e.g., in step 1102). As described above, account status notification information consistent with the disclosed embodiments may reflect a status of an account parameter (e.g., an effective balance) associated with a single account of user 110 (e.g., user 110's checking account), and additionally or alternatively, statuses of multiple account parameters associated with one or more of user 110's accounts (e.g., an effective balance and remaining available credit associated with a credit card account of user 110, and an actual balance of loyalty points associated with a loyalty program account of user 110). In some instances, the received account status notification information may include actual values of the account parameters and established threshold values (user 110's effective checking account balance of $11,500 exceeds the threshold balance of $10,000), and further, information instructing client device 104 to generate a particular account status indicator based on the actual values and established threshold (e.g., a status bar indicator). Further, system 140 may monitor user 110's accounts and generate the account status notification information (e.g., based on notification rules and/or indicator rubrics) using any of the exemplary techniques described above.

In one aspect, client device 104 may generate and present an account status indicator consistent with the received account status notification information. For example, system 140 may generate and transmit the account status notification information to client device 104 in response to user 110's purchase of a particular good or service user a debit card linked to user 110's checking account. In some instances, the account status notification information may include a current effective balance of user 110's checking account (e.g., $11,500), which may reflect user 110's recent purchase, and a threshold effective account balance for user 110's checking account (e.g., $12,000). The account status notification may also instruct client device 104 to generate a color-coded status bar that conveys a magnitude of user 110's current effective account balance and that is colored red to convey that the current effective account balance falls below the user-specified threshold.

In some instances, client device 104 may generate and present the corresponding account status indicator using any of the exemplary techniques described above. In other instances, however, client device 104 may delegate the generation and/or presentation of the corresponding account status indicator to one or more additional devices capable of communicating with client device 104 across network 120.

For instance, and in response to the received account status notification information, client device 104 may access profile information associated with user 110 to identify the one or more additional device (e.g., "connected" devices) capable of communicating with client device 104 and deemed eligible by user 110 to receive notification information and present account status indicators (e.g., in step 1104). As described above, client device 104 may access connected device information stored within a corresponding data structure (e.g., data structure 1000 of FIG. 10), may determine that a computing device disposed within user 110's Mini Cooper™ (e.g., a "connected" Mini Cooper™) and a "connected" lighting system disposed within user 110's home are eligible to receive account status notifications and present account status indicators.

In step 1106, client device 104 may attempt to establish a communications session with the connected Mini Cooper™ and the connected lighting system, if suitable communications sessions do not already exist. For example, user 110 may be disposed in the connected Mini Cooper™, and client device 104 may be capable of establishing communications with the connected Mini Cooper™ across network 120 using any appropriate communications protocol outlined above. Additionally or alternatively, user 110 may be disposed within or near his or her home, and client device 104 may also be capable of establishing communications with the connected lighting system across network 120 using any appropriate communications protocol outlined above.

Client device 104 may be configured to determine whether any communications sessions were successfully established with the eligible connected devices (e.g., in step 1108). If client device determines that no communications sessions with the connected devices could be established (e.g., step 1108; NO), then exemplary process 110 is complete in step 1110. In certain aspects, when communications cannot be successfully established with connected devices, client device 104 may generate and present the account status indicator corresponding to the received account status notification information using any of the exemplary techniques described above, If, however, client device 104 were to establish a communications session with a corresponding one of the connected devices (e.g., step 1108; YES), client device 104 may obtain additional information identifying a type of access associated with the corresponding connected device, and further, a type of indicator presentable by the corresponding connected device (e.g., in step 1112). In certain aspects, client device 104 may generate a device-specific notification for the corresponding connected device that includes (i) a portion of the received account status notification deemed consistent with the identified access type and (ii) information specifying an account status indicator consistent with the identified indicator type (e.g., in step 1114).

Client device 104 may be configured to transmit the device-specific notification to the corresponding connected device across network 120 using any appropriate communications protocol outlined above (e.g., in step 1116). As described above, client device 104 may be configured to transmit the device-specific notification to the corresponding connected device automatically and without intervention or input from user 110. Upon receipt of the device-specific notification, the corresponding connected device may be configured to present generate and present the specified account status indicator to user 110. Upon transmission of the device-specific notification to the corresponding connected device, exemplary process 1100 is complete in step 1110.

By way of example, client device 104 may establish a communication session with the connected Mini Cooper™ (e.g., in step 1108). As described above, client device 104 may data associated with the connected Mini Cooper™ (e.g., data record 1002 of FIG. 10), and may determine that user 110 specified an "Authenticated" access type for the connected Mini Cooper™ (e.g., in step 1112), In certain aspects, user 110's establishment of an "Authenticated" access type for the connected Mini Cooper™ implies that account status notification information provided to the connected Mini Cooper™ may include actual values of the account parameters and established threshold values. Client device 104 may also determine in step 1112 that the connected Mini Cooper™ is capable of generating and presenting status bar indicators, pie chart indicators, background color indicators, picture indicators, symbol indicators, glyph indicators, text-based indicators, and/or auditory indicators.

In certain aspects, client device 104 may establish that the account status notification information received from system 140 is consistent with the access type and indicator type established by user 110 for the connected Mini Cooper™ (e.g., in step 1112). Client device 104 may, for example, forward the received account status notification information to the connected Mini Cooper™, which may process the account status notification information to generate and present an appropriate account status indicator (e.g., in step 1114). By way of example, and in response to the account status notification information, the connected Mini Cooper™ may be configured to generate a color-coded status bar that conveys a magnitude of user 110's current effective account balance (e.g., $11,500) and that is colored red to convey that the current effective account balance falls below the user-specified threshold (e.g., $12,000). The connected Mini Cooper™ may render the generated color-coded status bar for presentation to user 110 through a corresponding display unit (e.g., a touch-screen display or head-up display).

Further, in some embodiments, the connected Mini Cooper™ may be capable of presenting additional notifications and indicators to user 110 through the corresponding display unit. For example, the connected Mini Cooper™ may be configured to generate and present a low-fuel indicator to user 110 once an amount of remaining fuel falls below a predetermined level (e.g., 10% of capacity). Similarly, the connected Mini Cooper™ may be configured to display a scheduled service indicator to user 110 at a predetermined point prior to the scheduled service (e.g., when an odometer falls within 3,000 miles of a scheduled 20,000-mile service).

In certain aspects, when the effective balance of user 110's checking account falls below or within predetermined range of the established threshold balance, the connected Mini Cooper™ may increase the predetermined level of fuel that triggers the low-fuel indicator, and further, may present the scheduled service indicator at a mileage closer to that associated with the scheduled service. For example, as the current effective balance of $11,500 falls below the threshold balance of $12,000, the connected Mini Cooper™ may display the low-fuel indicator when the remaining fuel falls below 20% capacity and/or display the scheduled service indicator when the odometer reading falls within 1,000 miles the scheduled 20,000-mile service. In some instances, the additional time before refueling or servicing may allow user 110 to bring the effective account balance of the checking account above the established threshold.

In other instances, client device 104 may establish a communication session with the connected lighting system (e.g., in step 1108). As described above, client device 104 may obtain device data associated with the connected lighting system (e.g., data record 1004 of FIG. 10), and may determine that user 110 specified an "Indirect" access type for the connected lighting system (e.g., in step 1112), In certain aspects, user 110's establishment of an "Indirect" access type implies that the account status notification information provided to the connected lighting system may identify a relationship between an account parameter and an established threshold (e.g., whether an effective balance of user 110's checking account exceeds a threshold value), but may not include actual values of the account parameters and established threshold values. Client device 104 may also determine in step 1112 that the connected lighting system is capable of generating and presenting only a background color indicator.

In certain aspects, client device 104 may modify the account status notification information received from system 140 to generate a device-specific notification, which may identify that the current effective account balance of user 110's checking account falls below the establish threshold value, and may instruct the connected lighting system to glow red for a predetermined period to alert user 110 status of user 110's checking account (e.g., in step 1114). Client device 104 may transmit the device-specific notification to the connected lighting system automatically and without input or intervention from user 110, and the connected lighting system may process the device-specific notification and adjust its display properties to glow red for the predetermined time period.

The disclosed embodiments may enable client device 104 to receive account status notification information and relay or "push" that portions of that account status notification information to eligible connected devices for presentation to user 110. Although described in reference to a notifications and indicators for a single account, system 140 may perform one or more of the exemplary processes described above to provide client device 104 with account notification information for multiple accounts (e.g., user 110's checking account and loyalty program account), which client device 104 may process and selectively push to one or more eligible devices to presentation in accordance with user-specified access types and indicator types. For instance, user 110 may specify (e.g., via a GUI presented by client device 104) that vehicle-based eligible devices may receive notification information for any account, while home-based eligible devise (e.g., connected lighting systems) may receive notification information corresponding to only loyalty account.

In aspects, the disclosed embodiments may enable client device 104 to relay or "push" portions of account status notification information to eligible connected devices based on geographic positional information. For instance, client device 104 may identify a particular geographic region or location associated with an account of user 110 (or alternatively, with user 110) based on notification rules, indicator rubrics, and/or profile data specified by user 110 using any of the techniques described above. In one aspects, client device 104 may determine its current geographic position (e.g., based GPS information), and may relay or push portions of the account status notification information to eligible devices when the current geographic position falls within a threshold distance of the particular geographic region or location. In other aspects, client device 104 may receive positional data identifying current geographic positions of eligible devices within environment 100 (e.g., when establishing or confirming communications sessions between client device 104 and the eligible devices). Additionally or alternative, client device 104 may relay or push portions of the account status notification information to eligible devices whose current geographic position falls within the threshold distance of the particular geographic region or location.

Using the exemplary techniques described above, client device 104, in conjunction with system 140, may generate and present indicators that reflect statuses of account parameters associated with one or more of accounts held by user 110. For instance, accounts consistent with the disclosed embodiments may include financial services accounts (e.g., checking accounts, savings accounts, brokerage accounts, investment accounts, credit card accounts, etc.), student meal plans, gift cards, store credit, wireless communications plans, or any other kind of account capable of maintaining a balance associated with system 140.

The disclosed embodiments are, however, not limited to techniques that generate and present visual, tactile, and audible indicators of accounts held by user 110. In other embodiments, client device 104 may generate and present visual, tactile, and audible indicators that alert user 110 to an upcoming deadline associated with an event. In some aspects, the event may include a payment associated with an account held by user 110, and the payment may be associated with a corresponding monthly due date (e.g., a monthly due date for a credit card account payment or a due date for a monthly mortgage payment).

In other aspects, events consistent with the disclosed embodiments may include temporal events having corresponding dates of validity. By way of example, the event may correspond to an expiration of one or more loyalty points associated with user 110's loyalty program account. The accrued loyalty points may, in some instances, be exchanged by user 110 for cash or other rewards that, in some instances, may affect a balance of an additional account held by user 110. For example, user 110's loyalty program account may include a balance of 10,000 loyalty points, which may be redeemed by user 110 for purchases at a merchant (e.g., a merchant associated with the loyalty program account), but which may expire on a predetermined date. In some aspects, user 110 may redeem at least a portion of the loyalty points prior to the expiration date for purchases, which may offset a potential reduction in an effective balance of user 110's checking account that would otherwise result from the purchase. In other aspects, as described below, at least one of the temporal events may reflect a consumption of one or more remaining "free" transactions associated with user 110's accounts.

In some embodiments, user 110 may, via client device 104, establish profile data that specifies one or more events to be tracked by system 140, specifies one or more temporal intervals that trigger a generation of an event notification by system 140, and/or associated the event and/or the event notification with a corresponding indicator presentable by client device 104. In other aspects, user 110 may identify an event associated with one or more accounts (e.g., an expiration of loyalty points associated with a specified loyalty program account), and system 140 may execute software processes that access information associated with user 110's loyalty program account (e.g., within stored account data 144B, or from a computing system associated with an issuer of the loyalty program account across network 120 through a corresponding application programming interface (API)), and determine the deadline associated with event based on the accessed account data (e.g., an expiration date of at least a portion of the loyalty points). When system 140 determines that a current date falls within the established temporal interval of an event deadline, system 140 may generate and transmit event notification information to client device 104, as described below in reference to FIG. 12.

Figure 12:
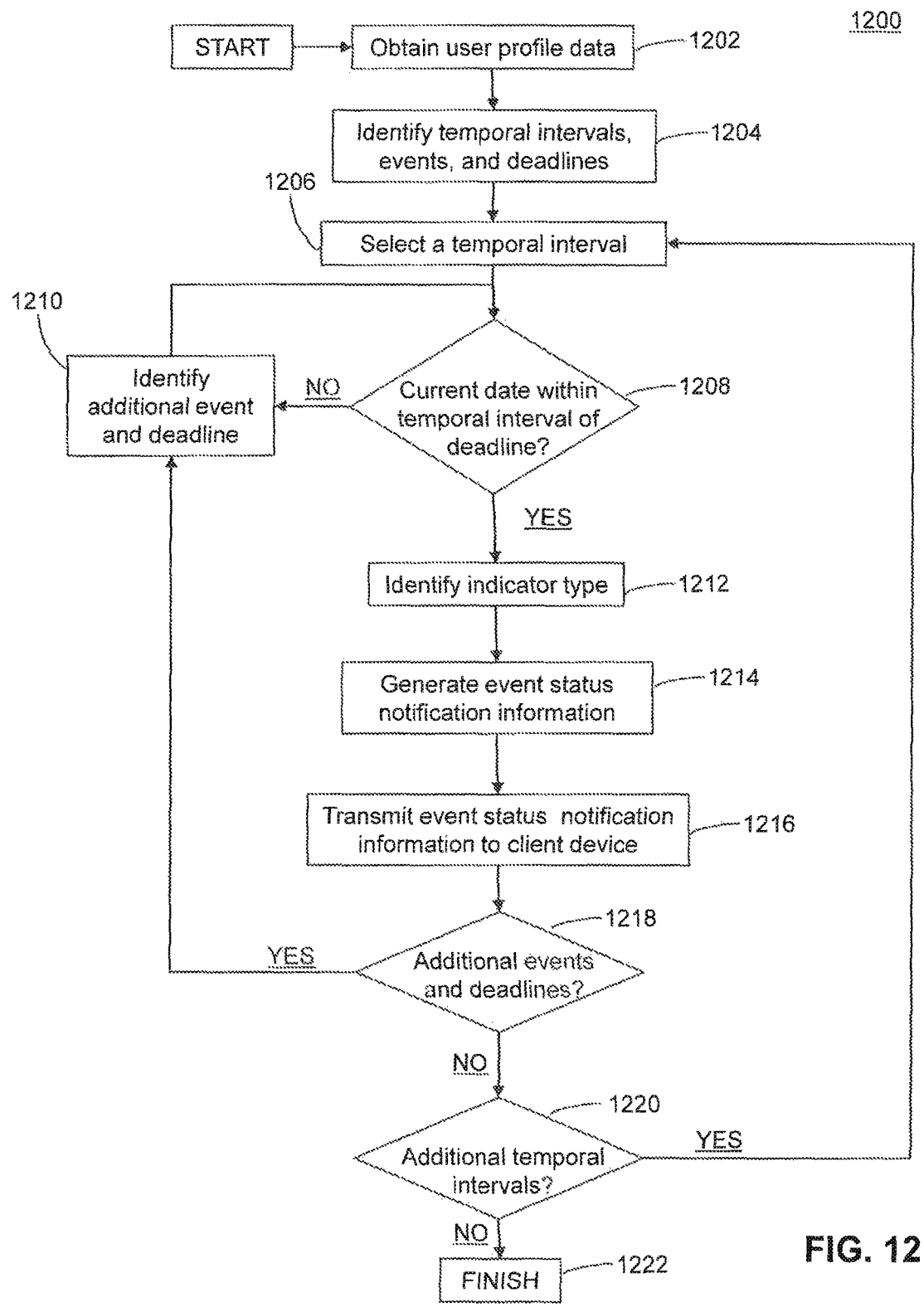
FIG. 12 is a flow chart of an exemplary process for generated and providing event notification information to networked devices.

FIG. 12 illustrates an exemplary process 1200 for generated and providing event notification information to networked devices, consistent with disclosed embodiments. In one embodiment, a system (e.g., system 140) may be configured to access profile data associated with a corresponding user (e.g., user 110), and based on the accessed profile data, generate and transmit information that, when presented by a client device (e.g., client device 104), notifies user 110 of the deadline.

In certain aspects, system 140 may access profile data associated with user 110 (e.g., in step 1202). By way of example, the obtained profile data may identify one or more events specified by user 110, which may be associated with corresponding deadlines. In an embodiment, user 110 may specify the events and corresponding deadline by providing input to a graphical user interface (GUI) presented by client device 104. For instance, user 110 may specify an event corresponding to a mortgage payment, and may specify a payment due date that reoccurs on the $1^{st}$ day of each month. In other aspects, user 110 may specify a temporal event that positively or negatively impacts one or more accounts held by user 110 (e.g., an expiration of loyalty points redeemable for purchases, etc.). In additional aspects, user 110 may, through the GUI, link an electronic calendar application to client device 104 (e.g., through a corresponding API) and automatically populate the user profile data within events and corresponding deadlines established by the electronic calendar application. In other instances, the specified event information may enable client device 104 and/or system 140 to determine one or more corresponding deadlines without user input (e.g., determining an expiration date of loyalty points based on user-specified loyalty program account information).

Further, in some instances, the obtained user profile data may identify one of more temporal intervals that mark dates on which system 140 should generate and provide an event notification to client device 104 for presentation to user 110. By way of example, user 110 may specify, through the GUI presented by client device 104, that system 140 should generate event notifications two weeks prior to the payment due date, one week prior to the payment due date, and one day prior to the payment due date.

In additional aspects, the obtained user profile data may also associate the one or more events with corresponding indicator types (e.g., glyph indicators, symbol indicators, image-based indicators, video-based indicators, audible indicators, etc.) and further, that associate a change to a visible, audible, or tactile characteristic of the indicator types with corresponding one or the temporal indicators. In some aspects, user 110's mortgage payment due date may be associated with a glyph indicator corresponding to a flashing green dollar sign presented two weeks prior to the due date, a flashing orange dollar sign presented one week prior to the due date, and a flashing red dollar sign presented one day prior to the due date. In other aspects, however, the obtained user profile data may specify a different indicator type for each combination of event, deadline, and temporal interval. By way of example, user 110 may associate a colored visual indicator (e.g., a green dollar sign) with a notification presented two weeks prior to the mortgage payment due date, may associate an animated indicator (e.g., including visual and audible elements) with a notification presented two weeks prior to the mortgage payment due date, and may associate an audible and tactile indicator with a notification presented one day prior to the mortgage payment due date. In further aspects, the indicator type may correspond to a text-based indicator that includes information identifying an initial time period in which the deadline falls (e.g., "two weeks"), which system 140 and/or client device 104 may modify as the deadline approaches (e.g., change "two weeks" to "one week," etc.).

The disclosed embodiments are not limited the above-described combinations of indicator types, events, and temporal intervals, and in additional embodiments the obtained user profile data may associated any additional or alternate types of indicators or combinations of indicators types with events, deadlines, and/or temporal intervals. Furthermore, as described above, user 110 may identify the events, deadlines, corresponding temporal intervals, and associated indicators or combinations of indicators through a GUI presented by client device 104, which may collect the information input by user 110 as profile data, and which may transmit the profile data to system 140 for storage (e.g., within stored customer data 144A).

In certain aspects, system 140 may execute software processes that parse the obtained profile data to extract one or more temporal intervals specified by user 110, one or more of the events specified by user 110, and further, one of more of the deadlines associated with the specified events (e.g., in step 1204). By way of example, system 140 may determine that user 110 specified a deadline of Jan. 1, 2015, for an event corresponding to a monthly mortgage payment. Further, in some aspects, system 140 may be configured to identify one or more temporal intervals associated with a desired notification. For example, the temporal intervals may specify that user 110 desires a notification of the upcoming deadline two weeks prior to the deadline, one week prior to the deadline, and one day prior to the deadline. Further, and as described above, system 140 may determine a deadline and/or a temporal interval associated with a corresponding event based on the user-specified profile date (e.g., system 140 may determine an expiration date of loyalty points based on loyalty program account information (account numbers, etc.) within the obtained profile data).

System 140 may, in some instances, select one of the temporal intervals (e.g., in step 1206) and determine whether a current date falls within the temporal interval of the identified deadline (e.g., in step 1208). By way of example, system 140 may initially select the smallest temporal interval specified by user 110 within the corresponding user profile data (e.g., one day), and may determine whether the current date (i.e., December $31^{st}$) falls within the one-day temporal interval of the identified January $1^{st}$ due date for the mortgage payment.

If system 140 determines that the current date does not fall within the selected temporal interval (e.g., step 1208; NO), system 140 may identify an additional event and corresponding deadline from the access user profile data (e.g., in step 1210). Exemplary process 1200 may pass back to step 1208, and system 140 may execute software processes that establish whether the current date falls within the selected temporal interval of the newly identified deadline.

If, however, system 140 determines that the current date falls within the temporal interval of the deadline for the mortgage payment (e.g., step 1208; YES), system 140 may execute software processes that identify an indicator type associated with the combination of event, deadline, and temporal interval (e.g., in step 1212). For instance, and as described above, system 140 may identify that user 110 specified that a flashing red dollar sign be presented within a notification that user 110's mortgage payment is due on the next calendar day. In some aspects, system 140 may be configured to generate event status notification information (e.g., in step 1214) that identifies the pending deadline of January $1^{st}$, identifies the event (e.g., a mortgage payment), and further, includes information instructing client device 104 to present the specified indicator type to user 110.

System 140 may be configured to transmit the generated event status notification information to client device 104 across network 120 using any of the communications protocols outlined above (e.g., in step 1216). Client device 104 may, in some instances, be configured to process the received information, generate the specified event status indicator (e.g., a flashing red dollar sign), and render the event status indicator for presentation to user 110. In certain aspects, the flashing red indicator, when presented by client device 104, may draw user 110's attention to client device 104 may enable user 110 to confirm the timely submission of the mortgage payment.

In some aspects, and using any of the exemplary techniques described above system 140 may determine an impact of the pending deadline on account parameters associated with one or more accounts held by user 110, and may generate account status notification information that reflects the determined impact on the one or accounts. In certain embodiments, system 140 may be to incorporate at least a portion of the account status notification information within the generated event status notification information (e.g., in step 1214 above). The account status notification information, when processed by client device 104 in conjunction with the event status notification information, may instruct client device 104 to generate and render for presentation a "hybrid" indicator that reflects not only the pending deadline, but also the impact of that deadline on the one or more accounts held by user 110.

In some aspects, and upon transmission of the event status notification information to client device 104, system 140 may determine whether the accessed user profile data includes additional events and corresponding deadlines (e.g., in step 1218). If system 140 determines that additional events and due dates requires processing (e.g., step 1218; YES), system 140 may execute software processes that identify an additional one of the remaining events and corresponding due dates, as described above (e.g., in step 1210).

If, however, system 140 determines that no additional events and corresponding due dates require analysis under the selected temporal interval (e.g., step 1218; NO), system 140 may determine in step 1220 whether additional temporal intervals within the user profile data require analysis. If additional temporal intervals require analysis (e.g., step 1220; YES), system 140 may select one of the additional temporal intervals (e.g., in step 1206), and system 140 may pass back to step 1208, at which time system 140 determines whether identified deadlines fall within the newly selected temporal interval. For instance, as described above, system 140 may initially select the most restrictive time interval specified within the user profile data (e.g., one day prior to a deadline), and upon processing each specified event and due date with respect to the most restrictive temporal interval, system 140 may select a less restrictive temporal interval in passing back to step 1206. Alternatively, if no additional temporal intervals require analysis, exemplary process 1200 is complete in step 1222.

Further, in some aspects, system 140's selection of a temporal interval, and the processing of user-established events and deadlines based on that interval, may be updated at period, regular, and/or user-specified intervals. For instance, user 110 may establish, via a GUI presented by client device 104, and that the exemplary event notification generation and presentation techniques outlined above be updated and reinitiated every hour, day, etc. In certain aspects, the user-specified interval may define a position of a notification rule, indicator rubric, and/or profile data.

The disclosed embodiments may enable client device 104 to present a graphical, audible, and/or tactile notification of a current date's proximity to a deadline for a user-established event. In some aspects, client device 104 and/or system 140 may generate and present the event status notification using any of the exemplary techniques described above. For instance, a device component of client device 104 (e.g., an OHMD or heads-up display) may present one or more of the disclosed event status indicators as an AR view that "pops-up" into user 110's field-of-view using the techniques described above. Further, in some aspects, client device 104 may perform one or more of the exemplary techniques described above to identify one or more devices eligible to receive event notifications, and to transmit or "push" the receive at least a portion of event notification information to the eligible device for presentation. In additional embodiments, client device 104 and/or system 140 may determine whether to present the event status indicators to user 110 based on geographic locations or regions associated with user 110, an event, and/or specified within at least one notification rule or indicator rubric. For instance, client device 104 and/or system 140 may perform one or more of the exemplary processes described above to identify a geographic location of region associated with the user or an event (e.g., as specified by the user within at least one notification rule), and to present a corresponding event status indicator when the user's geographic position falls within a threshold distance of the geographic location of the user and/or the event.

In other aspects, the disclosed embodiments may enable client device 104 and/or system 140 to generate, present, and subsequently modify a presentation of not only event status indicators, but also account status indicators. For instance, client device 104 and/or system 140 may generate, present, and modify one or more account status indicators associated with corresponding parameters of accounts held by or associated with user 110 (and others associated with user 110) using any of the exemplary techniques described above. In some aspects, using one or more of the exemplary techniques described above, client device 104 and system 140 may generate, present, and or modify one or more event status indicators corresponding user-specified events and deadlines. In certain embodiments, client device 104 may present one or more of the account status indicators to user 110 simultaneously with the event status indicators. For example, client device 104 may present first and second account status indicators and event status indicators as concentric-ring indicators surrounding an object within a field-of-view of user 110, as described above.

The disclosed embodiments may also enable client device 104 to generate one or more "hybrid" indicators that provide, to user 110, a graphical, audible, or tactile notifications of not only a pending deadline, but also of an impact of that deadline on one or more of user 110's accounts. By way of example, system 140 may determine user 110 holds a loyalty program account (e.g., issued by a corresponding merchant) having a balance of 10,000 loyalty points. System 140 may further determine that 5,000 of the accrued loyalty point balance are scheduled to expire in one week, and additionally, that the expiring 5,000 points could be redeemed for a $500 purchase of goods or services from a corresponding merchant. In certain aspects, system 140 may extract the information identifying the loyalty program account balance, the expiring loyalty points, the expiration date, and/or the redemption value from the obtained user profile data, and additionally or alternatively, from a computer system associated with the merchant and accessible across network 120 through a corresponding API.

In certain aspects, the expiration of the 5,000 loyalty points, and their potential redemption for a $500 purchase of goods and/or services from the merchant may negatively affect an effective balance of user 110's checking account (i.e., because in the absence of the redeemed points, user 110 would remove $500 from the checking account to purchase the goods and/or services from the merchant). Using any of the exemplary techniques outlined above, system 140 may determine that the loss of the 5,000 expired loyalty points would correspond to a reduction of $500 in the effective balance of user 110's checking account, and further, would reduce the effective balance below the user-specified threshold.

In some embodiments, system 140 may generate (i) event status notification information that indicates the 5,000 loyalty points are scheduled to expire in one month, and (ii) account status notification information that indicates the expiration of the 5,000 would result in an effective balance of user 110's checking account that falls below the user-specified threshold balance. In certain instances, system 140 may combine at least a portion of the event and account status notification information to form "hybrid" notification information that instructs client device 104 to generate a single "hybrid" indicator that reflect not only the pending expiration of the 5,000 points, but also the impact of the expired 5,000 points on the effective balance of user 110's checking account. System 140 may, for example, determine visual, audible, and/or tactile characteristics of the hybrid indicator using any of the exemplary techniques outlined above (e.g., based portions of notification rules, indicator rubrics, and/or user profile data), and system 140 may transmit the hybrid notification information to client device 103 across network 120.

In certain aspects, client device 104 may receive the hybrid notification information, and using any of the exemplary techniques outlined above, generate and present the hybrid indicator that reflects the pending expiration of the 5,000 points and the impact of the expired points on user 110's effective checking account balance. For example, and based on the hybrid notification information, client device 104 may generate and present a glyph indicator that includes a textual description of the effective balance of user 110's checking account and the impact (e.g., the reduction) on the effective balance that would result from the expiration of the 5,000 points, and further is colored yellow to indicate to user 110 that the 5,000 points expire in one month. In other instances, as the expiration date nears, system 140 may instruct client device 104 to modify a visual, tactile, and/or audible characteristic of the presented hybrid indicator to alert the user of the pending expiration. For example, client 140 may color the hybrid indicator red to indicate that the 5,000 points expire in one week, and additionally or alternatively, the hybrid indicator may flash to alert the user to the pending expiration.

In other embodiments, system 140 may be configured to separately transmit at least a portion of the generated account status notification information and event status notification information to client device 104. Using any of the exemplary techniques described above, client device 104 may generate and present an account status indicator that reflects the impact of the expired loyalty points on user 110's effective checking account balance, and further, an event status indicator reflecting the pending expiration of the loyalty points. Client device 104 may be configured to present the account status indicator proximate to the event status indicator, as surrounding the event status indicator, or in accordance with any of the exemplary configurations outlined and specified in corresponding portions of notification rules, account rubrics, and/or user profile data.

The disclosed embodiments may enable client device 104 to present one or more indicators that reflect not only a deadline associated with a pending event, but also an impact of that deadline (or an action associated with the deadline) on one or more accounts held by user 110. In certain aspects, the proximity of the deadline to the current date may provide context that enables user 110 to determine an importance of the impact on the one or more accounts. For example, user 110 may electronically pay each month's bills on the 15$^{th}$ day, and client device 104 may present a hybrid indicator to user 110 that indicates user 110's effective checking account balance falls below the user-specified threshold, and further, that is colored green to indicate user 110's checking account will receive funds corresponding to bi-monthly wages in two days. Additionally or alternatively, the hybrid indicator may be colored green to indicate that user 110's next scheduled bill payment falls after the scheduled receipt of wages. In other instances, client device 104 may be configured to presented an account status indicator colored red to indicate that the effective balance of user 110's checking account falls below the user-specified threshold balance, while simultaneously presenting an event status indicator colored green to indicate that user 110's checking account is scheduled receive wages during the next twenty-four hours. Based on the presented indicators, user 110 may understand that his or checking balance falls below the threshold value, but may perceive little risk to the reduced balance due to the pending pay date and/or distant due date.

Further, as noted above, account parameters consistent with the disclosed embodiments may reflect a current usage and/or a remaining available usage of the one or more accounts. For example, user 110 may hold a debit card issued by the financial institution, which may provide a predetermined number of "free" transactions involving the debit card at participating ATMs (e.g., a predetermined number of withdrawal transactions without accruing fees). In certain aspects, the account parameter information may identify a number of transactions involving the debit card at the participating ATMs, a number of remaining free transactions, and any additional or alternate parameters describe user 110's current or remaining available usage. Further, in some aspects, the remaining free transactions may expire after a certain time period, and the account parameter information consistent with the disclosed embodiments may also identify the expiration date of the remaining transactions.

In some instances, system 140 may be configured to determine that user 110's checking account has fifteen remaining "free" transactions, and that once consumed, user 110's checking account will be charged a fixed monthly fee (e.g., based on user-specified profile information). System 140 may generate status notification that identifies the remaining free transactions and the fixed monthly fee, and may transmit the status information to client device 104. In certain aspects, client device 104 may generate and present to user 110 an indicator that identifies the number of remaining free transactions (e.g., as an "event"), and further, that modifies a visual, audible, or tactile characteristic of the indicator to reflect the user's consumption of the free transactions (e.g., the approach to the "deadline" of zero free transactions). In certain aspects, the indicator may be colored green if greater than ten free transactions remain, glow yellow if between five and ten free transactions remain, and further, may glow red and/or flash when fewer than five free transactions remain. Further, in some aspects, the received status information may include an expiration date of the remaining free transactions, and the generated and presented indicator may reflect the expiration date, and the time until the expiration date, using any of the exemplary techniques outlined above.

Other embodiments will be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. An apparatus, comprising:
   a storage device; and
   at least one processor coupled to the storage device, the storage device storing software instructions for controlling the at least one processor when executed by the at least one processor, the at least one processor being operative with the software instructions and being configured to:
   obtain information identifying an event and a corresponding deadline;
   determine whether a current date falls within a first time period prior to the corresponding deadline;
   when the current date is determined to fall within the first time period prior to the corresponding deadline, generate first event status notification information for the identified event based on at least one notification rule, the first event notification status information indicating that the current date falls within the first time period prior to the corresponding deadline and identifying a first indicator type associated with the first time period and the event;
   transmit, to a device, hybrid notification information that includes the generated first event status notification information and account status notification information indicative of an impact of the event on a parameter of an account, the hybrid notification information instructing device to generate and present, via a display component, a hybrid indicator consistent with the first indicator type without input from a user of the device, the hybrid indicator comprising (i) an event status indicator portion that provides a graphical representation of a temporal proximity of the current date to the corresponding deadline and (ii) an account status indicator portion that provides a graphical representation of the impact of the event on the account parameter, the event status indicator portion comprising at least one of a status bar, a graphical icon, or a glyph, and the hybrid notification information further instructing the device to establish a color for the event status indicator portion that reflects the disposition of the current date within the first time period;

determine, at a predetermined time after generating the first event status notification information, that the current date falls within a second time period prior to the corresponding deadline, the first time period exceeding the second time period;

generate, based on the at least one notification rule, second event status notification information indicating that the current date falls within the second time period prior to the corresponding deadline; and transmit the second event status notification information to the device, the second event status notification instructing the device to modify, via the display component, the established color of the event status indicator portion without input from the user, the modification to the established color-being consistent with the at least one notification rule and reflecting a change in the temporal proximity of the current date to the corresponding deadline.

2. The apparatus of claim 1, wherein the at least one processor is further configured to obtain information identifying a current geographic position of the device.

3. The apparatus of claim 2, wherein:
the notification rule associates a geographic region with the account; and
the at least one processor is further configured to:
determine whether the current geographic position of the device falls within a threshold distance of the associated geographic region; and
when the current geographic position of the device is determined to fall within the threshold distance, transmit the hybrid notification information to the device.

4. The apparatus of claim 1, wherein the first indicator type comprises at least one of a graphical status bar, a dynamic graphical icon, or a glyph.

5. The apparatus of claim 1, wherein the obtained information corresponds to profile information, the profile information identifying the first time period and the first indicator type.

6. The apparatus of claim 5, wherein:
the first indicator type comprises an animated indicator type; and
the animated indicator type is associated with at least one of an element of digital image content or digital video content.

7. The apparatus of claim 5, wherein:
the profile information further identifies a third time period associated with the event, the third time period exceeding the first time period;
the at least one processor is further configured to, when the current date is determined not to fall within the first time period, determine that the current date falls within the third time period prior the corresponding deadline.

8. The apparatus of claim 7, wherein the at least one processor is further configured to:
generate third event status notification information based on the at least one notification rule, the third event status notification information indicating that the current date falls within the third time period prior to the corresponding deadline; and
transmit the third event status notification information to the user device,
wherein the third event status notification information instructs the device to modify, via the display component, a visual characteristic of the event status indicator portion without input from the user, the modified visual characteristic being consistent with the at least one notification rule and reflecting an additional change in the temporal proximity of the current date to the corresponding deadline.

9. The apparatus of claim 1, wherein the predetermined time period comprises a user-specified time after the determination of whether current date fell within the first time period.

10. The apparatus of claim 1, wherein:
the generated second event status notification information comprises a second indicator type; and
the second event status notification information instructs the device to present, via the display component, an event status indicator in accordance with the second indicator type, the presented event status indicator reflecting the change in the temporal proximity of the current date to the corresponding deadline.

11. The apparatus of claim 1, wherein the at least one processor is further configured to obtain at least one of the event or the corresponding deadline from an application program executed by the device, the at least one event or corresponding deadline being obtained through a programmatic interface associated with the application program.

12. The apparatus of claim 1, wherein:
the event corresponds to an expiration of at least one loyalty point associated with a loyalty program;
the corresponding deadline represents an expiration date of the at least one loyalty point;
the account parameter corresponds to an effective account balance of a checking account; and
the expiration of the at least one loyalty point results in a reduction of the effective account balance by a predetermined amount.

13. The apparatus of claim 1, wherein the account parameter includes at least one of:
a balance of the account;
a potential account balance that reflects whether the account can accommodate a potential purchase of a product or service from a merchant;
a predictive account parameter that reflects a predicted balance of the account based on at least one prior payment;
a balance of a loyalty program; or
a potential balance of the loyalty program that reflects the potential purchase of the product or service from the merchant.

14. The apparatus of claim 1, wherein the at least one processor is further configured to generate the account status notification information based on the at least one notification rule and information associated with the account.

15. A computer-implemented method, comprising:
obtaining, by at least one processor, information identifying an event and a corresponding deadline;
determining, by the least one processor, whether a current date falls within a first time period prior to the corresponding deadline;
when the current date is determined to fall within the first time period prior to the deadline, generating, by the least one processor, first event status notification information for the identified event based on at least one notification rule, the first event notification status information indicating that the current date falls within the first time period prior to the corresponding deadline and identifying a first indicator type associated with the first time period and the event;

transmitting, by the least one processor, hybrid notification information to a device, the hybrid notification information comprising the first notification information and account status notification information indicative of an impact of the event on a parameter of an account, the hybrid notification information instructing the device to generate and present, via a display component, a hybrid indicator consistent with the first indicator type without input from a user of the device, the hybrid indicator comprising (i) an event status indicator portion that provides a graphical representation of a temporal proximity of the current date to the corresponding deadline and (ii) an account status indicator portion that provides a graphical representation of the impact of the event on the account parameter, the event status indicator portion comprising at least one of a status bar, a graphical icon, or a glyph, and the hybrid notification information further instructing the device to establish a color for the event status indicator portion that reflects the disposition of the current date within the first time period;

determining, by the at least one processor, and at a predetermined time after generating the first event status notification information, that the current date falls within a second time period prior to the corresponding deadline, the first time period exceeding the second time period;

based on the at least one notification rule, generating, by the at least one processor, second event status notification information indicating that the current date falls within the second time period prior to the corresponding deadline; and transmitting, by the at least one processor, the second event status notification information to the device, the second event status notification instructing the device to modify, via the display component, the established color-of the event status indicator portion without input from the user, the modification to the established color being consistent with the at least one notification rule and reflecting a change in the temporal proximity of the current date to the corresponding deadline.

16. The method of claim 15, wherein the obtained information corresponds to profile information, the profile information identifying at least one of the first time period, the second time period, or the first indicator type.

17. A device, comprising:
a display component;
a storage device; and
at least one processor coupled to the display component and the storage device, the storage device storing software instructions for controlling the at least one processor when executed by the at least one processor, the at least one processor being operative with the software instructions and being configured to:
receive hybrid notification information comprising event status notification information for at least one event and an account status notification information reflecting the impact of the event on an account parameter of at least one user account, the event being associated with a corresponding deadline, and the received event status notification information reflecting a disposition of a current date within a first time period prior to the corresponding deadline, and the first time period being associated with a first indicator type;
based on portions of the received hybrid notification information, generate a hybrid indicator consistent with the first indicator type, and the hybrid indicator comprising (i) an event status indicator portion that provides a graphical representation of the disposition of the current date within the first time period and (ii) an account status indicator portion that provides a graphical representation of the impact of the event on the at least one user account parameter, the event status indicator portion comprising at least one of a status bar, a graphical icon, or a glyph;
establish a color for the event status indicator portion, the established color reflecting the disposition of the current date within the first time period;
present, via the display component, the generated hybrid indicator without receiving input from a user, the event status indicator portion being presented in accordance with the established color;
determine, at a predetermined time after presentation of the hybrid indicator, that the current date is disposed within a second time period prior to the corresponding deadline, the first time period exceeding the second time period; and
modify, via the display component, the established color of the presented event status indicator portion without input from the user, the modification to the established color being consistent with the at least one notification rule and reflecting the disposition of the current date within the second time prior to the corresponding deadline.

18. The device of claim 17, wherein:
the device further comprises a speaker coupled to the at least one processor; and
the at least one processor is further configured to present an audible representation of at least one of the event status notification information or the account status notification information through the speaker.

19. The device of claim 17, wherein the at least one processor is further configured to:
generate a graphical configuration interface based on configuration information received by the device; and
present the graphical configuration interface via the device component, the configuration interface allowing the user to identify at least one of the event, the deadline, the first time period, or the second time period.

20. The device of claim 17, wherein:
the device further comprises a position sensor coupled to the at least one processor; and
the at least one processor is further configured to receive, from the position sensor, geographic information identifying a current geographic position of the device.

21. The device of claim 20, wherein:
the notification rule comprises indication associating a geographic region with at least one of the account or the event; and
the at least one processor is further configured to:
determine whether the current geographic position of the device falls within a threshold distance of the associated geographic region; and
when the current geographic position of the device is determined to fall within the threshold distance, present the hybrid indicator via the display component.

22. The device of claim 17, wherein the at least one processor is further configured to:
obtain device information identifying an additional device permitted to access at least one of the event status notification information or the account status notification information in accordance with at least one restriction;

identify at least a portion of the at least one event or account status notification information for transmission to the additional device, the identified portion being consistent with the at least one restriction; and transmit the identified portion to the additional device without receiving input from the user, the identified portion instructing the additional device to present at least one of a visual, audible, or tactile indicator.

23. The device of claim 17, wherein the at least one processor is further configured to:

obtain image data representative of a portion of an environment visible within a field-of-view of the device, the obtained image data representing a digital image of a portion of an object; and present, via the display component, the generated hybrid indicator within the field-of-view of the device without receiving input from the user, the presented hybrid indicator being visible within the environment, and modifying a visual appearance of the object within the environment to reflect the disposition of the current date within the first time period prior to the deadline and the impact of the event on the account parameter, the modification being visually perceptible through the field-of-view.

24. The device of claim 17, wherein the at least one processor is further configured to present, via a device component, at least one of an audible or tactile notification that reflects the disposition of the current date within the second time period, the at least one presented audible or tactile notification being consistent with the at least one notification rule.

25. The device of claim 17, wherein:

the presented event status indicator portion includes a textual representation of the first time period; and the at least one processor is further configured to modify the textual representation to identify the second time period.

26. The device of claim 17, wherein the at least one processor is further configured to:

the event corresponds to an expiration of at least one loyalty point associated with a loyalty program account;

the corresponding deadline represents an expiration date of the at least one loyalty point;

the account parameter corresponds to an effective account balance of a checking account; and the expiration of the at least one loyalty point results in a reduction of the effective account balance by a predetermined amount.

27. The device of claim 17, wherein the account parameter comprises at least one of:

a balance of the account;

a potential account balance that reflects whether the account balance can accommodate a potential purchase of a product or service from a merchant;

a predictive account parameter that reflects a predicted balance of the account based on at least one prior payment;

a balance of a loyalty program; or a potential balance of the loyalty program that reflects the potential purchase of the product or service from the merchant.

28. The device of claim 17, wherein:

the account status indicator portion comprises a textual representation of the impact of the event on the at least one account parameter; and the presented account status indicator portion is superimposed over and obscures a part of the presented event status indicator.

* * * * *